US012747784B1

(12) United States Patent
Kotloski et al.

(10) Patent No.: US 12,747,784 B1
(45) Date of Patent: *Sep. 29, 2026

(54) TRACKED COMBAT VEHICLE WITH INTEGRATED MOTOR BRAKE HAVING CLUTCH SENSORS

(71) Applicant: Oshkosh Defense, LLC, Oshkosh, WI (US)

(72) Inventors: Andrew Kotloski, Oshkosh, WI (US); Nicholas Kopec, South Lyon, MI (US); Benjamin LeVesque, Royal Oak, MI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/344,481

(22) Filed: Sep. 29, 2025

Related U.S. Application Data

(63) Continuation of application No. 18/894,759, filed on Sep. 24, 2024, now Pat. No. 12,449,034, which is a continuation-in-part of application No. 18/661,066, filed on May 10, 2024, and a continuation-in-part of application No. 17/844,843, filed on Jun. 21, 2022, now Pat. No. 12,497,014.

(60) Provisional application No. 63/540,167, filed on Sep. 25, 2023, provisional application No. 63/466,120, (Continued)

(51) Int. Cl.

| | |
|---|---|
| ***F16H 61/12*** | (2010.01) |
| ***F16H 57/01*** | (2012.01) |
| *B60T 7/12* | (2006.01) |
| *B62D 55/06* | (2006.01) |

(52) U.S. Cl.
CPC ............ *F16H 61/12* (2013.01); *F16H 57/01* (2013.01); *B60T 7/12* (2013.01); *B62D 55/06* (2013.01); *F16H 2057/014* (2013.01); *F16H 2057/018* (2013.01); *F16H 2061/1276* (2013.01)

(58) Field of Classification Search
CPC ............... F16H 57/01; F16H 2057/014; F16H 2057/018; F16H 2003/442; F16H 61/12; F16H 2061/1276; F16H 63/3026; F16H 2200/0021; F16H 2200/0034; F16H 2200/2007; F16H 2200/2035; F16D 2500/5012; F16D 2500/5023; F16D 2066/003; F16D 2066/008; F16D 66/021; F16D 2300/18
See application file for complete search history.

(56) References Cited

U.S. PATENT DOCUMENTS

| | | | |
|---|---|---|---|
| 6,830,526 | B2 | 12/2004 | Stettler |
| 2007/0080236 | A1 | 4/2007 | Betz et al. |

(Continued)

*Primary Examiner* — Timothy Hannon
(74) *Attorney, Agent, or Firm* — Foley & Lardner LLP

(57) ABSTRACT

A tracked vehicle includes a drive system and a controller. The drive system is configured to drive a track of the tracked vehicle. The drive system includes an electric motor, a gearbox, and a first positional sensor. The gearbox includes a first planetary gearset, a second planetary gearset, a first clutch, and a second clutch. The first positional sensor is configured to measure translation of a piston of the first clutch and the second positional sensor is configured to measure translation of a piston of the second clutch. The controller is configured to use the measured translation of the piston of the first clutch and the measured translation of the piston of the second clutch to operate the electric motor and the gearbox.

20 Claims, 44 Drawing Sheets

Related U.S. Application Data filed on May 12, 2023, provisional application No. 63/466,093, filed on May 12, 2023.

(56) References Cited

U.S. PATENT DOCUMENTS

| | | | |
|---|---|---|---|
| 2007/0252432 | A1 | 11/2007 | Takamatsu |
| 2017/0113742 | A1 | 4/2017 | Tratta et al. |

TRACKED COMBAT VEHICLE WITH INTEGRATED MOTOR BRAKE HAVING CLUTCH SENSORS

CROSS-REFERENCE TO RELATED PATENT APPLICATION

This application is a continuation of U.S. application Ser. No. 18/894,759, filed Sep. 24, 2024, which (i) claims the benefit of and priority to U.S. Provisional Patent No. 63/540,167, filed Sep. 25, 2023, (ii) is a continuation-in-part of U.S. Ser. No. 18/661,066, filed May 10, 2024, which claims the benefit of and priority to U.S. Provisional Application No. 63/466,093, filed May 12, 2023, and U.S. Provisional Application No. 63/466,120, filed May 12, 2023, and (iii) is a continuation-in-part of U.S. application Ser. No. 17/844,843, filed Jun. 21, 2022, the entire disclosures all of which are incorporated by reference herein.

STATEMENT REGARDING FEDERALLY-SPONSORED RESEARCH OR DEVELOPMENT

This invention was made with Government support under contract W15QKN-17-9-1025, awarded by the Department of Defense. The Government has certain rights in this invention.

BACKGROUND

The present disclosure relates to a tracked vehicle. More particularly, the present disclosure relates to a remotely controlled vehicle.

SUMMARY

One embodiment of the present disclosure is a tracked vehicle. The tracked vehicle includes a drive system and a controller. The drive system is configured to drive a track of the tracked vehicle. The drive system includes an electric motor, a gearbox, and a first positional sensor. The gearbox includes a first planetary gearset, a second planetary gearset, a first clutch, and a second clutch. The first positional sensor is configured to measure translation of a piston of the first clutch and the second positional sensor is configured to measure translation of a piston of the second clutch. The controller is configured to use the measured translation of the piston of the first clutch and the measured translation of the piston of the second clutch to operate the electric motor and the gearbox.

Another embodiment of the present disclosure is a system for driving a track of a tracked vehicle. The system includes an electric motor, a gearbox, and a controller. The gearbox includes a first planetary gearset, a second planetary gearset, a first clutch, and a second clutch. The first positional sensor is configured to measure translation of a piston of the first clutch and the second positional sensor configured to measure translation of a piston of the second clutch. The controller is configured to use the measured translation of the piston of the first clutch and the measured translation of the piston of the second clutch to operate the electric motor and the gearbox.

Another embodiment of the present disclosure is a system for operating a gearbox. The system includes a first positional sensor and a controller. The first positional sensor is configured to measure translation of a piston of a first clutch of the gearbox and the second positional sensor configured to measure translation of a piston of a second clutch of the gearbox. The controller is configured to use the measured translation of the piston of the first clutch and the measured translation of the piston of the second clutch to operate a driver of the gearbox.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a tracked vehicle includes a gearbox and a pair of positional sensors. The gearbox includes two planetary gear sets arranged serially and driven by an electric motor. The electric motor drives the sun gears of both the first planetary gear set and the second planetary gear set. A carrier of the planetary gears of the first planetary gear set is coupled with a ring gear of the second planetary gear set. The gearbox also includes a first clutch configured to engage a ring gear of the first planetary gear set and a second clutch configured to engage the ring gear of the second planetary gear set. A carrier of the second planetary gear set is coupled with an output driveshaft to drive a tractive element of a military vehicle. The first clutch and the second clutch may both be engaged to transition the gearbox into a park mode. The first clutch and the second clutch may both be disengaged to transition the gearbox into a neutral mode. The first clutch may be fully engaged to transition the military vehicle into a first driving mode (e.g., a high mode) with the second clutch fully disengaged. When the gearbox is in the first driving mode, the second clutch can be partially engaged to provide braking. The second clutch may be fully engaged to transition the military vehicle into a second driving mode (e.g., a low mode) with the first clutch fully disengaged. When the gearbox is in the second driving mode, the first cutch can be partially engaged to provide braking. The positional sensors may provide sensor feedback to a controller that operates the gearbox or a driveline of the vehicle. The sensor feedback obtained from the positional sensors can be used by the controller to determine wear or predict failure of the clutches.

Tracked Vehicle

Figure 1:
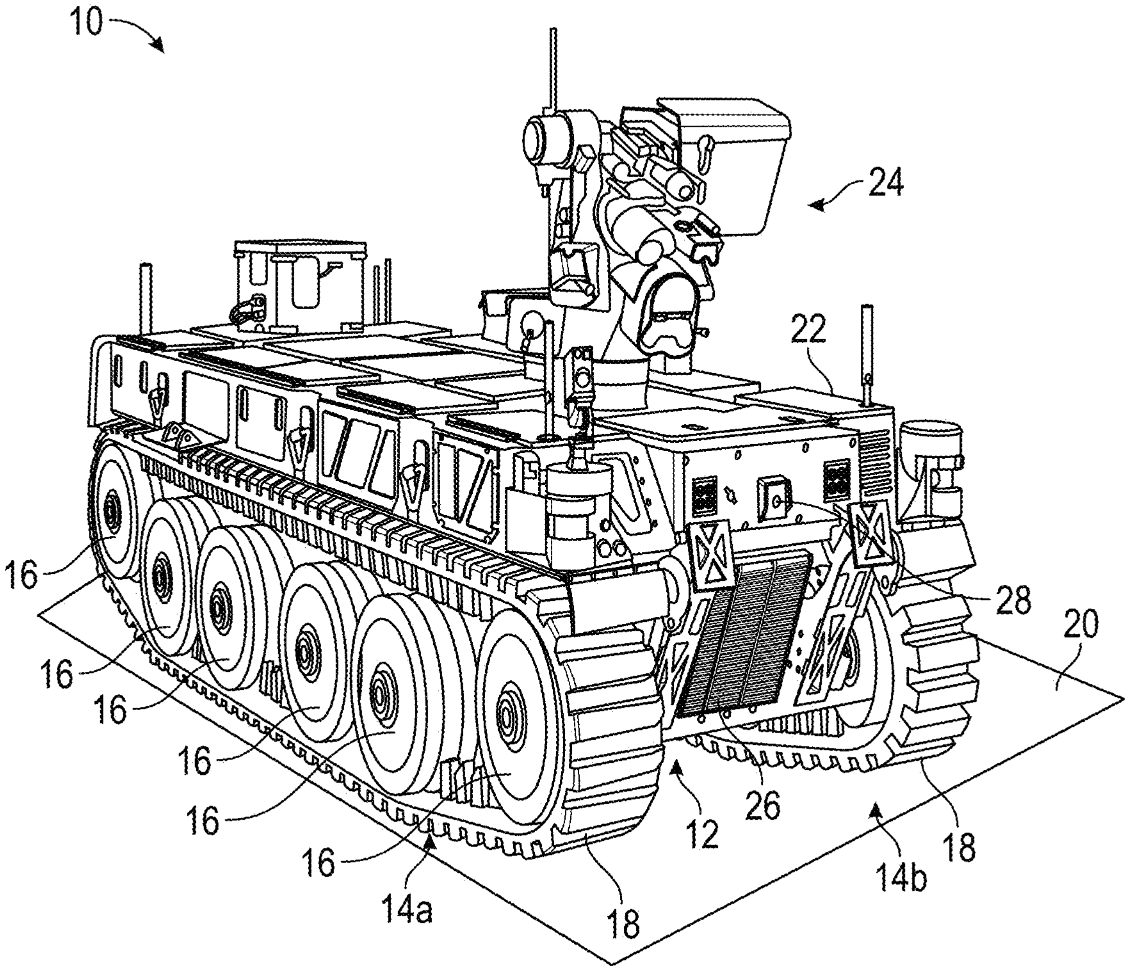
FIG. 1 is a perspective view of a vehicle, according to some embodiments.

Referring to FIG. 1, a vehicle 10 (e.g., a robotic vehicle, a combat vehicle, an autonomous vehicle, a semi-autonomous vehicle, a remotely controlled combat or fighting vehicle, etc.) includes a body 22 that is coupled with and positioned on a chassis 12 (e.g., a frame). The vehicle 10 may be a tracked vehicle including a first track assembly 14*a* and a second track assembly 14*b* positioned on opposite lateral sides of the body 22. The track assemblies 14 are configured to be driven (e.g., by a drive drum) to drive transportation of the vehicle 10 along a ground surface 20. In some embodiments, the track assemblies 14 include multiple followers that are rotatably coupled with the body 22 or the chassis and are driven to rotate by movement of the tracks 18. The track assemblies 14 each include multiple rotatable elements 16 (e.g., drums, wheels, gears, sprockets, cylindrical members, etc.) that may include one or more driven rotatable elements and one or more follower rotatable elements. The track assemblies 14 also each include tracks 18 that have the form of an elongated and closed loop member (e.g., a tread, a rubber track, a resilient material formed in a loop, etc.). The driven rotatable elements may engage an inner surface of the tracks 18 in order to drive rotation or movement of the tracks 18 to transport the vehicle 10.

The vehicle 10 may be a fighting vehicle, a manned vehicle, a military vehicle, an electric military vehicle, an unmanned vehicle, a robotic combat vehicle, etc. The vehicle 10 can include weaponry 24 positioned around the body 22, various telematics or wireless control units, a control system, etc., such that the vehicle 10 can be transported by a remote operator. The vehicle 10 may include one or more sensors 28 (e.g., infrared sensors, cameras, imaging devices, forward looking infrared, lidar sensors, radar sensors, microphones, threat detection systems, etc.) positioned about the body 22. The body 22 may be armored in order to reduce a likelihood of puncture by hostile rounds or weaponry.

The body 22 may also include a grille 26 that includes multiple structural members and openings. The grille 26 may be positioned at a longitudinal end (e.g., a front or forwards facing longitudinal end) of the body 22 and may allow air to transfer into the body 22 to cool components of the vehicle 10.

Figure 2:
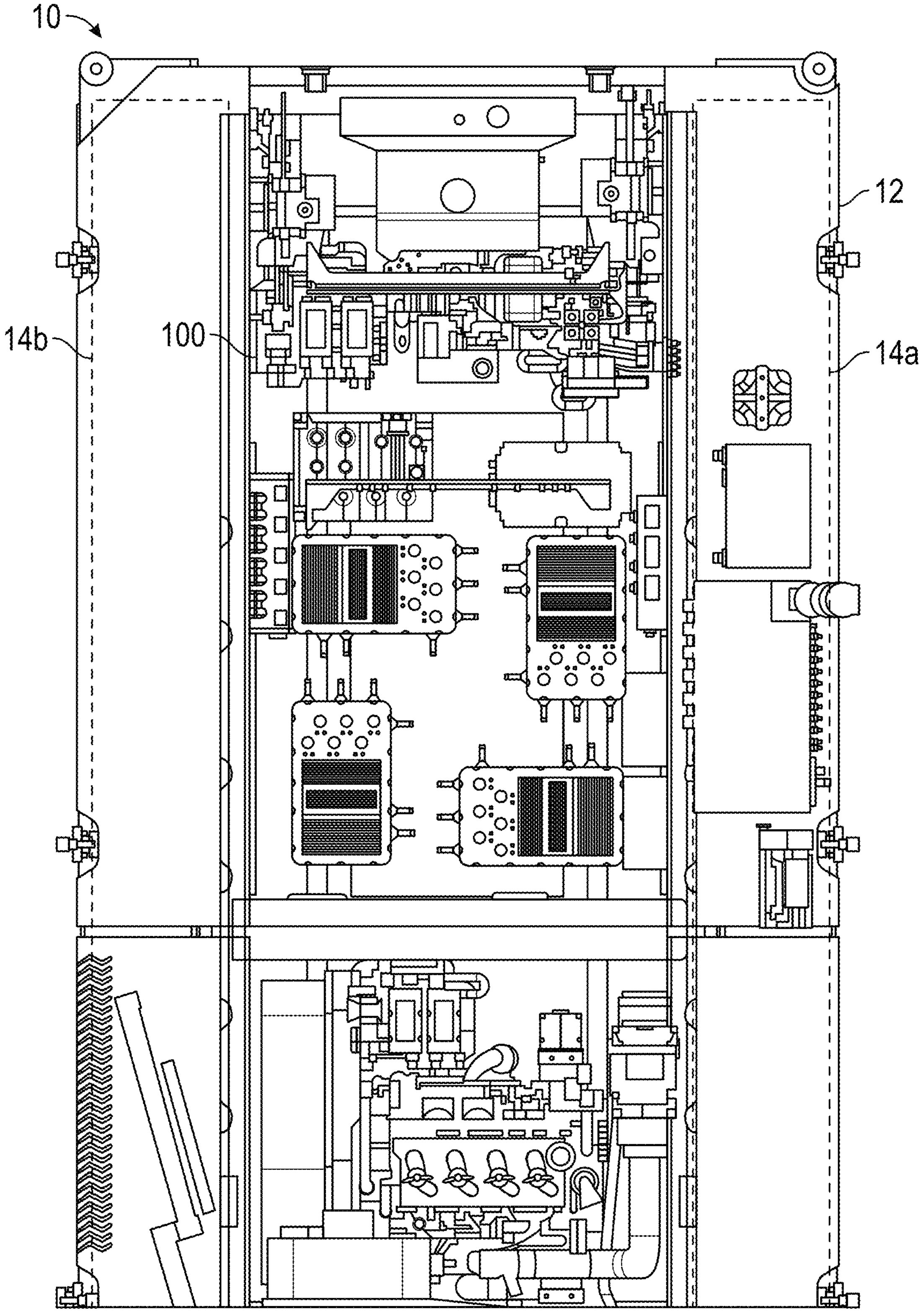
FIG. 2 is a top view of a rear portion of the vehicle of FIG. 1 including an electric drive system, according to some embodiments.
Figure 3:
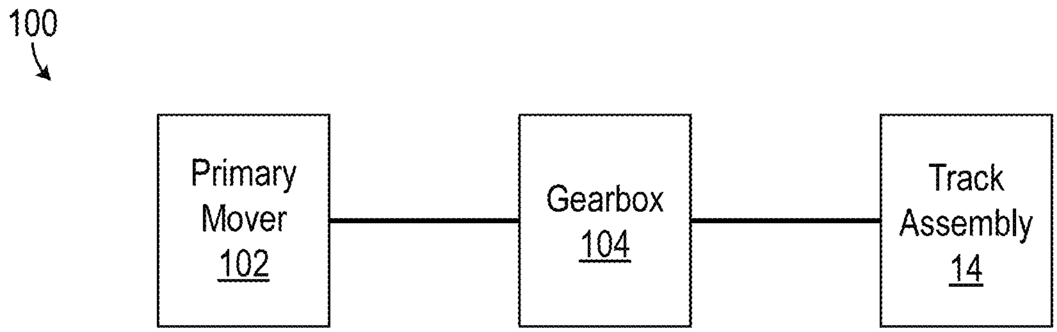
FIG. 3 is a block diagram of a driveline of the vehicle of FIG. 1, according to some embodiments.

Referring to FIGS. 2 and 3, the vehicle 10 includes a driveline 100 (e.g., a drive system) that is configured to drive one or more rollers, drums, etc., of the track assemblies 14 to thereby drive the tracks 18 and transport the vehicle 10. The vehicle 10 may include a separate drive system 100 for each of the track assembly 14*a* and the track assembly 14*b* and may operate the drivelines 100 at different speeds in order to perform steering or turning for the vehicle 10. The driveline 100 may be an electric drive system such that the vehicle 10 uses on-board electrical energy (e.g., batteries, capacitors, cells, energy store systems, etc.) to transport.

As shown in FIG. 3, the driveline 100 may include a primary mover 102 (e.g., an engine, an electric motor, etc.), a gearbox 104, and the track assemblies 14. The driveline 100 may include multiple primary movers 102 and gearboxes 104 in order to independently drive the track assembly 14*a* and the track assembly 14*b* at different rates or in different directions to perform turns or steering operations. The gearbox 104 is configured to receive output torque from the primary mover 102 and transfer torque to the driven rotatable elements of the track assemblies 14 to drive the tracks 18 for both transportation and steering of the vehicle 10.

Figure 4:
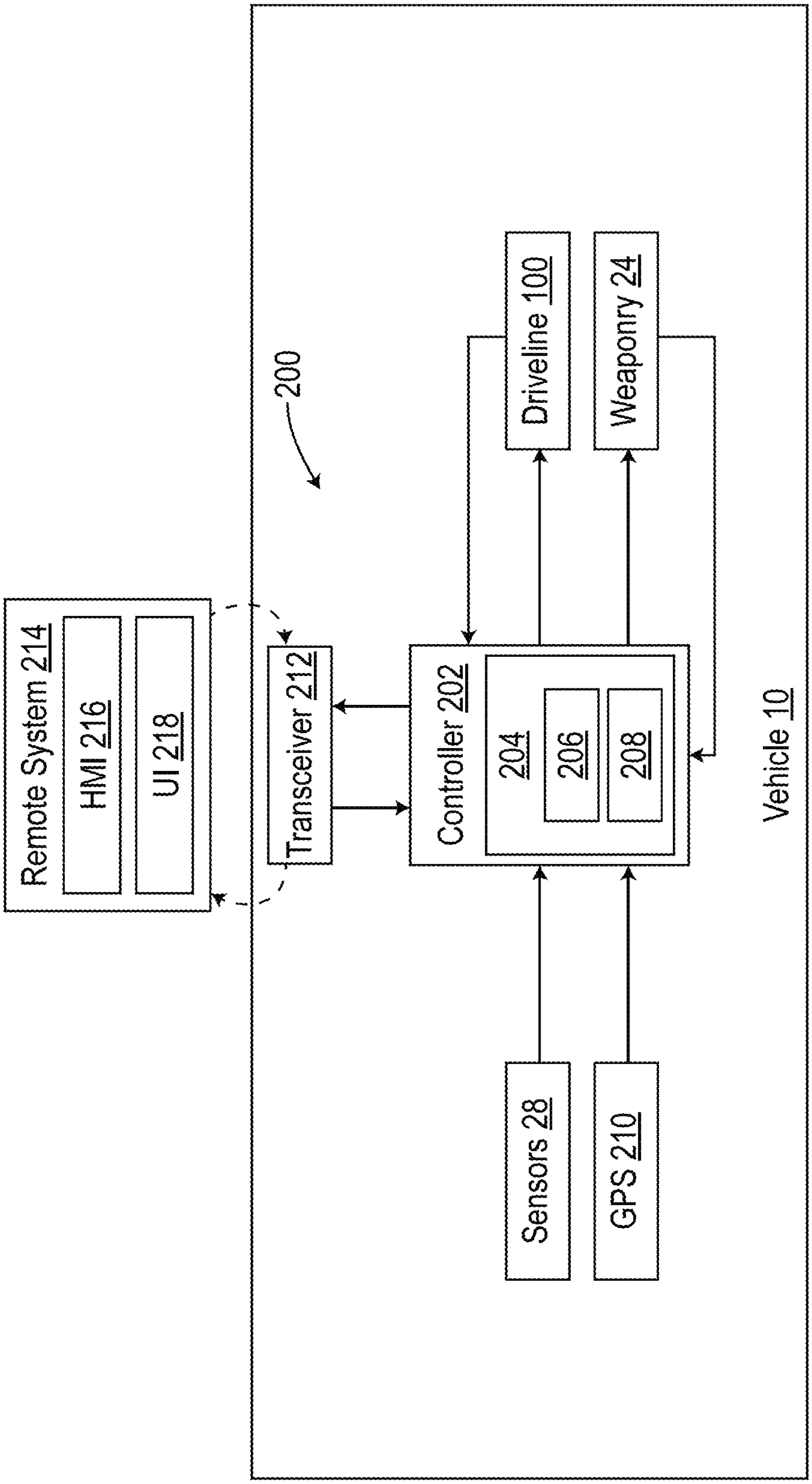
FIG. 4 is a block diagram of a control system for the vehicle of FIG. 1, according to some embodiments.

Referring to FIG. 4, the vehicle 10 may include or be a component of a control system 200. The control system 200 includes a controller 202, the sensors 28, a Global Positioning System ("GPS"), the driveline(s) 100, the weaponry 24, a transceiver 212, and a remote system 214. The controller 202 is configured to receive sensor data from the sensors 28 and a GPS location from the GPS 210. The controller 202 may use the sensor data to autonomously control operation of the driveline 100 and the weaponry 24. The controller 202 may also receive feedback from the driveline(s) 100 and the weaponry 24. The controller 202 may communicate with the remote system 214 via the transceiver 212, providing the sensor data, the GPS location, the feedback from the driveline 100, and the feedback from the weaponry 24. The remote system 214 includes a Human Machine Interface ("HI") 216 and a user interface ("UI") 218. The HMI 216 may provide various buttons, input devices, steering wheels, selectors, switches, etc., to obtain an input or requested command for the vehicle 10 from an operator. In some embodiments, the command is a direct command to operate the driveline 100 or the weaponry 24 such that the vehicle 10 is remotely controlled. In some embodiments, the command is a high level command to the vehicle 10 to implement one or more actions such that the vehicle 10 is semi-autonomously controlled.

The controller 202 may also provide any of the sensor data obtained from the sensors 28 (e.g., image data, IR data, FUR data, threat detection data, radar data, communications, etc.) to the remote system 214 via the transceiver 212. The UI 218 of the remote system 214 may display any of the sensor data, GPS location, or feedback provided to the remote system 214 by the controller 202. In some embodiments, the transceiver 212 of the vehicle 10 is configured to communicate with transceivers 212 of nearby vehicles 10 to form a mesh network. The controller 202 may receive commands from the remote system 214 and operate the driveline 100 and the weaponry 24 to implement the commands.

The controller 202 includes processing circuitry 204 including a processor 206 and memory 208. Processing circuitry 204 can be communicably connected with a communications interface of controller 202 such that processing circuitry 204 and the various components thereof can send and receive data via the communications interface. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to some embodiments, memory 208 is communicably connected to processor 206 via processing circuitry 204 and includes computer code for executing (e.g., by at least one of processing circuitry 204 or processor 206) one or more processes described herein.

The remote system 214 may be structurally similar to the controller 202 and can include processing circuitry, processors, memory, etc. The remote system 214 may be physically remote from the vehicle 10. The remote system 214 may represent a single processing unit or may include multiple processing units or servers that implement any of the processes or techniques described herein in a distributed manner.

Figure 5:
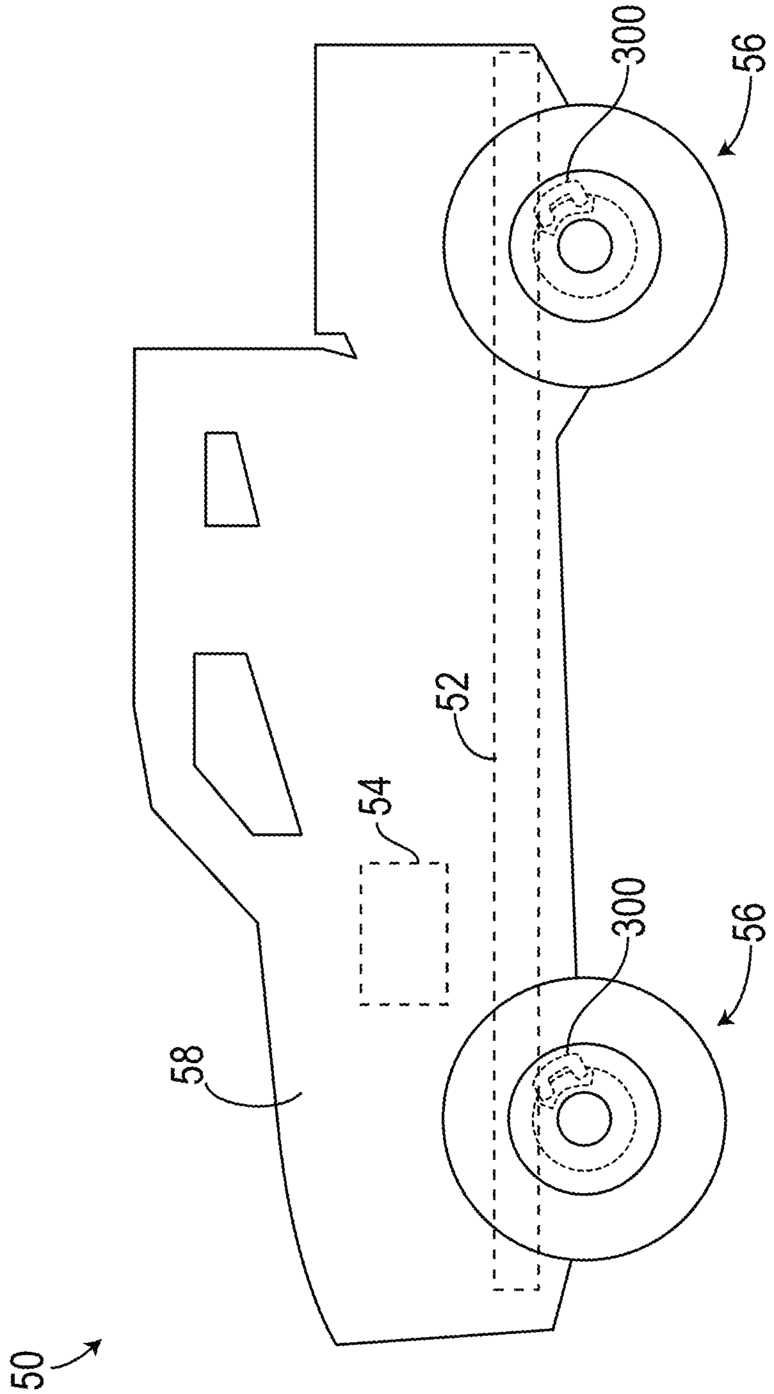
FIG. 5 is a side view of a vehicle equipped with a brake system, according to some embodiments.

According to the exemplary embodiment shown in FIG. 5, a vehicle 50 (e.g., a heavy duty vehicle, a commercial vehicle, a tank, a military vehicle, a truck, a machine, a boat, a hull, a rotational propulsive system, etc.) includes a body 58 (e.g., a shell, a cab, a cabin assembly, etc.), a chassis 52 (e.g., a frame, a hull, a carriage, etc.), tractive elements 56, and a primary mover 54 (e.g., a diesel engine, a gasoline engine, an internal combustion engine, an electric motor, etc.). The primary mover 54 and the body 58 can be supported by (e.g., fixedly coupled with) the chassis 52. In some embodiments, the primary mover 54 is coupled with the chassis (e.g., secured, fastened, or otherwise attached on the chassis 52). The primary mover 54 outputs mechanical energy in the form of torque (e.g., by driving a shaft to rotate), which can be transferred through a transmission or a driveline to transport the vehicle 50. In some embodiments, the primary mover 54 is configured to drive the tractive elements 56 to rotate to thereby transport the vehicle 50 along a ground surface. The vehicle 50 can also include a steering system that receives steering input from an operator and rotates two or more of the tractive elements 56 to indicate a turn. In some embodiments, the chassis 52, the body 58, and the primary mover 54 are supported by the tractive elements 56.

The vehicle 50 also includes one or more brake systems 300 that are positioned at the tractive elements 56 and configured to exert a braking force or torque to the tractive elements 56 to reduce a speed of the vehicle 50 (e.g., to bring the vehicle 50 to a complete stop), according to some embodiments. In some embodiments, the brake system 300 is configured to exert a torque in an opposite direction of a direction of rotation of the tractive elements 56. The brake systems 300 can include or be in communication with a controller or processing circuitry. In some embodiments, the vehicle 50 includes one or more brake systems 300 in a driveline of the vehicle 50, removed from the tractive elements 56, to thereby control or provide brake torque for multiple of the tractive elements 56.

It should be understood that while the brake system 300 as described herein is described as being a component or sub-system of the vehicle 50, the brake system 300 may also be applicable or usable with an industrial machine and function as a safety stop or brake, or be a component of a motion control system (e.g., on a lathe, a turret, etc.). The brake system 300 as described herein is also usable as a safety brake for a propeller shaft (e.g., of a ship). The brake system 300 can generally be used for any rotational propulsive element for which braking is desired. The brake system 300 can also be used with a linear machine or for linear braking.

Braking System

Overview

Figure 6:
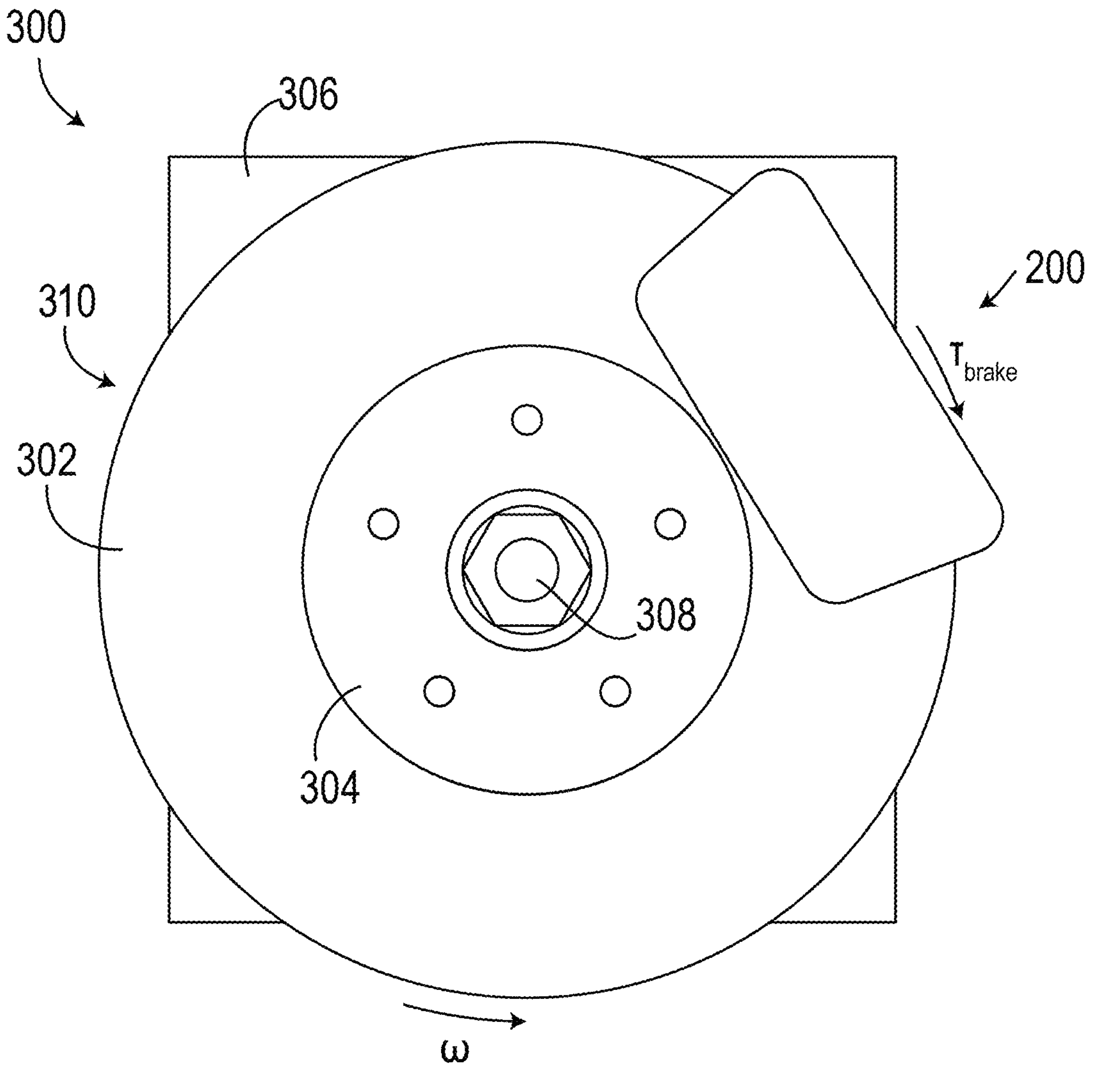
FIG. 6 is a front view of the brake system of FIG. 5 including a brake detection system, according to some embodiments.
Figure 7:
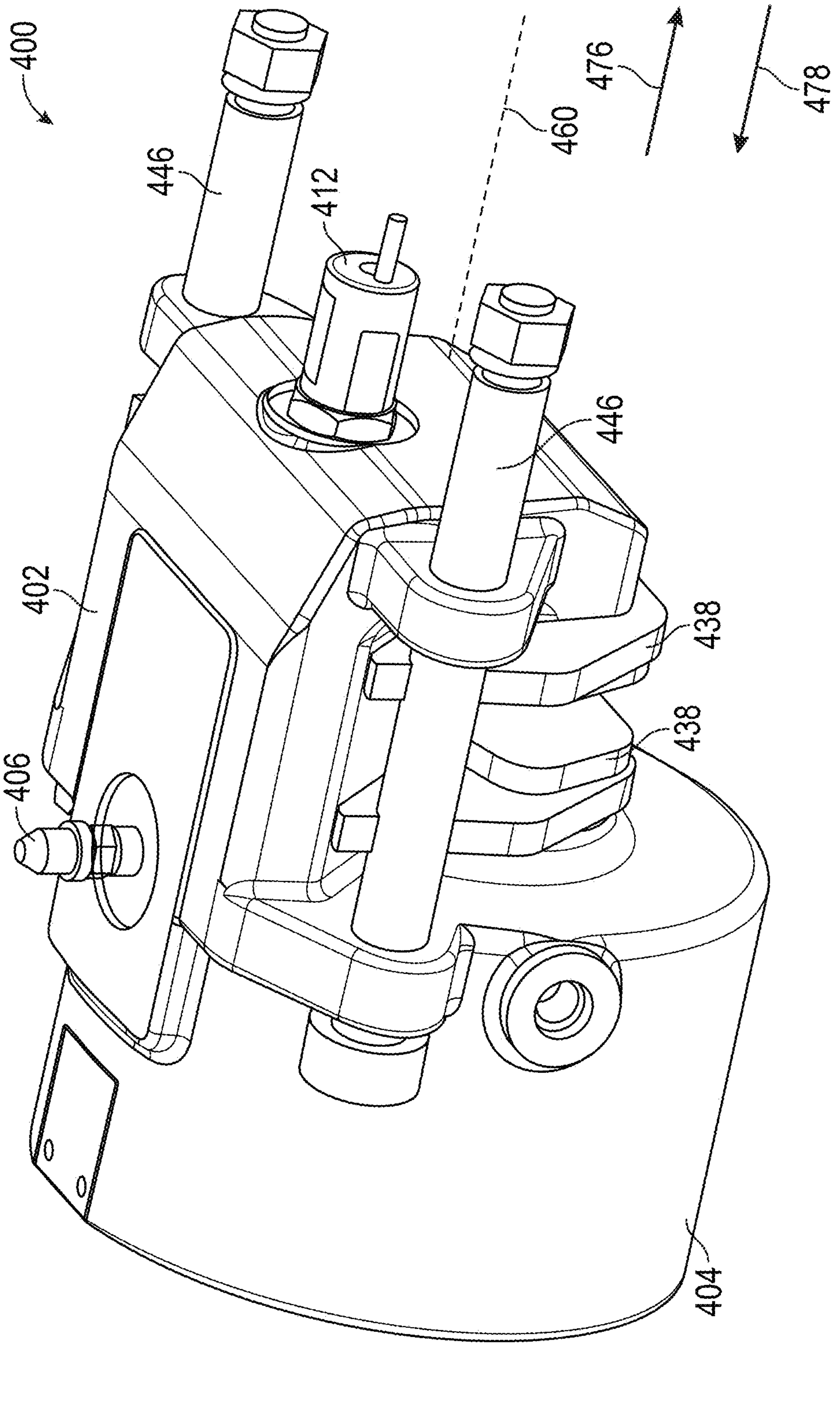
FIG. 7 is a perspective view of the brake detection system of FIG. 6, according to some embodiments.

Referring to FIG. 6, the brake system 300 includes a frame 306, an axle 308, and a rotor assembly 310. The rotor 310 includes a rotor hub 304 and a rotor flange 302 that are integrally formed with each other. The rotor hub 304 is configured to rotatably couple with an axle 308 that is driven by the primary mover 54. The rotor hub 304 is configured to couple with a hub of the vehicle 50. When fully assembled, the rotor assembly 310, the tractive element 56, and the axle 308 rotate in unison relative to the frame 306. The frame 306 can extend between the chassis 52 and the rotor assembly 310 to provide support for the rotor assembly 310.

The brake system 300 also includes a caliper system 400 (e.g., a brake caliper, a caliper assembly, a brake assembly, a brake, a caliper brake, etc.) that is fixedly coupled with the frame 306 so that the caliper system 400 does not rotate in unison with the tractive element 56 and the rotor assembly 310. The caliper system 400 is configured to exert a drag force, a brake force, a clamping force, a counter-torque, braking torque, etc., to slow the vehicle 50. In some embodiments, the caliper system 400 exerts a torque about an axis defined by the axle 308 in a direction opposite a direction of motion of the tractive element 56 and the rotor assembly 310. For example, the torque $\tau_{brak}e$ may oppose the direction of motion ω of the rotor assembly 310 as shown in FIG. 6.

Brake Caliper

Referring to FIGS. 7-11, the caliper system 400 includes a piston body 404 (e.g., a carriage, a frame, a body, a main portion, etc.) and a caliper body 402 (e.g., a carriage, a frame, a body, a secondary portion, etc.), according to some embodiments. The caliper system 400 also includes a pair of guide pins 446 (e.g., elongated members, rods, pins, cylinders, cylindrical members, tubular members, fasteners, etc.) disposed at opposite ends of the caliper body 402 and the piston body 404 (e.g., opposite radial ends of the caliper body 402 and the piston body 404). In some embodiments, the guide pins 446 are configured to provide a surface for translation of brake pads 438. The brake pads 438 can include both a planar or rear plate (e.g., a backing), and pad material disposed on the planar or rear plate. The brake pads 438 are positioned a space apart, shown as space 450. The rotor flange 302 is positioned between the brake pads 438 within the space 450 so that a piston assembly 426 (e.g., a translatable member, a reciprocating member, a shaft, etc.) of the caliper system 400 can operate to translate an inner one of the brake pads 438 towards the rotor flange 302 to thereby clamp the rotor flange 302 between the brake pads 438 (thereby resulting in $\tau_{brake}$). A distance 444 is defined between inwards facing surfaces of the pads 438, and a distance 442 is defined between inwards facing surfaces of members that the pads 438 are coupled to. A difference between the distance 442 and the distance 444 can indicate an amount of wear of the pads 438.

In some embodiments, the caliper system 400 does not include the guide pins 446 (e.g., in a dual or multi caliper system with opposing piston calipers). For example, the caliper body 402 may be fixed to the frame 306 and an opposing pistons may float. In some embodiments, one or more hydraulic and/or pneumatic circuits are positioned between inner volumes of piston assemblies that are positioned on either side of the rotor 310.

The caliper system 400 includes an inner volume 408 (e.g., an interior, a void, a space, an opening, a sealed inner volume, etc.) defined between a stationary member 454 (e.g., a frame member, a backing plate, a structural member, etc.) or one or more surfaces thereof, annularly inwards facing surfaces 409 of the caliper body 402 and/or the piston body 404, and a face 456 (e.g., a surface, a boundary, a periphery, etc.). The caliper system 400 also includes the piston assembly 426 that is configured to reciprocatingly translate between one end of the inner volume 408 and an opposite end of the inner volume 408. The piston assembly 426 divides the inner volume 408 into a first sub-volume 435 (e.g., a first chamber) and a second sub-volume 436 (e.g., a second chamber). The first sub-volume 435 is defined between a first side 430 of the piston assembly 426, the surfaces 409, and the stationary member 454. The second sub-volume 436 is defined between the piston assembly 426, the surfaces 409, and the face 456. The first sub-volume 435 and the second sub-volume 436 may be fluidly separate from each other and may have a variable volume. In some embodiments, decreases in the first sub-volume 435 directly result in increase in the second sub-volume 436 (due to translation of the piston assembly 426) and vice versa. The surfaces 409 also define an annular groove 468 within which a seal 470 is positioned. The seal 470 is configured to sealingly couple with, directly engage, contact, abut, etc., an outer surface 480 (e.g., a radially outer surface, an annular surface, etc.) of the piston assembly 426.

The caliper system 400 also includes a spring 452 (e.g., a resilient member, a tensile member, a compression spring, a biasing member, etc.) that is configured to bias or drive the piston assembly 426 to translate so that the brake pad 438 (e.g., an inner one of the brake pads 438) translates towards the other brake pad 438 (e.g., towards the rotor flange 302 or into engagement with the rotor flange 302) to clamp onto the rotor flange 302. The spring 452 can be positioned within the first sub-volume 435 and engages a side or surface of the piston assembly 426 at one end, and engages (e.g., directly contacts, abuts, etc.) a corresponding portion, surface, or face of the stationary member 454. In this way, the piston assembly 426 is translatable or movable within the inner volume 408 relative to the caliper body 402 or the piston body 404. The piston assembly 426 is biased into translation so that the brake pads 438 are most proximate each other by the spring 452. The spring 452 and the first sub-volume 435 may both have an annular or ring-shape.

In some embodiments, the piston assembly 426 includes a central portion (e.g., a shaft, a stem, an elongated member, a piston etc.), shown as central shaft 432 that extends through an opening 464 (e.g., an aperture, a window, a bore, a through-hole, a hole, etc.) in a wall 462 that defines the face 456. The inner brake pad 438 is coupled with, mounted on, attached to, secured to, etc., an end of the central shaft 432. The central shaft 432 may extend through the opening 464 and sealingly couple with an inwards facing surface of the wall 462 that defines the opening 464 (e.g., an aperture, a hole, a bore, a window, etc.), according to some embodiments. In some embodiments, the wall 462 includes a seal 466 (e.g., an O-ring) that is positioned within an annular groove 484 of the wall 462 and is configured to engage with an externally facing surface 482 (e.g., an outer annular surface, a radially outwards surface, an exterior surface, etc.) of the central shaft 432 so that the central shaft 432 can translate (e.g., along the axis 460, in a direction along the axis 460) in either direction while a seal is formed between the central shaft 432 and the wall 462. In some embodiments, the externally facing surface 482 and the surface 480 have different diameters, with the surface 480 having a greater diameter than the externally facing surface 482.

Referring still to FIGS. 7-11, the second sub-volume 436 may be filled with a fluid (e.g., a hydraulic fluid). The second sub-volume 436 may store a variable amount of fluid, and the amount of fluid that is present in the second sub-volume 436 may be controlled by a pump 434 (e.g., a fluid pump). In some embodiments, the pump 434 is fluidly coupled with the second sub-volume 436 via an accumulator and a pressure control valve. In some embodiments, the second sub-volume 436 is accessible through a coupler 406 (e.g., a valve, an inlet, an opening, a conduit, etc.) that fluidly couples with the second sub-volume 436 through a channel 474 (e.g., an opening, a flow path, etc.) in the piston body 404 and/or the caliper body 402. In some embodiments, a brake line 472 (e.g., a hose, a conduit, a tubular member, a pipe, etc.) is fluidly coupled with the second sub-volume 436 through the coupler 406 and the channel 474.

The pump 434 may be operated (e.g., by a controller) to drive or pump fluid (e.g., via an accumulator and/or a pressure control valve) into the second sub-volume 436 to thereby drive the piston assembly 426 to translate in a direction that opposes a direction of force applied by the spring 452. In some embodiments, increasing the amount of fluid in the second sub-volume 436 causes a pressure within the second sub-volume 436 to increase, thereby causing the piston assembly 426 to translate towards the spring 452 (e.g., such that the second sub-volume 436 increases in size and the first sub-volume 435 decreases in size) once the pressure within the second sub-volume 436 overcomes the force applied on the piston assembly 426 by the spring 452.

In some embodiments, the caliper system 400 also includes a sensor 440 that is configured to measure a pressure within the second sub-volume 436. The sensor 440 may be configured to measure static pressure of the fluid within the second sub-volume 436. In some embodiments, the sensor 440 is configured to measure pressure along the brake line 472. The pump 434 may be operated in response to operation of a brake pedal to provide braking as desired by an operator. In some embodiments, pressing the brake pedal causes the pump 434 to operate to decrease the pressure within the second sub-volume 436, thereby allowing the piston assembly 426 to translate in a direction of the force exerted by the spring 452 (e.g., $F_{spring}$), and thereby causing increased braking (directly proportional to a decrease in an amount of force $F_{pressure}$ that is exerted due to the pressure within the second sub-volume 436).

The piston assembly 426 is capable of translating in either direction along axis 460. For example, the piston assembly 426 may translate in a clamping direction 476 (e.g., an extension direction, a first direction, etc.) or a releasing direction 478 (e.g., a retraction direction, a second direction, etc.). In some embodiments, translation of the piston assembly 426 (after the inner brake pad 438 has contacted the rotor flange 302) in the clamping direction 476 is caused by decreased pressure in the second sub-volume 436 and results in increased braking. Similarly, translation of the piston assembly 426 (while the inner brake pad 438 is contacting the rotor flange 302) in the releasing direction 478 is caused by increased pressure in the second sub-volume 436 and results in decreased braking. The face 456 and a surface of the stationary member 454 may define positional boundaries (e.g., translational boundaries, limits, etc.) of the piston assembly 426 within the inner volume 408.

Figure 8:
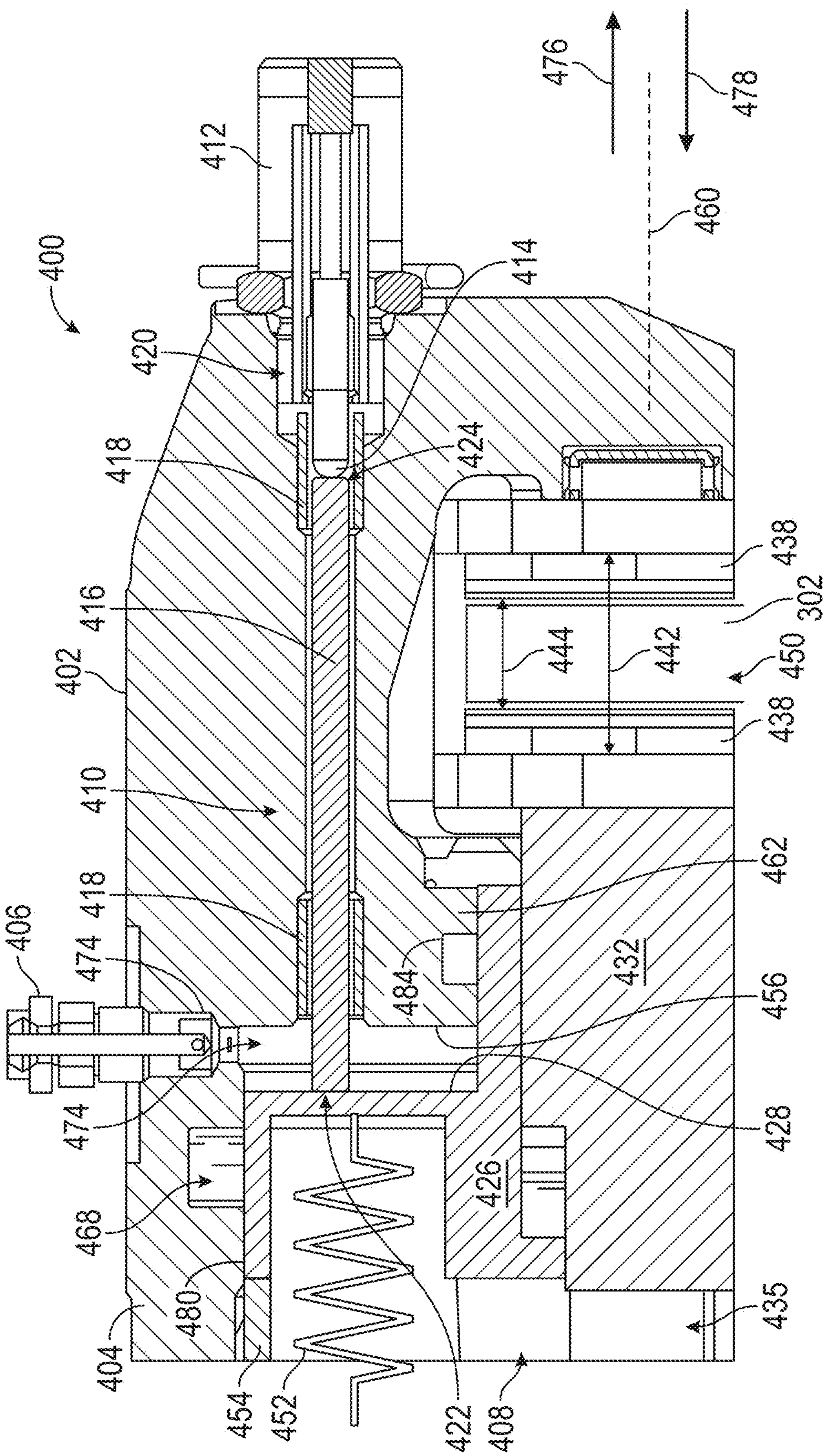
FIG. 8 is a side sectional view of a portion of the brake detection system of FIG. 7 according to some embodiments.
Figure 9:
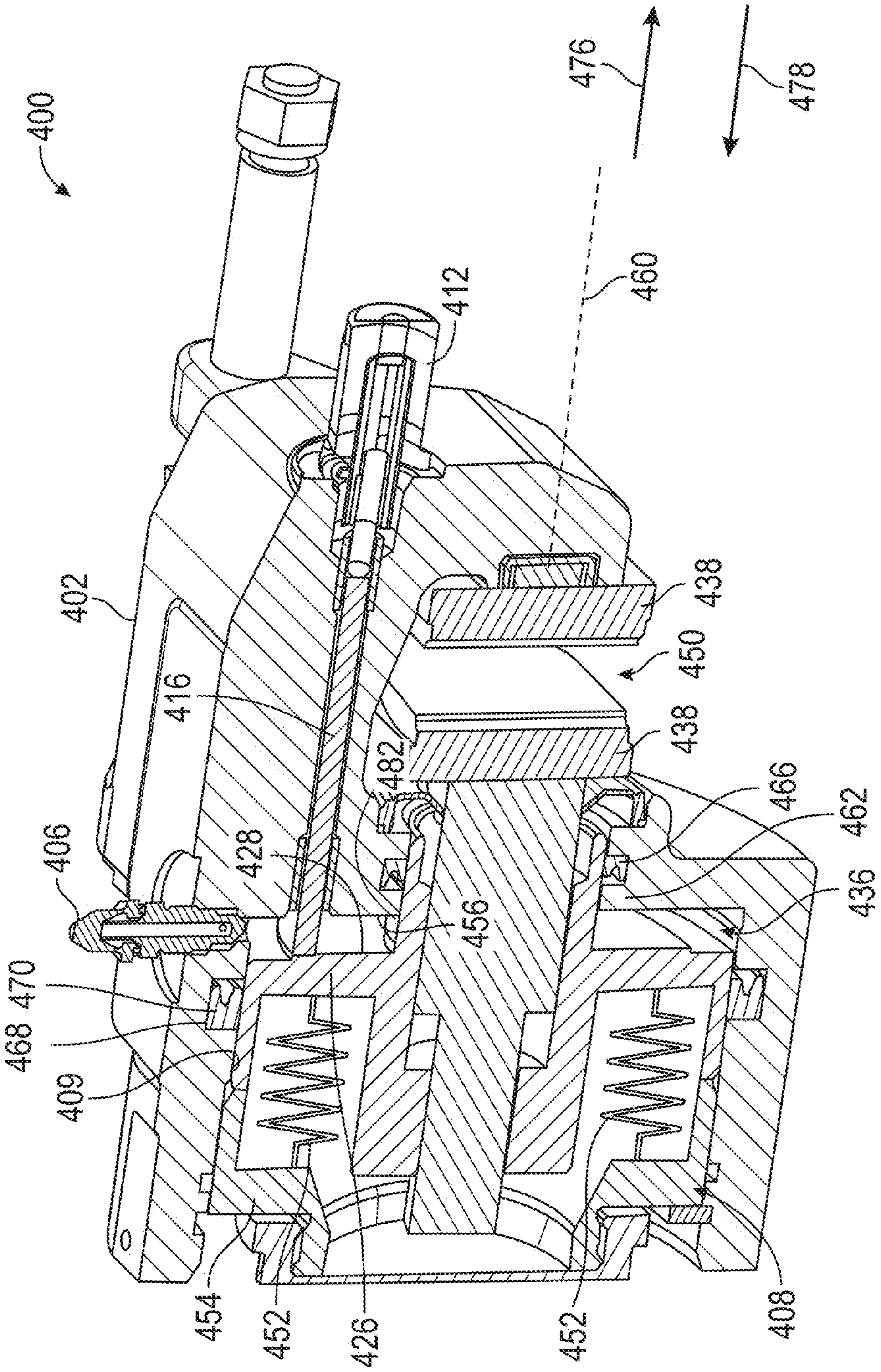
FIG. 9 is a perspective sectional view of the portion of the brake detection system of FIG. 7, according to some embodiments.
Figure 10:
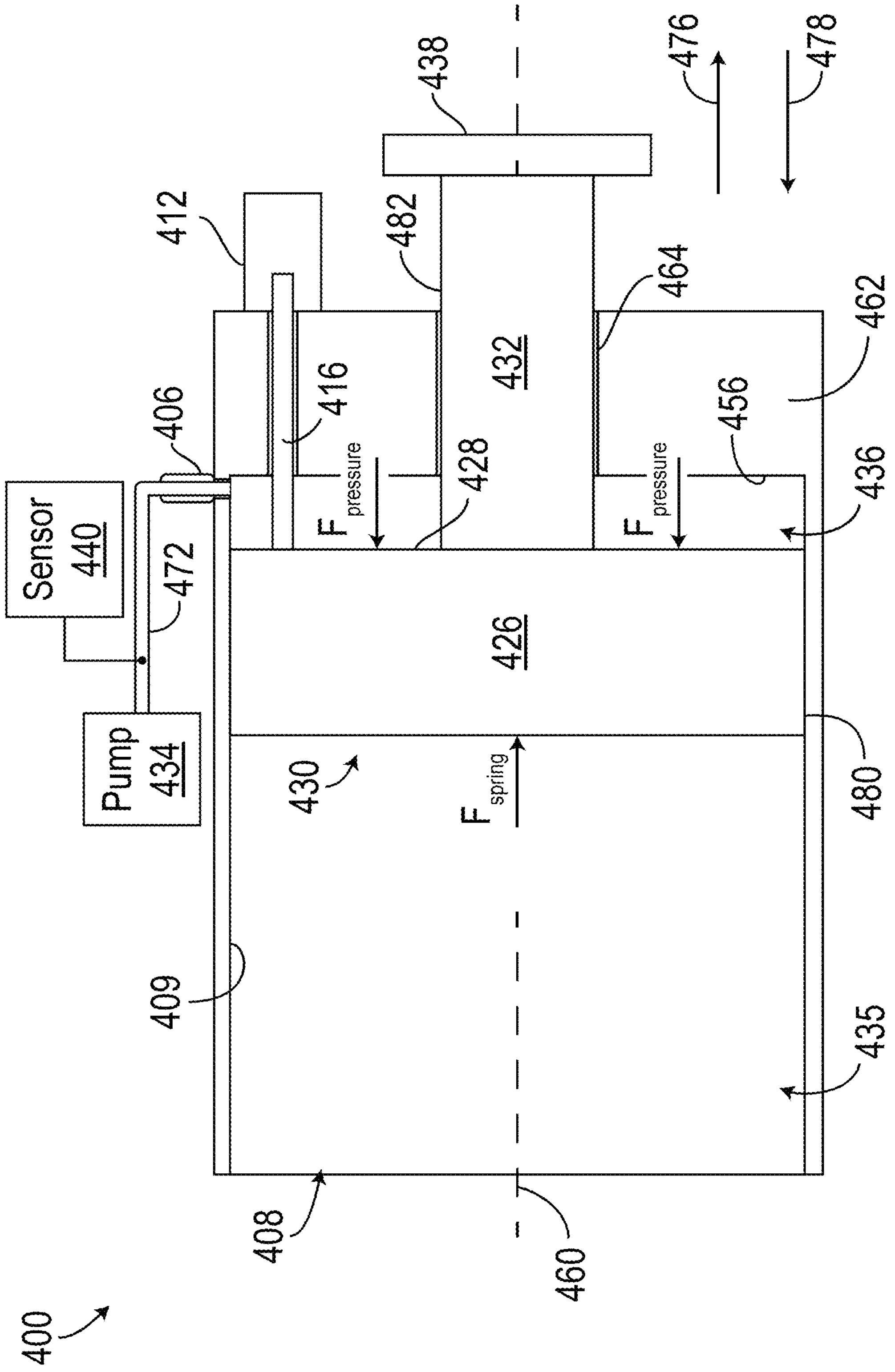
FIG. 10 is a diagram illustrating the brake detection system of FIG. 7, according to some embodiments.

Referring particularly to FIGS. 8-10, the caliper system 400 includes a positional sensor 412 (e.g., a linear potentiometer, a distance sensor, a position sensor, a movement sensor, a detector, a sensor, etc.). The caliper system 400 also includes an elongated member 416 (e.g., a pin, a rod, a push rod, an elongated member, a cylinder, a movable member, a driven member, a translatable member, etc.) that extends through a bore 410 of the caliper body 402. In some embodiments, the elongated member 416 includes a first end 422 and a second end 424 that is opposite the first end 422. In some embodiments, the first end 422 is proximate the piston assembly 426, or more specifically, abuts, contacts, or directly engages a face 428 of the piston assembly 426 as the piston assembly 426 translates in the clamping direction 476. In some embodiments, the first end 422 is attached to the face 428 of the piston assembly 426 so that translation or displacement of the piston assembly 426 directly results in translation or displacement of the elongated member 416. In some embodiments, the first end 422 is biased or held in contact with the face 428 of the piston assembly 426 by a pre-loaded spring of the positional sensor 412.

In some embodiments, the positional sensor 412 includes a sensing member 414 that is positioned within an inner volume 420 of the caliper body 402. The inner volume 420 provides a space for internal components of the positional sensor 412 and allows the positional sensor 412 to access the bore 410.

One or more bushings 418 are positioned within the bore 410 and are configured to support and slidably couple with the elongated member 416. The bushings 418 (e.g., sleeves, cylindrical members, tubular members, etc.) facilitate proper alignment and translation of the elongated member 416 so that the elongated member 416 translates with movement of the piston assembly 426 and the positional sensor 412 detects or measures the degree to which the piston assembly 426 moves. The positional sensor 412 can be configured to measure a current position or an amount of translation or displacement of the piston assembly 426 in either direction along the axis 460. Advantageously, sensor feedback from the positional sensor 412 can be used to determine a degree of wear of the brake pads 438, malfunctions of the caliper system 400, and/or a current relationship between pressure of the second sub-volume 436 and the position of the piston assembly 426 or braking amount as described in greater detail below. In the configuration shown in FIGS. 8-10, translation of the piston assembly 426 in the clamping direction 476 causes the elongated member 416 to drive towards the positional sensor 412. Similarly, translation of the piston assembly 426 in the releasing direction 478 causes the elongated member 416 to translate away from the positional sensor 412.

Figure 11:
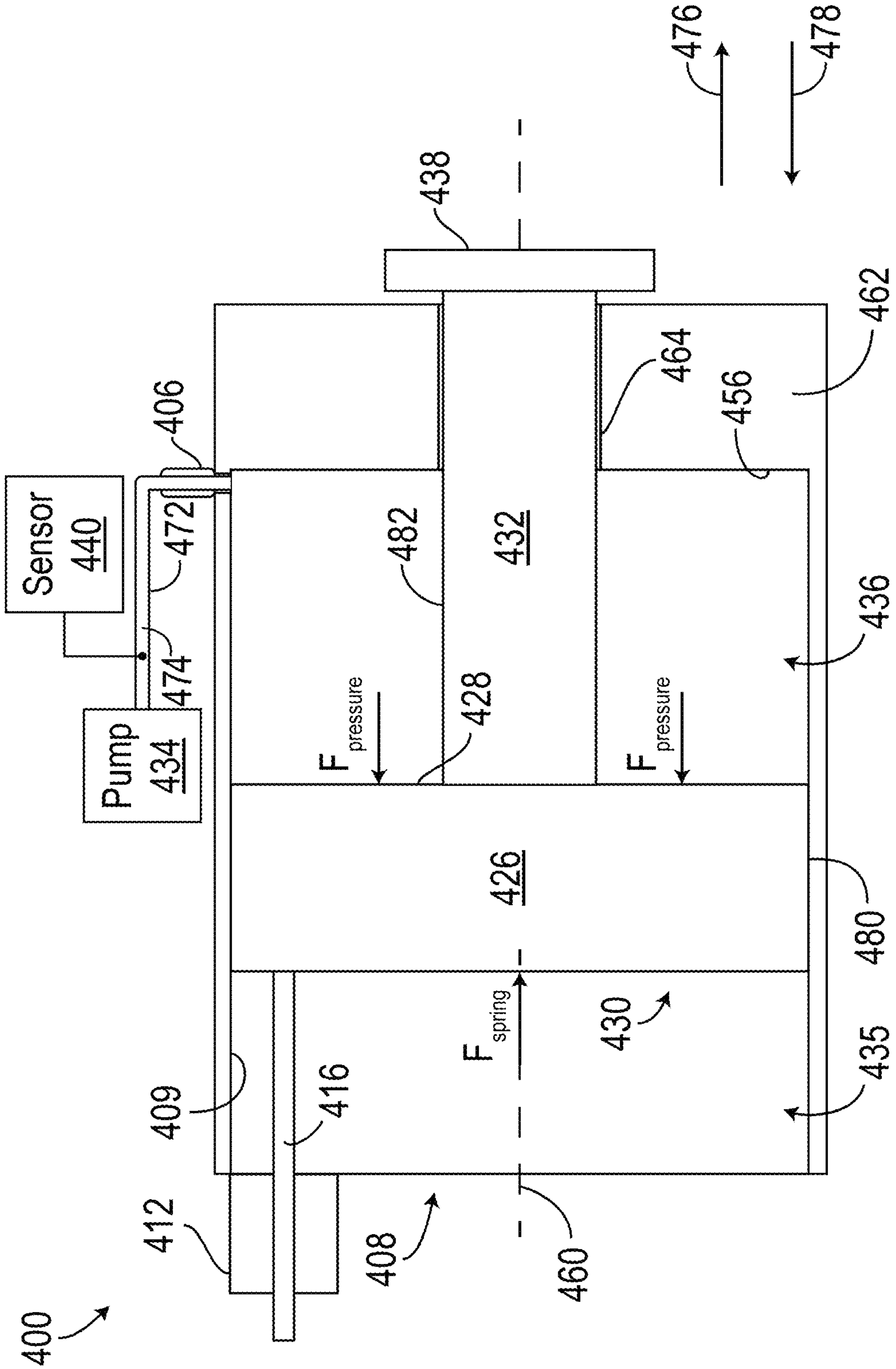
FIG. 11 is a diagram illustrating the brake detection system of FIG. 7, according to some embodiments.

Referring to FIG. 11, the caliper system 400 is shown according to another embodiment. The caliper system 400 as shown in FIG. 11 includes the positional sensor 412 but positioned on a rear side 430 of the piston assembly 426. The elongated member 416 may be coupled with or secured to the rear side 430 of the piston assembly 426. The rear side 430 is a side, surface, or portion of the piston assembly 426 that is opposite the face 428. The rear side 430 is also the side of the piston assembly 426 that faces the stationary member 454. The positional sensor 412 may be positioned or coupled with the stationary member 454. The positional sensor 412 generates signals responsive to translation of the elongated member 416 which is attached with the piston assembly 426 on the first side 430 of the piston assembly 426. Translation of the piston assembly 426 in the clamping direction 476 causes the elongated member 416 to translate away from the positional sensor 412, and translation of the piston assembly 426 in the releasing direction 478 causes the elongated member 416 to translate towards the positional sensor 412.

It should be understood that while FIGS. 7-11 show at least two different embodiments or configurations of the elongated member 416 relative to the piston assembly 426, the positional sensor 412 may otherwise be configured to detect movement (e.g., position, displacement, etc., of the piston assembly 426. For example the positional sensor 412 may be an infrared or light emitting detector positioned within the first sub-volume 435 or the second sub-volume 436 and configured to thereby measure a distance of the piston assembly 426 or a particular portion of the piston assembly 426 relative to the face 456, the stationary member 454, etc. (e.g., without being in physical contact with the piston assembly 426). Similarly, the positional sensor 412 may be positioned within the wall 462 and configured to measure movement of the piston assembly 426 (e.g., movement of the central shaft 432). In some embodiments, a translatable or rotatable member is fixedly or rotatably coupled with the piston assembly 426 such that translational movement of the piston assembly 426 in either direction is transferred into translational or rotational motion of the translatable or rotatable member. The amount of translation or rotation of the translatable or rotatable member can be measured by the positional sensor 412 and used to detect the position, and/or the displacement of the piston assembly 426.

Control System

Figure 12:
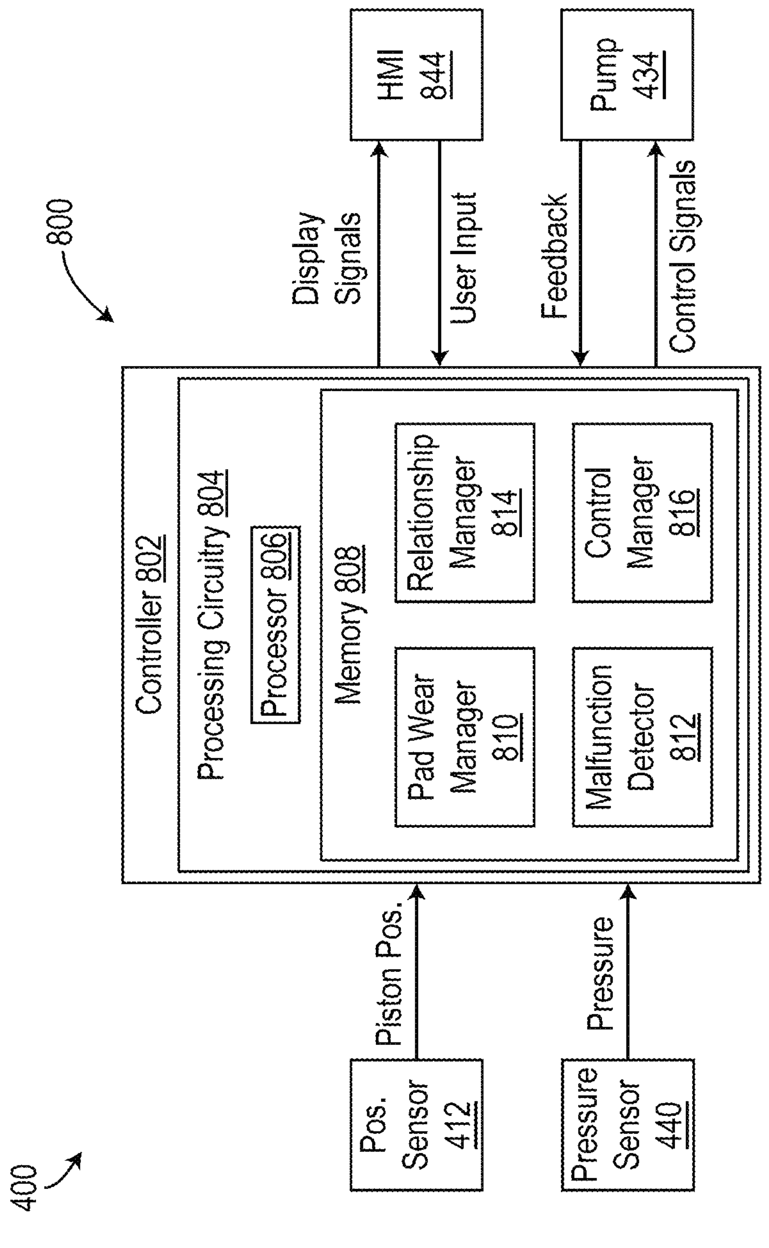
FIG. 12 is a block diagram of a control system of the brake system of FIG. 5, according to some embodiments.

Referring to FIG. 12, a control system 800 for the caliper system 400 includes a controller 802, the positional sensor 412, the pressure sensor 440, a human machine interface (HMI) 844, and the pump 434, according to some embodiments. In some embodiments, the controller 802 is configured to obtain position data (e.g., the piston position) from the positional sensor 412, and a current pressure from the pressure sensor 440. The controller 802 can be configured to use the piston position or displacement provided by the positional sensor 412 and the pressure provided by the pressure sensor 440 to determine a relationship between the piston position and the pressure (e.g., the pressure in the second sub-volume 436), to determine a pressure at which the brake pads 438 first engage the rotor flange 302, to identify a degree of pad wear of the brake pads 438, and/or to identify malfunctions of the caliper system 400. In some embodiments, the HMI 844 is not used and is therefore optional.

As shown in FIG. 12, the controller 802 includes processing circuitry 804, a processor 806, and memory 808. Processing circuitry 804 can be communicably connected to the communications interface such that processing circuitry 804 and the various components thereof can send and receive data via the communications interface. Processor 806 can be implemented as a general purpose processor, an application specific integrated circuit (ASIC), one or more field programmable gate arrays (FPGAs), a group of processing components, or other suitable electronic processing components.

Memory 808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 808 can be or include volatile memory or non-volatile memory. Memory 808 can include database components, object code components, script components, or any other type of information structure for supporting the various activities and information structures described in the present application. According to some embodiments, memory 808 is communicably connected to processor 806 via processing circuitry 804 and includes computer code for executing (e.g., by processing circuitry 804 and/or processor 806) one or more processes described herein.

In some embodiments, controller 802 is implemented within a single computer (e.g., one server, one housing, etc.). In various other embodiments, the functionality of the controller 802 can be distributed across multiple servers or computers (e.g., that can exist in distributed locations).

Pad Wear

Figure 14:
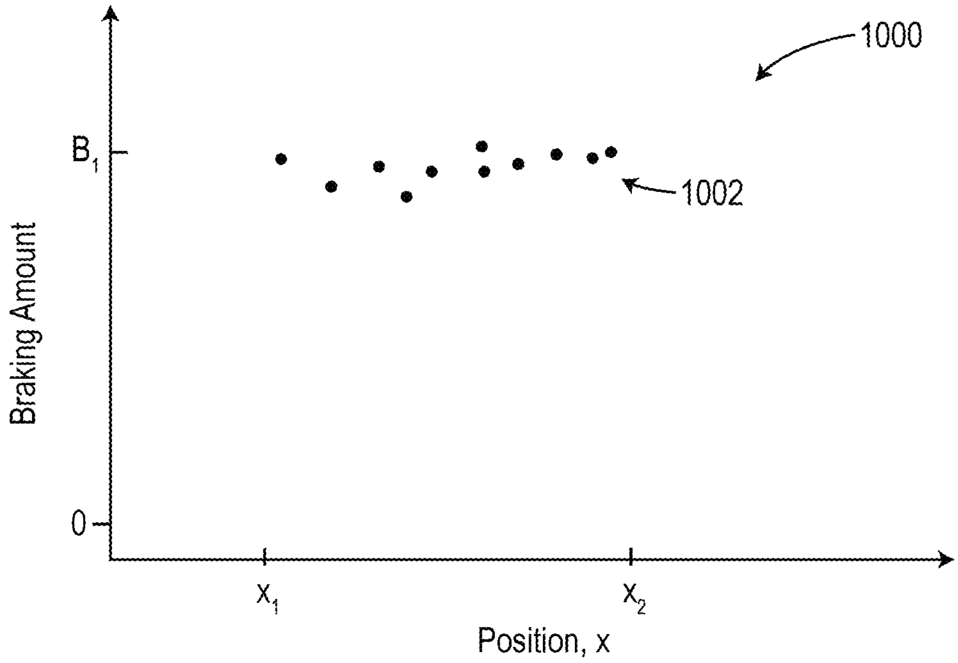
FIG. 14 is a graph illustrating a relationship between braking amount and position over time, according to some embodiments.
Figure 15:
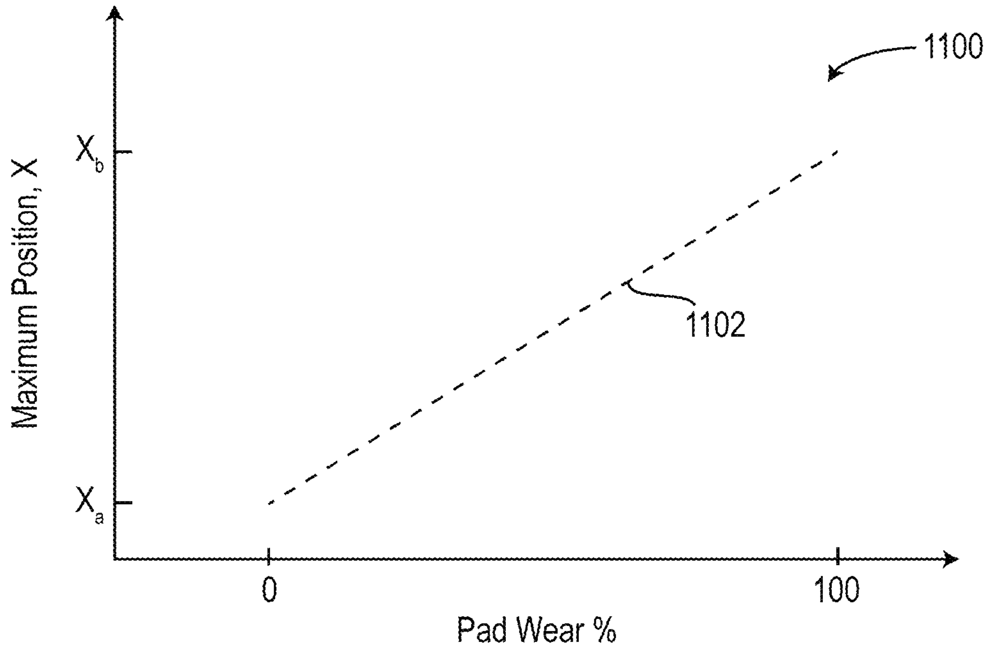
FIG. 15 is a graph illustrating a relationship between a maximum position of a brake piston and an amount of wear of brake pads, according to some embodiments.

Referring to FIGS. 12 and 14-15, the controller 802 is configured to identify, based on the piston position provided by the positional sensor 412, a degree or an amount of wear of the brake pads 438, according to some embodiments. In some embodiments, the controller 802 (e.g., the memory 808) includes a pad wear manager 810. The pad wear manager 810 is configured to obtain the piston position from the positional sensor 412 and determine, based on the piston position, the pad wear (e.g., an amount of wear, a degree of wear, an amount of pad remaining, etc.). In some embodiments, the pad wear manager 810 uses a known or predetermined relationship or function, and uses the piston position provided by the positional sensor 412 as an input to the relationship or function to determine pad wear status of the brake pads 438.

Referring particularly to FIG. 14, a graph 1000 illustrates how wearing of the brake pads 438 over time affects operation of the caliper system 400, according to some embodiments. The graph 1000 illustrates a position of the piston assembly 426 (the X-axis) required to achieve a desired (e.g., a specific or maximum) amount of braking (e.g., braking force, braking torque, etc.) (the Y-axis). For example, when the brake pads 438 are fresh and have not undergone substantial wear, the piston assembly 426 may only need to be translated to the position $x_1$ with a corresponding pressure to achieve the desired amount of braking $B_1$. However, as illustrated by data 1002, over time the piston assembly 426 may need to be translated further (e.g., up to the position $x_2$) to achieve the same desired amount of braking $B_2$ due to the wearing of the brake pads 438 and the decreased thickness of the brake pads 438. In order to compensate for the decreased thickness of the brake pads 438, the piston assembly 426 needs to be translated further (e.g., increasing an amount of displacement of the piston assembly 426 in the direction 476) to achieve the same amount of braking.

Referring particularly to FIGS. 15 and 12, a graph 1100 illustrates a relationship 1102 that is usable by the pad wear manager 810 to detect or determine an amount of pad wear (e.g., pad wear %) based on a current position of the piston assembly 426 as provided by the positional sensor 412, according to some embodiments. In some embodiments, the Y-axis of the graph 1100 illustrates a maximum position of the piston assembly 426 (e.g., in the clamping direction 476). In some embodiments, the maximum position of the piston assembly 426 indicates a position of the piston assembly 426 or a reading of the positional sensor 412 when the brake pads 438 are in contact with the rotor flange 302 (e.g., when the second sub-volume 436 is depressurized).

The relationship 1102 can be used to determine the pad wear (e.g., an amount or percent of pad wear) as a function of the maximum position. The maximum position is the sensor reading of the positional sensor 412 when the piston assembly 426 is translated in the clamping direction 476 a maximum amount (e.g., until the brake pads 438 are in contact with the rotor flange 302. The maximum position can be identified when changes in the operation of the pump 434 or changes in the pressure of the second sub-volume 436 do not result in any additional translation of the piston assembly 426 in the clamping direction 476. For example, the controller 802, or more particularly, the pad wear manager 810, may monitor the pressure feedback from the pressure sensor 440 as the pump 434 is operated to translate the piston assembly 426 (e.g., to decrease the pressure in the second sub-volume 436) in the clamping direction 476. The controller 802, or more particularly, the pad wear manager 810 may also monitor the sensor feedback provided by the positional sensor 412 while the pump 434 operates. Once the pressure or the operation of the pump 434 continues to change but the piston assembly 426 stops translating in the clamping direction 476, the pad wear manager 810 may determine that the piston assembly 426 is at the maximum position (e.g., a maximum clamp position).

The pad wear manager 810 uses the maximum position of the piston assembly 426 and a function, relationship, equation, which is visualized by the relationship 1102, to determine the amount of pad wear. In some embodiments, the relationship 1102 is a linear relationship as shown. In other embodiments, the relationship 1102 is non-linear.

The relationship 1102 can be determined based on known positions of the piston assembly 426 for different pad wear amounts. For example, when the brake pads 438 are new and have not undergone any significant wear, a maximum position $X_a$ of the piston assembly 426 may be associated with 0% pad wear. In some embodiments, the relationship 1102 is determined by the pad wear manager 810 based on the initial maximum position $X_a$ of the piston assembly 426 when the brake pads 438 are fresh and unworn, and based on a known thickness of the brake pads 438. For example, the pad wear manager 810 can obtain, from the positional sensor 412, the initial maximum position $X_a$, the pad wear manager 810 can determine a second maximum position, $X_b$, when the brake pads 438 are completely worn (e.g., 100% worn) by adding the known thickness of the brake pads 438 (e.g., $X_b - X_a + \Delta X_{thickness}$ where $\Delta X_{thickness}$ is the known thickness of the brake pads 438) since decreased thickness of the brake pads 438 due to wearing, will result in a proportional increase in the maximum position $X_b$ (e.g., the piston assembly 426 must be translated further in the clamping direction 476 to make up for the worn or thinner brake pads 438). The points [0, $X_a$] and [100, $X_b$] can be used to determine the relationship 1102 (e.g., by performing a linear regression on the points [0, $X_a$] and [100, $X_b$]).

In some embodiments, the pad wear manager 810 stores and uses a predetermined relationship (e.g., a function, an equation, a graph, a table, etc.) to determine the pad wear amount given a current value of the maximum position X of the piston assembly 426 (e.g., X). The pad wear manager 810 is configured to use the predetermined relationship and the maximum position of the piston assembly 426 to determine the pad wear, according to some embodiments.

In this way, the pad wear manager 810 can calculate, determine, detect, estimate, etc., a pad wear percent (e.g., an amount or percentage of the brake pads 438 that has worn) of the brake pads 438 by using either a relationship that is determined by the pad wear manager 810, or stored in the memory 808 of the controller 802. In some embodiments, the pad wear manager 810 is also configured to determine the amount of pad that is remaining on the brake pads 438. The amount of pad that is remaining may be a distance (e.g., inches, centimeters, etc.) or a percent of a total thickness of the pads when the brake pads 438 are fresh (e.g., 50% remaining, 30% remaining, etc.).

Figure 17:
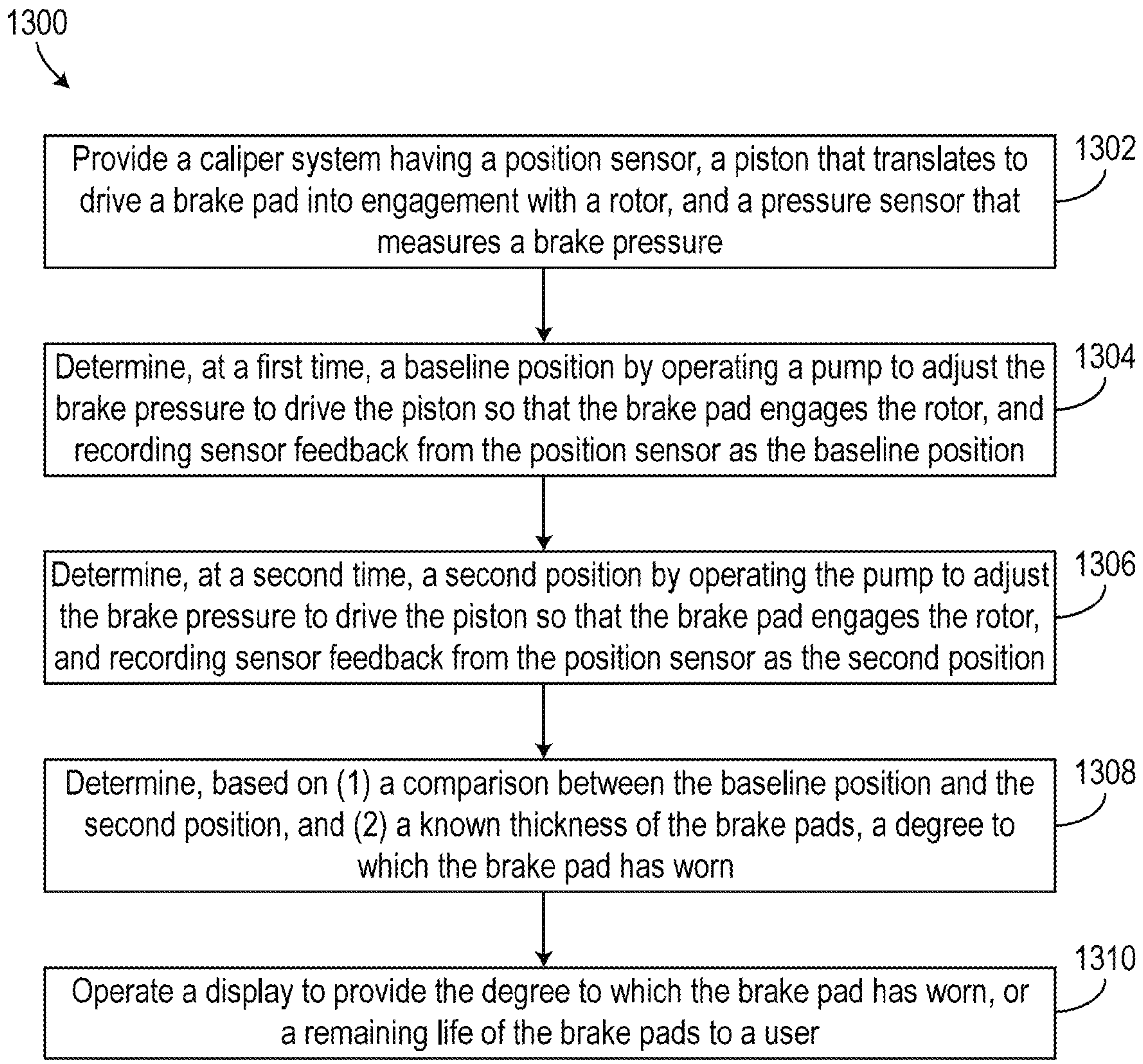
FIG. 17 is a flow diagram of a process for determining an amount of wear of brake pads, according to some embodiments.

Referring to FIG. 17, a process 1300 for determining an amount of wear of a brake pad or an amount of brake pad remaining includes steps 1302-1310, according to some embodiments. The process 1300 may be performed by the controller 802 or by the caliper system 400. In some embodiments, one or more steps of the process 1300 are performed intermittently over a life span of the brake pads 438. For example, portions of the process 1300 can be performed when the brake pads 438 are first installed or replaced, and portions of the process 1300 may be repeatedly performed throughout a lifetime of the brake pads 438 until the brake pads 438 are replaced.

Referring still to FIG. 17, the process 1300 includes providing a caliper system having a position sensor, a piston that translates to drive a brake pad into engagement with a rotor, and a pressure sensor that measures a brake pressure (step 1302), according to some embodiments. In some embodiments, the caliper system is the caliper system 400. The caliper system 400 can include a piston that is driven or bias to translate such that the brake pads engage the rotor by a spring, and driven in an opposite direction by pressurization of a chamber with brake fluid. In this way, operation to decrease the brake pressure results in increased braking whereas operation to increase the brake pressure results in decreased braking.

The process 1300 also includes determining, at a first time, a baseline position by operating a pump to adjust the brake pressure to drive the piston so that the brake pad engages the rotor, and recording sensor feedback from the position sensor as the baseline position (step 1304), according to some embodiments. In some embodiments, the baseline position is the feedback from the position sensor when the brake pads first engage the rotor. In some embodiments, the baseline position indicates an expected amount or degree of extension of the piston when the brake pads are fresh or unworn. In some embodiments, step 1304 is performed by the pad wear manager 810 based on sensor feedback provided by the positional sensor 412 and/or the pressure sensor 440. For example, the pad wear manager 810 may monitor changes in the pressure provided by the pressure sensor 440 as the caliper system is operated to perform a braking operation and, once the piston position provided by the positional sensor 412 stops changing while the pressure is still changing, identify that the position of the piston at which the piston stops moving but the pressure continues to change, is the position of the piston when the brake pads first engage the rotor. In some embodiments, the process 1300 includes initializing or performing step 1304 at a startup of the system that the caliper system provides braking for (e.g., the vehicle 50, an industrial machine, etc.). In some embodiments, the process 1300 includes measuring a pressure point at ignition or startup of the vehicle 50 while the vehicle 50 is stationary (or performing step 1304 when the vehicle 50 first starts up and is stationary and prior to the vehicle 50 or the system that the caliper system serves moving). In some embodiments, if there are separate control circuits (e.g., hydraulic or pneumatic circuits) for front and rear axles, the process 1300 may initialize and perform step 1304 at a specific time when it is known that the vehicle will be stationary. The step 1304 may be re-performed later to thereby adjust the baseline position during operation. Re-performing step 1304 at a later point of operation may facilitate improved analysis and optimization of pressure rise, fall, or pulsation, to minimize brake wear.

The process 1300 also includes determining, at a second time, a second position by operating the pump (e.g., by controlling an accumulator and a pressure control valve) to adjust the brake pressure to drive the piston so that the brake pad engages the rotor, and recording sensor feedback from the position sensor as the second position (step 1306), according to some embodiments. In some embodiments, step 1306 is the same as or similar to the step 1304. In some embodiments, the step 1306 is performed at a later time or later during life of the brake pads. For example, the step 1306 may be performed after a certain number of braking operations have been performed, after a specific runtime, etc. In some embodiments, the step 1306 is performed every time a braking operation is performed and the brake pads are driven into engagement with the rotor. In some embodiments, the step 1306 is performed by the pad wear manager 810.

The process 1300 includes determining, based on (i) a comparison between the baseline position and the second position, and (ii) a known thickness of the brake pads, a degree to which the brake pad has worn (step 1308), according to some embodiments. In some embodiments, step 1308 is performed based on the known thickness of the brake pads when the brake pads are unworn (e.g., when the brake pads are fresh). In some embodiments, step 1308 is performed based on a relationship that defines changes in the baseline position and the second position to an amount of wear of the brake pads. In some embodiments, step 1308 is performed to predict or determine an amount, a percentage, a degree, etc., of wear of the brake pads, or an amount, a percentage, a degree, etc., of remaining material of the brake pads. In some embodiments, step 1308 is performed by the pad wear manager 810.

The process 1300 includes operating a display to provide the degree to which the brake pad has worn, or a remaining life of the brake pads to a user (step 1310), according to some embodiments. In some embodiments, step 1310 is performed by the pad wear manager 810 or the controller 802. In some embodiments, step 1310 is performed by the controller 802 or a control system of the vehicle 50. In some embodiments, the step 1310 is performed by a display screen of the vehicle 50 that is positioned within a cab of the vehicle 50. In some embodiments, the step 1310 is performed by the HMI 844.

Relationship Manager

Figure 13:
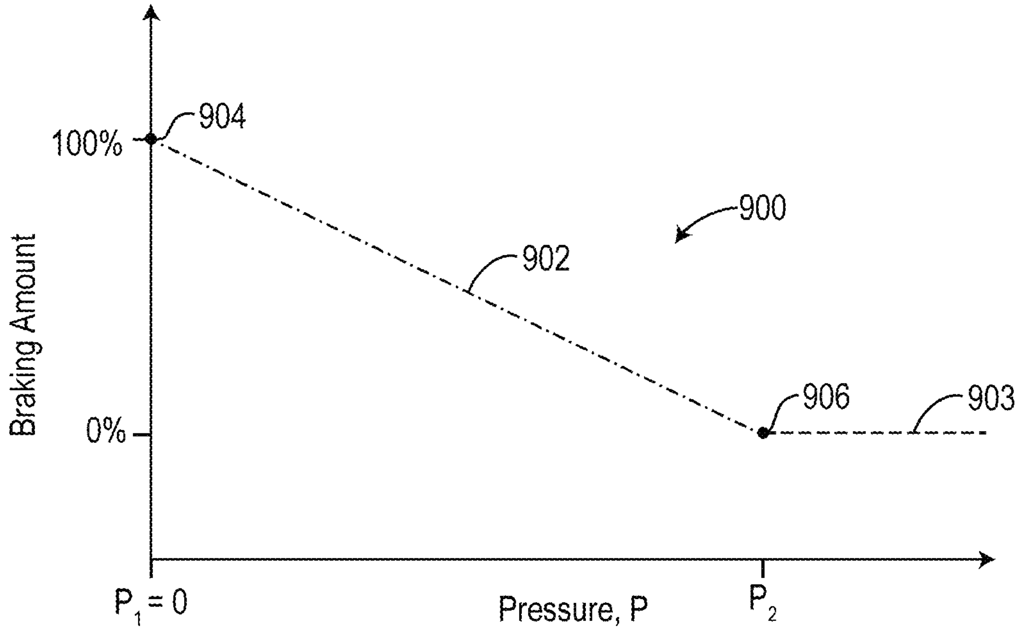
FIG. 13 is a graph illustrating braking amount and brake pressure, according to some embodiments.

Referring to FIGS. 12 and 13, the controller 802 includes a relationship manager 814 that is configured to determine a relationship between pressure of the second sub-volume 436 and an amount of braking or position of the piston assembly 426, according to some embodiments. As shown in FIG. 13, a graph 900 includes a relationship 902 that illustrates changes in pressure (the X-axis) of the second sub-volume 436 with respect to changes in braking amount (the Y-axis). The relationship 902 may be a linear relationship that is defined between a first point 904 and a second point 906. The relationship manager 814 can determine, identify, or estimate the relationship 902 which may be used by the control manager 816 to control operation of the caliper system 400 to provide a desired amount of braking responsive to an input.

In some embodiments, the relationship manager 814 is configured to determine or identify the pressure $p_2$ at which the braking amount is 0%, shown as point 906. In some embodiments, a maximum braking amount is when the piston assembly 426 is biased in the clamping direction 476 by the spring 452, without any pressurization of the second sub-volume 436 by the pump 434 (e.g., $p_1=0$) shown as point 904.

In some embodiments, the point 904 is known (e.g., a pressure of 0 within the second sub-volume 436 always result in the maximum clamping force and thereby maximum braking force). In some embodiments, the point 906 can be determined by increasing pressure within the second sub-volume 436 while monitoring the piston position provided by the positional sensor 412. In some embodiments, the relationship manager 814 continuously increases the pressure of the second sub-volume 436 by operating the pump 434 (e.g., by providing control signals to the pump 434 to introduce more fluid into the second sub-volume 436) until the piston assembly 426 begins to incrementally or substantially move (e.g., in the releasing direction 478). Once the piston assembly 426 begins to move or has moved a predetermined amount (e.g., in the releasing direction 478), the relationship manager 814 can record the pressure provided by the pressure sensor 440 as the second pressure $p_2$. The relationship manager 814 may use the second pressure $p_2$ as the X-value of the point 906, and use the known value of the first point 904 in a trend fitting or regression procedure to determine the relationship 902. In some embodiments, the relationship 902 defines an amount of braking as a function of pressure of the second sub-volume 436, or vice versa.

The relationship 902 may be provided to the control manager 816 and used to determine a pressure setting for the second sub-volume 436 to achieve a desired amount of braking as indicated by a user input provided by the HMI 844 or a mobility controller of a vehicle or machine. For example, a brake pedal may be depressed, and based on a degree of depression of the brake pedal, the HMI 844 or the brake pedal may provide a voltage or a signal to the control manager 816. If the signal indicates that 50% of a maximum amount of braking is requested, the control manager 816 can use the relationship 902 provided by the relationship manager 814 to determine a corresponding pressure of the second sub-volume 436 to achieve 50% braking power. The control manager 816 may operate the pump 434 to either increase or decrease the pressure of the second sub-volume 436 so that the pressure of the second sub-volume 436 (e.g., as indicated by the feedback from the pressure sensor 440) is substantially equal to the corresponding pressure determined based on the relationship 902 and the use input.

In some embodiments, the relationship manager 814 is configured to update the second point 906 in real-time based on most recently obtained data from the positional sensor 412 and the pressure sensor 440. For example, if the control manager 816 is operating the pump 434 to increase the pressure of the second sub-volume 436, and the piston position provided by the positional sensor 412 begins to change after being stationary (e.g., after remaining at a constant position while the pressure within the second sub-volume 436 changes), the relationship manager 814 may record the pressure of the second sub-volume 436 at which the position of the piston assembly 426 begins to change as the second pressure $p_2$. If the newly obtained value of the second pressure $p_2$ deviates from the value of the second pressure $p_2$ that is currently used for establishing the relationship 902, the relationship manager 814 may update or re-determine the relationship 902. Advantageously, calibrating, or re-determining the relationship 902 based on newly obtained data from the positional sensor 412 and/or the pressure sensor 440 allows the use of a non-linear spring 452, and allows the controller 802 to account for changes in braking functionality due to wear of the brake pads 438.

It should be understood that while the relationship 902 is shown in FIG. 13 as being linear, the relationship 902 may be non-linear in other embodiments. The relationship manager 814 can use the points 904 and 906 and a curve-fitting technique that is either linear or non-linear to determine the relationship 902 and provide the relationship 902 to the control manager 816 for use in controlling the caliper assembly 400.

In some embodiments, the second point 906 is an inflection point or knee between the relationship 902 and a constant relationship 903. For example, once the pressure is increased to $p_2$ and the brake pads 438 do not engage the rotor flange 302, increased pressure may result in the piston assembly 426 translating further in releasing direction 478, without any further reduced braking (since the pads 438 are already out of engagement with the rotor flange 302), as illustrated by constant relationship 903.

Figure 19:
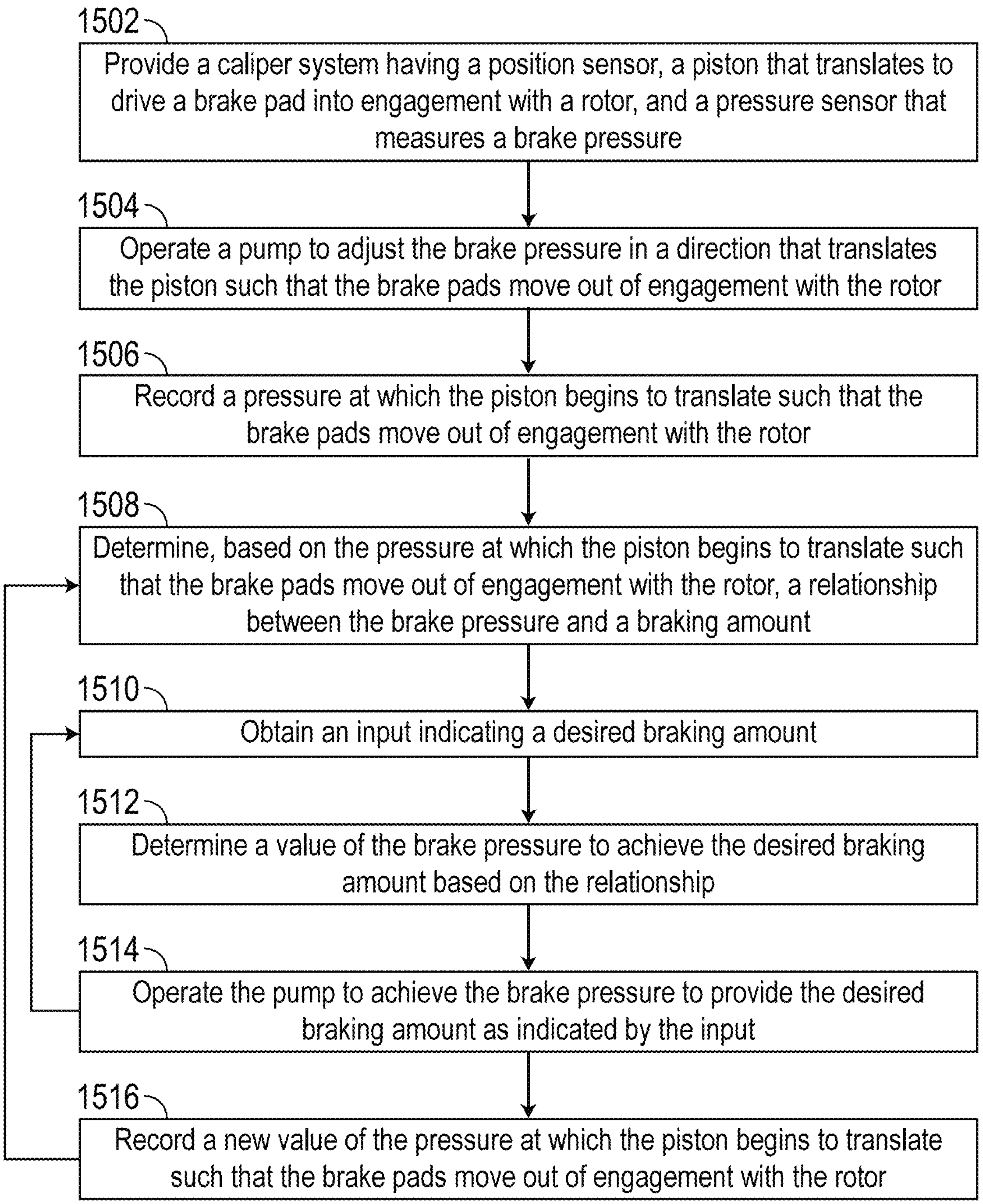
FIG. 19 is a flow diagram of a process for determining a relationship for controlling a brake system based on feedback from a position sensor, according to some embodiments.

Referring to FIG. 19, a process 1500 for determining a relationship for control of a brake includes steps 1502-1516, according to some embodiments. In some embodiments, the process 1500 is performed by the controller 802, or more particularly, by the relationship manager 814. In some embodiments, the process 1500 is performed in order to identify a relationship between brake pressure and an amount of braking, or between brake pressure and position of a piston of a brake.

The process 1500 includes providing a caliper having a position sensor, a piston that translates to drive a brake pad into engagement with a rotor, and a pressure sensor that measures a brake pressure (step 1502), according to some embodiments. In some embodiments, the step 1502 is the same as or similar to the step 1402 of the process 1400. In some embodiments, the step 1502 is the same as or similar to the step 1402 of the process 1400 or the step 1302 of the process 1300.

The process 1500 includes operating a pump to adjust the brake pressure in a direction that translates the piston such that the brake pads move out of engagement with the rotor (step 1504) and recording a pressure at which the piston begins to translate such that the brake pads move out of engagement with the rotor (step 1506), according to some embodiments. In some embodiments, the steps 1504 and 1506 are performed by operating a pump to supply brake fluid to increase pressure within a caliper of the caliper system and monitoring sensor feedback of both the pressure sensor and the position sensor. Once the piston begins to translate, as indicated by the sensor feedback from the position sensor, the pressure is recorded. In some embodiments, the step 1504 and 1506 are performed by the relationship manager 814.

The process 1500 includes determining, based on the pressure at which the piston begins to translate such that the brake pads move out of engagement with the rotor, a relationship between the brake pressure and a braking amount (step 1508), according to some embodiments. In some embodiments, the step 1508 is performed by the relationship manager 814 based on the pressure obtained in step 1506 and a regression technique. In some embodiments, the pressure and corresponding position obtained in step 1506 indicate zero point which operation of the caliper system is controlled from. In some embodiments, the relationship uses the pressure obtained in step 1506 as a pressure at which 0% of a total available braking is applied, and uses a known pressure value (e.g., 0 psi) as a pressure at which 100% of a total available braking is applied.

The process 1500 includes obtaining an input indicating a desired braking amount (step 1510), according to some embodiments. In some embodiments, the desired braking amount is provided to a controller (e.g., the controller 802) by a brake pedal or a sensor of a brake pedal (e.g., a device of the HMI 844). In some embodiments, step 1510 is performed by the control manager 816.

The process 1500 includes determining a value of the brake pressure to achieve the desired braking amount based on the relationship (step 1512), according to some embodiments. In some embodiments, the step 1512 includes providing the desired braking amount as an input to the relationship obtained in the step 1508. In some embodiments, the relationship is used to determine the pressure that will achieve the desired braking amount (e.g., 50% of the total braking, 100% of the total braking, etc.). In some embodiments, the step 1512 is performed by the control manager 816.

The process 1500 includes operating the pump to achieve the brake pressure to provide the desired braking amount, as indicated by the input (step 1514), according to some embodiments. In some embodiments, step 1514 includes operating the pump 434 based on the pressure determined in step 1512. In some embodiments, step 1514 is performed by the control manager 816. In some embodiments, step 1514 is performed by operating the pump 434 to increase or decrease current pressure (e.g., to adjust the current pressure toward the pressure determined in step 1512) while monitoring sensor feedback provided by the pressure sensor until the sensor feedback provided by the pressure sensor indicates that the current pressure is substantially equal to the pressure determined in the step 1512. In some embodiments, the process 1500 returns to step 1510 after performing step 1514. In some embodiments, the process 1500 also performs step 1516 in response to performing step 1514 such that step 1516 and/or step 1514 may be performed at least partially simultaneously with each other.

The process 1500 includes recording a new value of the pressure at which the piston begins to translate such that the brake pads move out of engagement with the rotor (step 1516), according to some embodiments. In some embodiments, the step 1516 is performed if the caliper system is operated (e.g., in normal braking operations) and the pressure at which the piston begins to translate such that the brake pads move out of engagement with the rotor changes over time. In some embodiments, the step 1516 is the same as or similar to the step 1506. In some embodiments, in response to performing step 1516, the process 1500 returns to step 1508. In some embodiments, the process 1500 can be performed to determine a relationship between the position of the piston assembly 426 and the pressure of the second sub-volume 436.

Malfunction Identification

Figure 16:
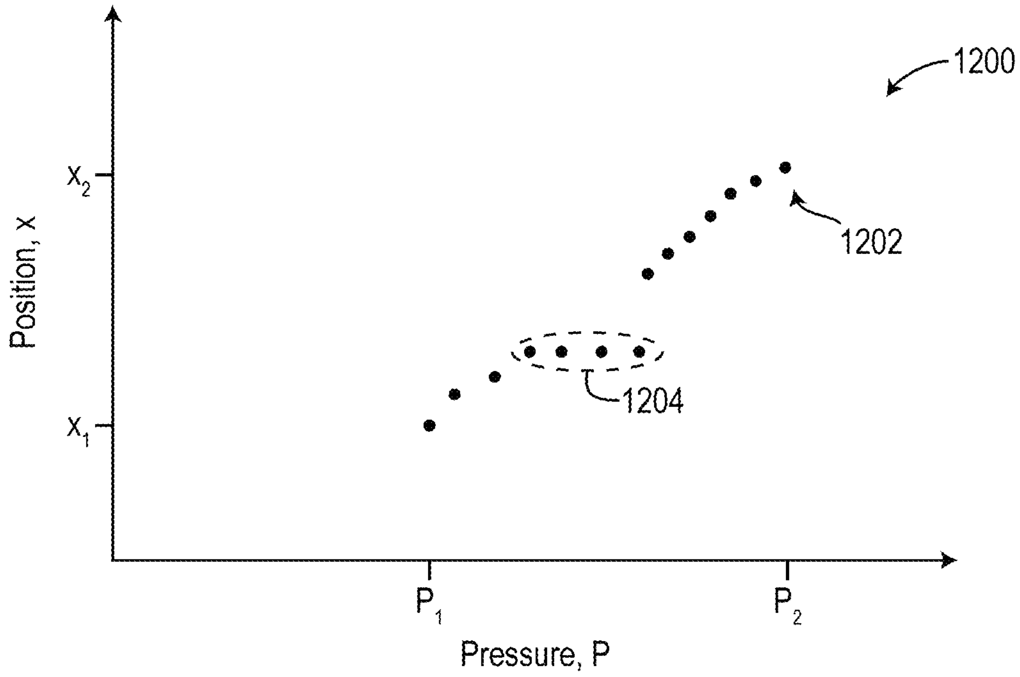
FIG. 16 is a graph showing a relationship between position of a brake piston and brake pressure when the piston a sticks at a specific location, according to some embodiments.

Referring to FIGS. 12 and 16, the controller 802 includes a malfunction detector 812, according to some embodiments. In some embodiments, the malfunction detector 812 is configured to obtain the piston position from the positional sensor 412 and pressure (e.g., of the second sub-volume 436) and use the inputs to determine if the caliper assembly 400 is operating properly or to determine if the caliper assembly 400 has malfunctioned. Malfunctioning of the caliper assembly 400 that can be detected may include but are not limited to: the piston assembly 426 sticking, rough movement of the piston assembly 426, the piston assembly 426 being limited from translating to either boundary (e.g., in the clamping direction 476 or the releasing direction 478), leaks in the brake line 472, etc.

Referring particularly to FIG. 16, a graph 1200 illustrates the resulting change in the position of the piston assembly 426 (the Y-axis) with respect to changes in the pressure of the second sub-volume 436 (the X-axis), according to some embodiments. The graph 1200 includes scatter data 1202 which may represent intermittent obtaining and plotting of the pressure and piston position provided by the pressure sensor 440 and the positional sensor 412, respectively. As shown in FIG. 16, the scatter data 1202 illustrates a generally linear relationship between the position and the pressure, with increased pressure (e.g., increasing from $p_1$ to $p_2$) resulting in increased position or translation of the piston assembly 426 (e.g., from $x_1$ to $x_2$) relative to a maximum clamping position or in the releasing direction 478, respectively.

As shown in FIG. 16, the scatter data 1202 includes a deviation from the generally linear trend between the pressure (the X-axis) and the piston position (the Y-axis), shown as data 1204. At the data 1204, the pressure p of the second sub-volume 436 is shown increasing, while the position of the piston assembly 426 remains substantially the same. The data 1204 shown in graph 1200 may illustrate the relationship that is exhibited between the piston position and the pressure when the piston assembly 426 sticks. As shown in FIG. 16, the positions $x_1$ and $x_2$ are known piston positions where the piston assembly 426 is at the end of its strokes (e.g., a maximum clamp position, and a maximum release position). Accordingly, when the piston assembly 426 is at a position between the position $x_1$ and $x_2$, changes in the pressure of the second sub-volume 436 should result in movement or translation of the piston assembly 426 (e.g., in the releasing direction 478 if the pressure is increasing, or in the clamping direction 476 if the pressure is decreasing). If the piston assembly 426 is not at either the position $x_1$ or the position $x_2$, and is not moving even with changes to the pressure of the second sub-volume 436, this indicates that the piston assembly 426 is stuck at an intermediary position, and that a malfunction has occurred.

Referring again to FIG. 12, the malfunction detector 812 of the controller 802 can determine if the piston assembly 426 is stuck at an intermediary position by comparing the current position of the piston assembly 426 to known boundary positions (e.g., $x_1$ and $x_2$) that define the total stroke path of the piston assembly 426. If the piston assembly 426 is currently between the boundary positions (e.g., $x_1<x_{piston}<x_2$), and substantial changes in the pressure of the second sub-volume 436 do not result in changes in the position of the piston assembly 426, then the malfunction detector 812 determines that the piston assembly 426 is stuck at a current position (e.g., at the current piston position provided by the positional sensor 412) and records the current position of the piston assembly 426.

The malfunction detector 812 can also identify if there are leaks in the pump 434 or the brake line 472 based on the piston position and/or the pressure provided by the positional sensor 412 and the pressure sensor 440, according to some embodiments. In some embodiments, the malfunction detector 812 is configured to store or use a relationship, a model, an equation, etc., that predicts, estimates, or calculates an amount of movement of the piston assembly 426 (e.g., an amount of change in the current position of the piston assembly 426) responsive to a change in the pressure of the second sub-volume 436 given a current position of the piston assembly 426. In some embodiments, the relationship, the model, the equation, etc., is configured to predict or estimate a position of the piston assembly 426 given a current pressure of the second sub-volume 436. In some embodiments, the relationship, the model, the equation, etc., is configured to estimate a required pressure of the second sub-volume 436 that should result in a corresponding position of the piston assembly 426. In some embodiments, the malfunction detector 812 is configured to use the relationship, the piston position provided by the positional sensor 412, and the pressure provided by the pressure sensor 440 to determine if the pump 434 or the brake line 472 is leaking. For example, if the malfunction detector 812 identifies that an excessive amount of pressure is required to achieve a specific position, or that a certain pressure cannot be achieved or cannot be held over time, the malfunction detector 812 may determine that a leak has occurred in the pump 434 or the brake line 472.

The malfunction detector 812 can also monitor the piston position provided by the positional sensor 412 over time and identify a smoothness or an amount of noise in the sensor data provided by the positional sensor 412. If the amount of noise of the sensor data provided by the positional sensor 412 exceeds a threshold, or if the smoothness of the sensor data provided by the positional sensor 412 is not sufficiently low, the malfunction detector 812 can determine that the translation or movement of the piston assembly 426 is rough.

Figure 18:
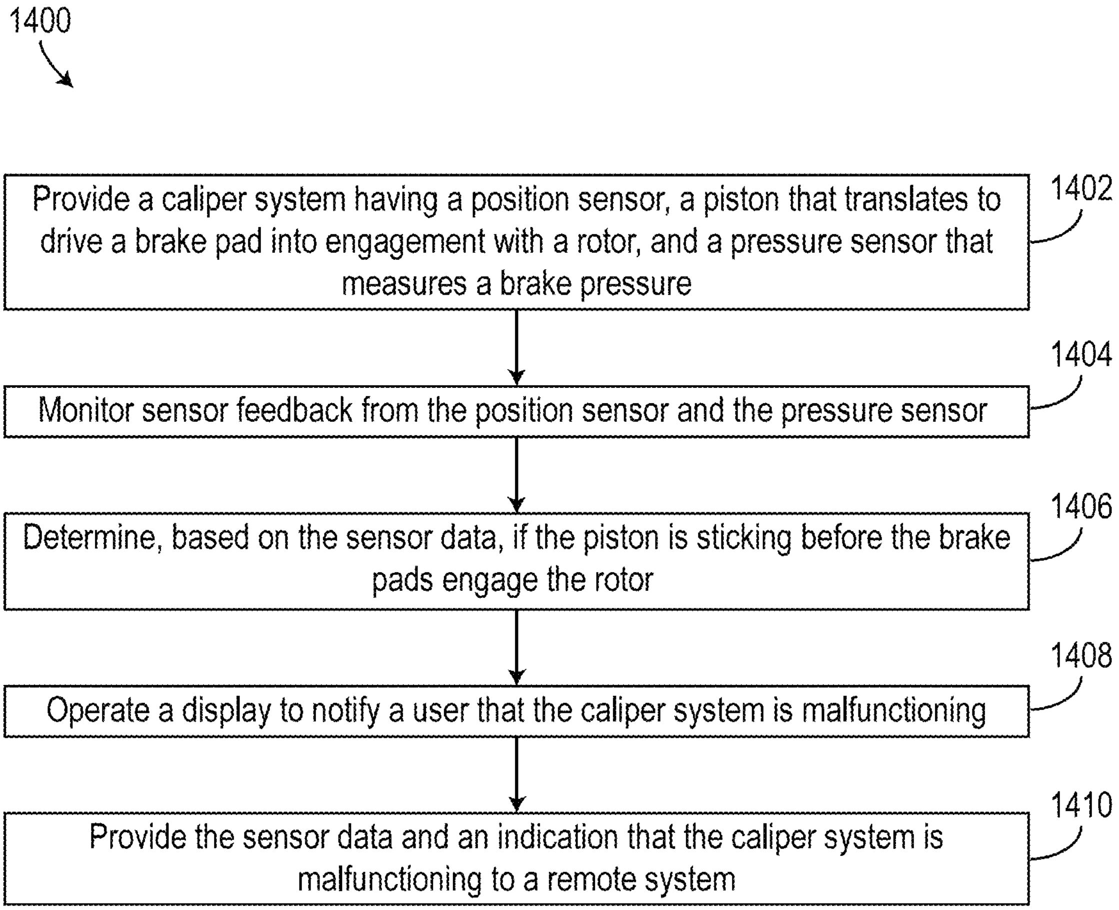
FIG. 18 is a flow diagram of a process for determining if a brake system is not functioning properly, according to some embodiments.

Referring to FIG. 18, a process 1400 for determining or identifying if a brake is operating properly or malfunctioning includes steps 1402-1410, according to some embodiments. In some embodiments, the process 1400 can be performed in real-time while a brake system is being operated and can be used to notify an operator of a vehicle that a brake of the vehicle is not operating properly, or can be used to notify a remote or third party system to prompt maintenance at the brake.

The process 1400 includes providing a caliper system having a position sensor, a piston that translates to drive a brake pad into engagement with a rotor, and a pressure sensor that measures a brake pressure (step 1402), according to some embodiments. In some embodiments, the step 1402 is the same as or similar to the step 1302. In some embodiments, the caliper system is a brake system of a vehicle (e.g., the vehicle 50).

The process 1400 includes monitoring sensor feedback from the position sensor and the pressure sensor (step 1404), according to some embodiments. In some embodiments, step 1404 is performed by the malfunction detector 812. In some embodiments, step 1404 includes obtaining the sensor feedback from the position sensor and the pressure sensor in real-time and obtaining sensor data from other systems of the vehicle on which the caliper system is installed.

The process 1400 also includes determining, based on the sensor data, if the piston is sticking before the pads engage the rotor (step 1406), according to some embodiments. For example, if the piston is at a position that is known to be (e.g., by performing the process 1300) before the brake pads engage the rotor, and the changes in the pressure do not result in expected changes in the position of the piston, the malfunction detector 812 may determine that the piston is sticking at a specific location. In some embodiments, the process 1400 is performed at least partially simultaneously with the process 1300 or is performed after the process 1300, and uses the determined or identified position of the piston when the brake pads engage the rotor to determine if the piston is sticking. In some embodiments, step 1406 includes monitoring how the position of the piston changes with respect to changes in the pressure, or determining an amount of noise in the sensor feedback from the position sensor to identify if the piston is translating roughly, which may also indicate a malfunction of the caliper assembly.

The process 1400 also includes operating a display to notify a user that the caliper system is malfunctioning (step 1408) and providing the sensor data and an indication that the caliper system is malfunctioning to a remote system (step 1410), according to some embodiments. In some embodiments, steps 1408 and 1410 are performed in response to the step 1406 (e.g., in response to identifying that the caliper system is malfunctioning). In some embodiments, the step 1408 is performed to notify an operator of the vehicle that the caliper system is installed on that the caliper system is not functioning properly. In some embodiments, the notification of step 1408 includes an identification of a reason or root-cause of why the caliper system is not functioning properly (e.g., caliper sticking at a particular location, the piston is translating rough, etc.). In some embodiments, the display is a computer or a display of a computer that is accessing a webpage (e.g., step 1408 is performed by a cloud computing system). In some embodiments, the sensor data and the indication provided to the remote system are the same as any of the data displayed in step 1408. In some embodiments, the step 1410 is performed by the controller 802.

Drive System and Gearbox

Gearbox

Figure 20:
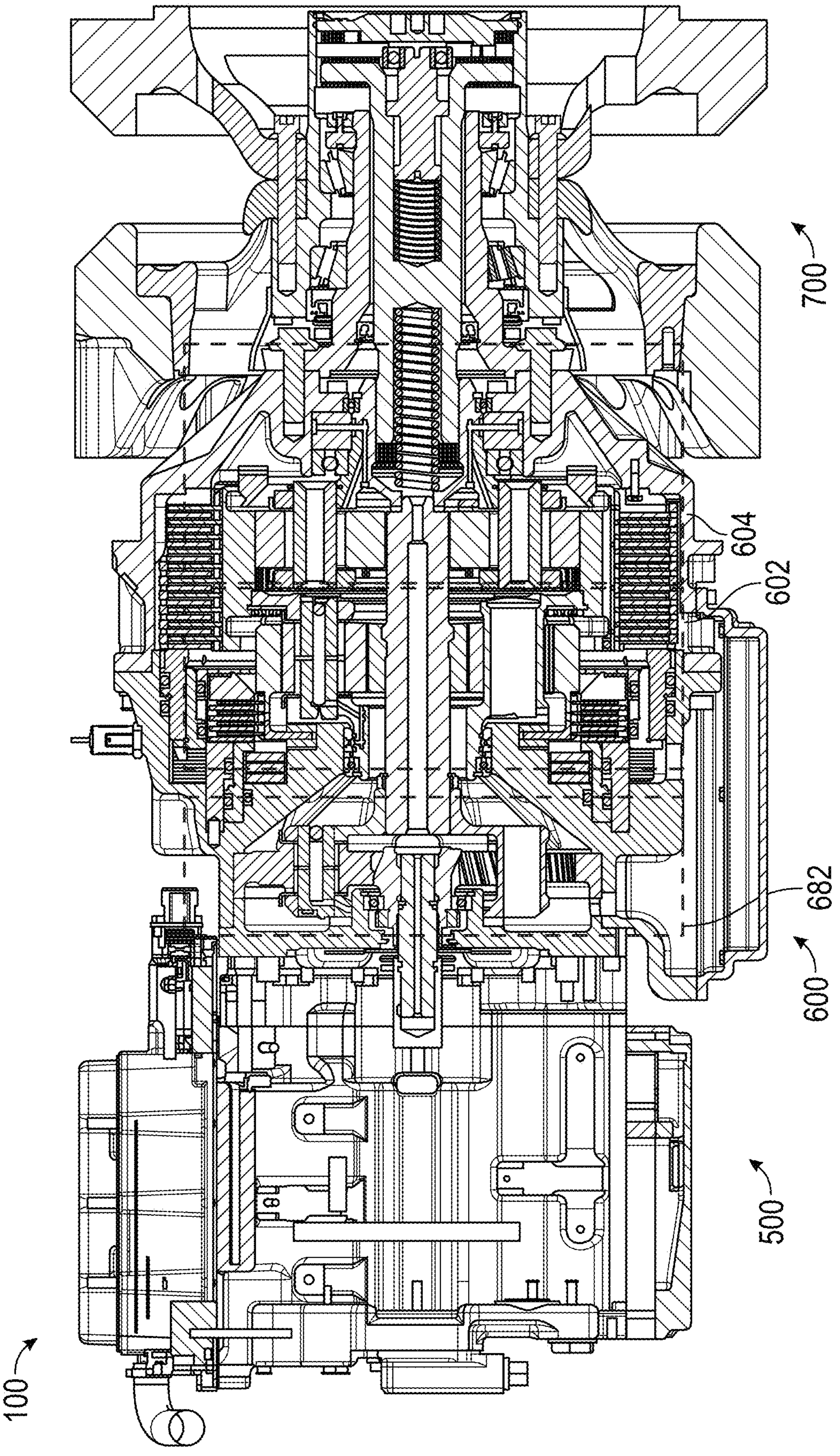
FIG. 20 is a sectional view of the electric drive system of FIG. 2, according to some embodiments.

Referring to FIG. 20, a sectional view of the driveline 100 is shown, according to some embodiments. The driveline 100 includes an electric motor 500, a gearbox 600, and a drive member 700. The electric motor 500 is configured to consume electrical energy and drive the drive member 700 through the gearbox 600. In some embodiments, the gearbox 600 functions as both a transmission and a brake in order to accelerate and decelerate the vehicle 10. In some embodiments, the drive member 700 is rotatably coupled on an output shaft of the gearbox 600 such that the gearbox 600 can transfer torque from the electric motor 500 to the drive member 700 and the track assemblies 14, and can also exert a deceleration torque on the drive member 700 in order to perform braking.

Figure 21:
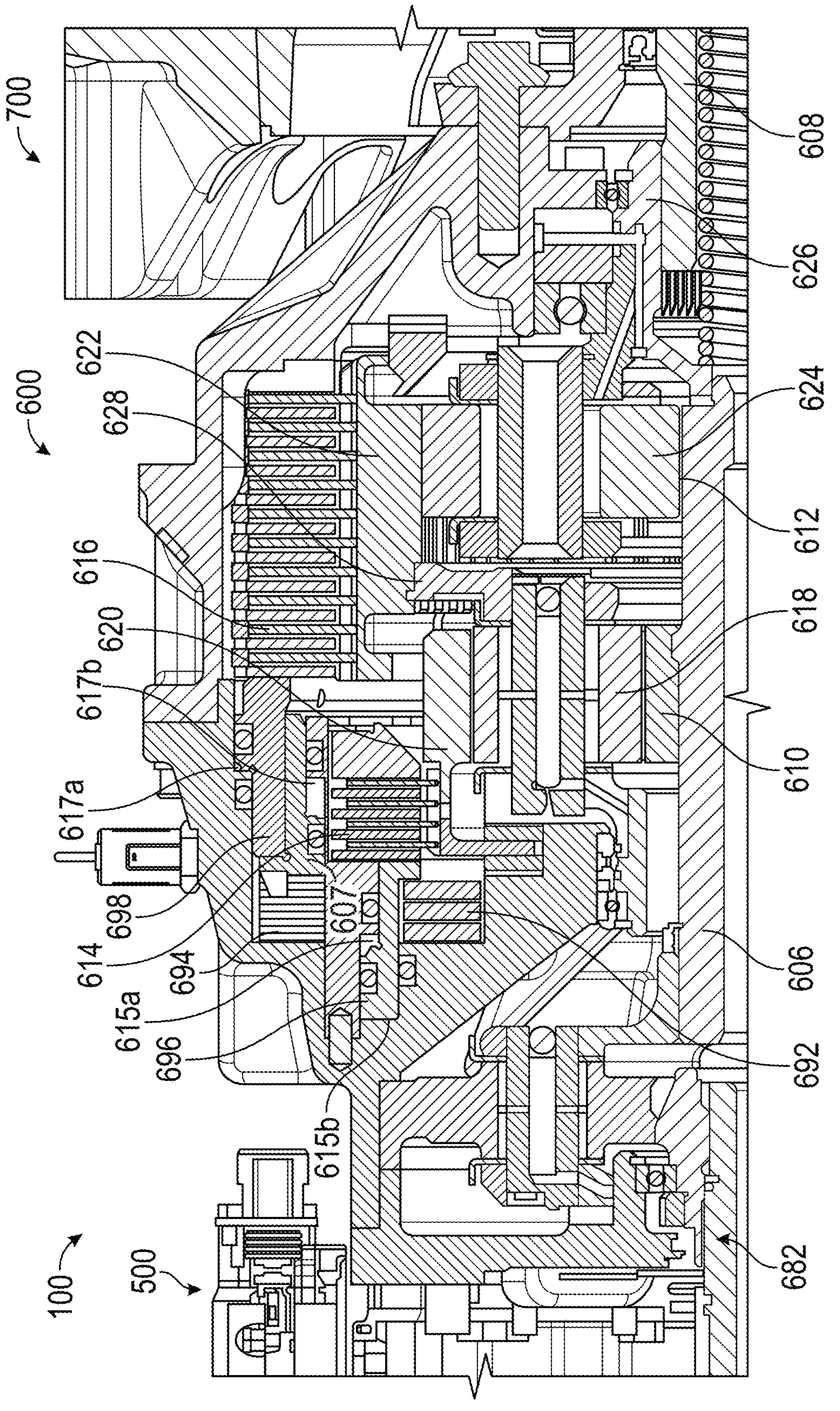
FIG. 21 is a sectional view of a gearbox of the electrical drive system of FIG. 2 in a park mode, according to some embodiments.
Figure 22:
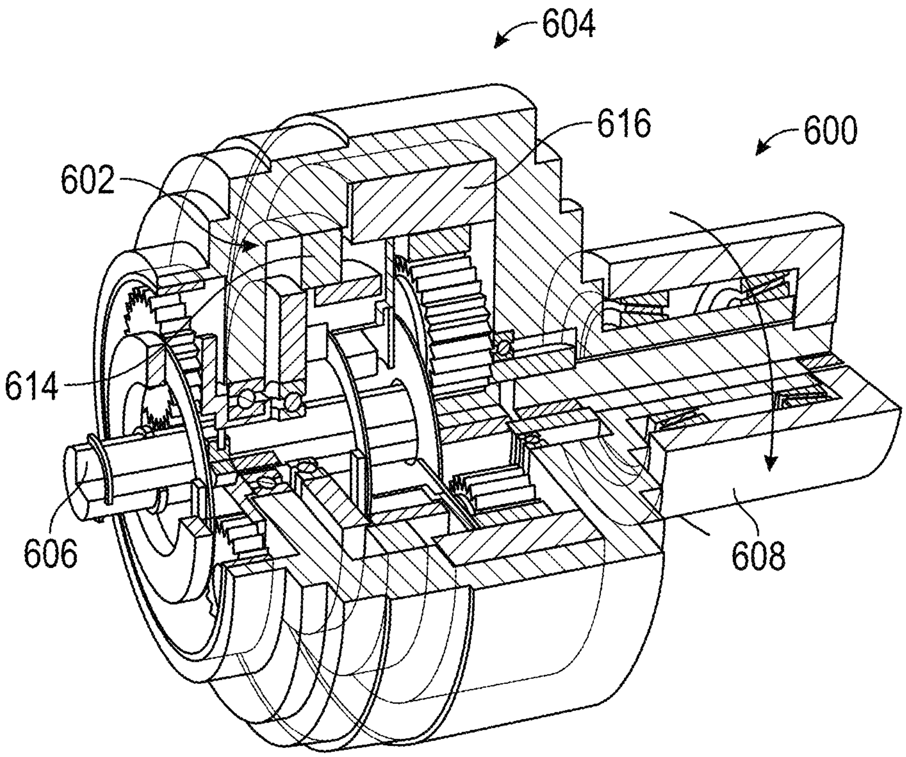
FIGS. 22-23 are perspective view of the gearbox of the electrical drive system of FIG. 2 in the low range mode, according to some embodiments.
Figure 23:
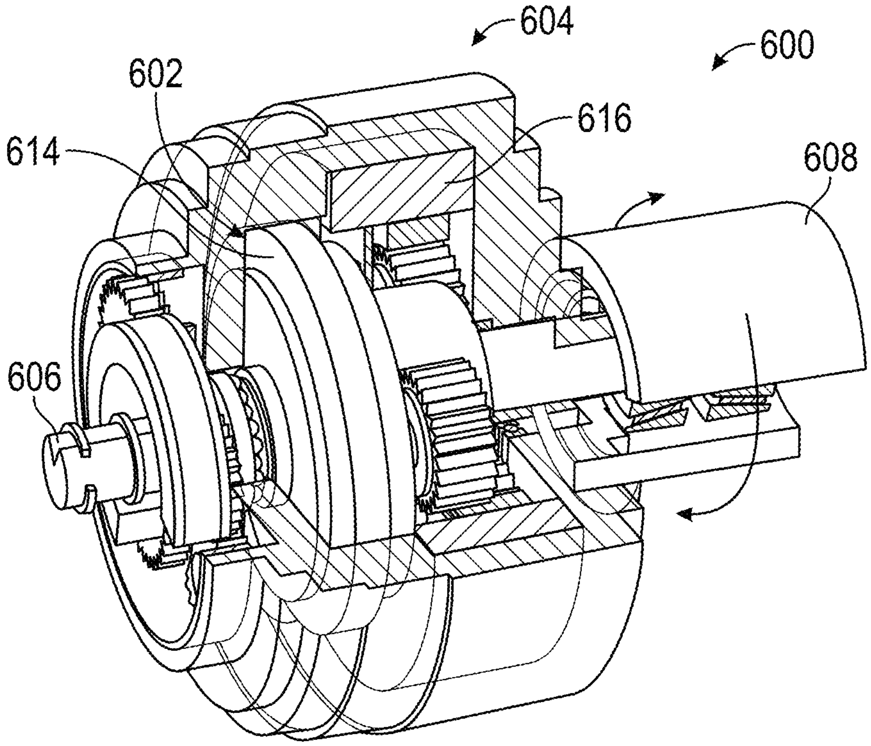
Figure 29:
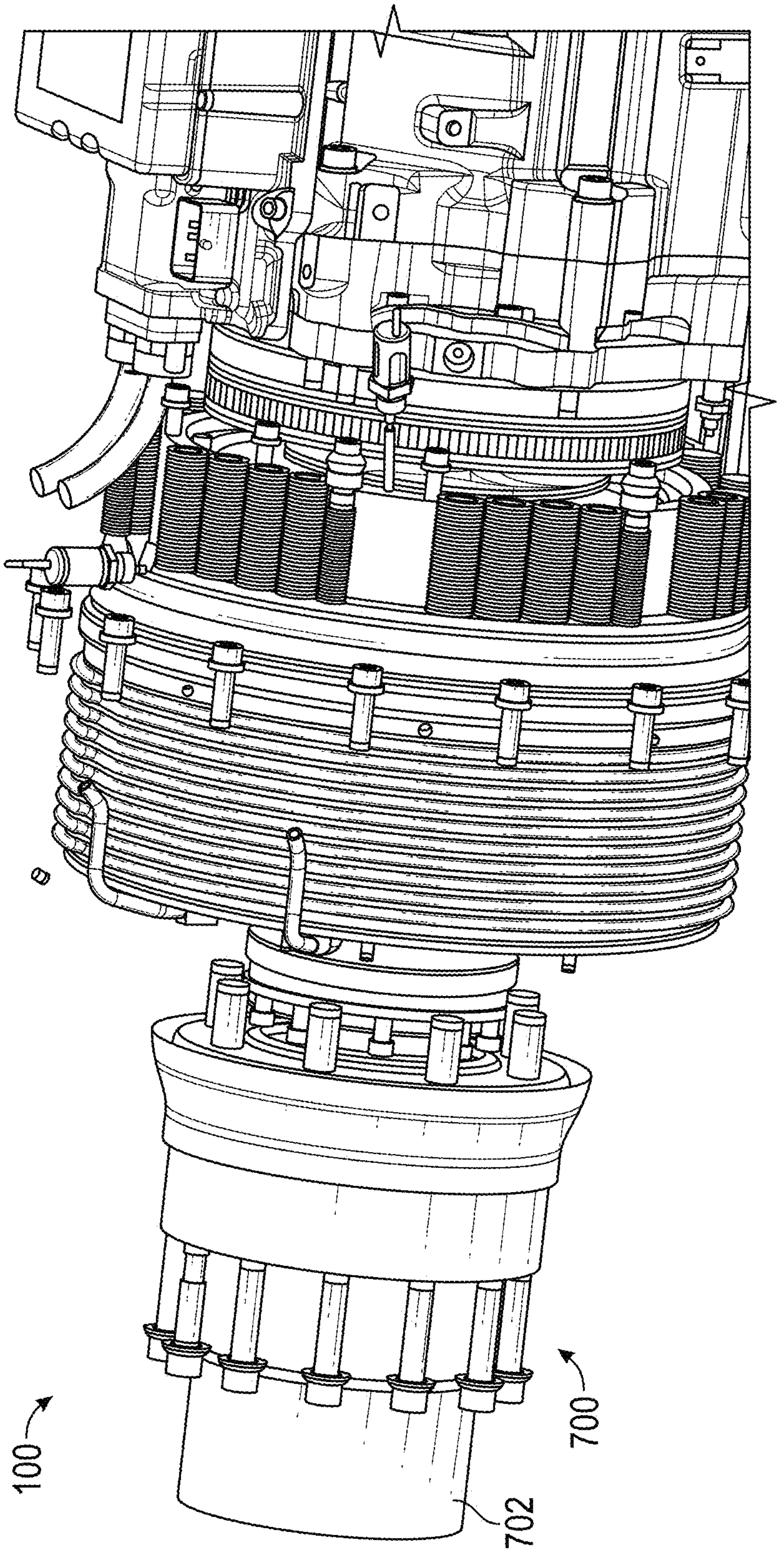
FIG. 29 is a perspective view of a manual disconnect of the electrical drive system of FIG. 2, according to some embodiments.
Figure 30:
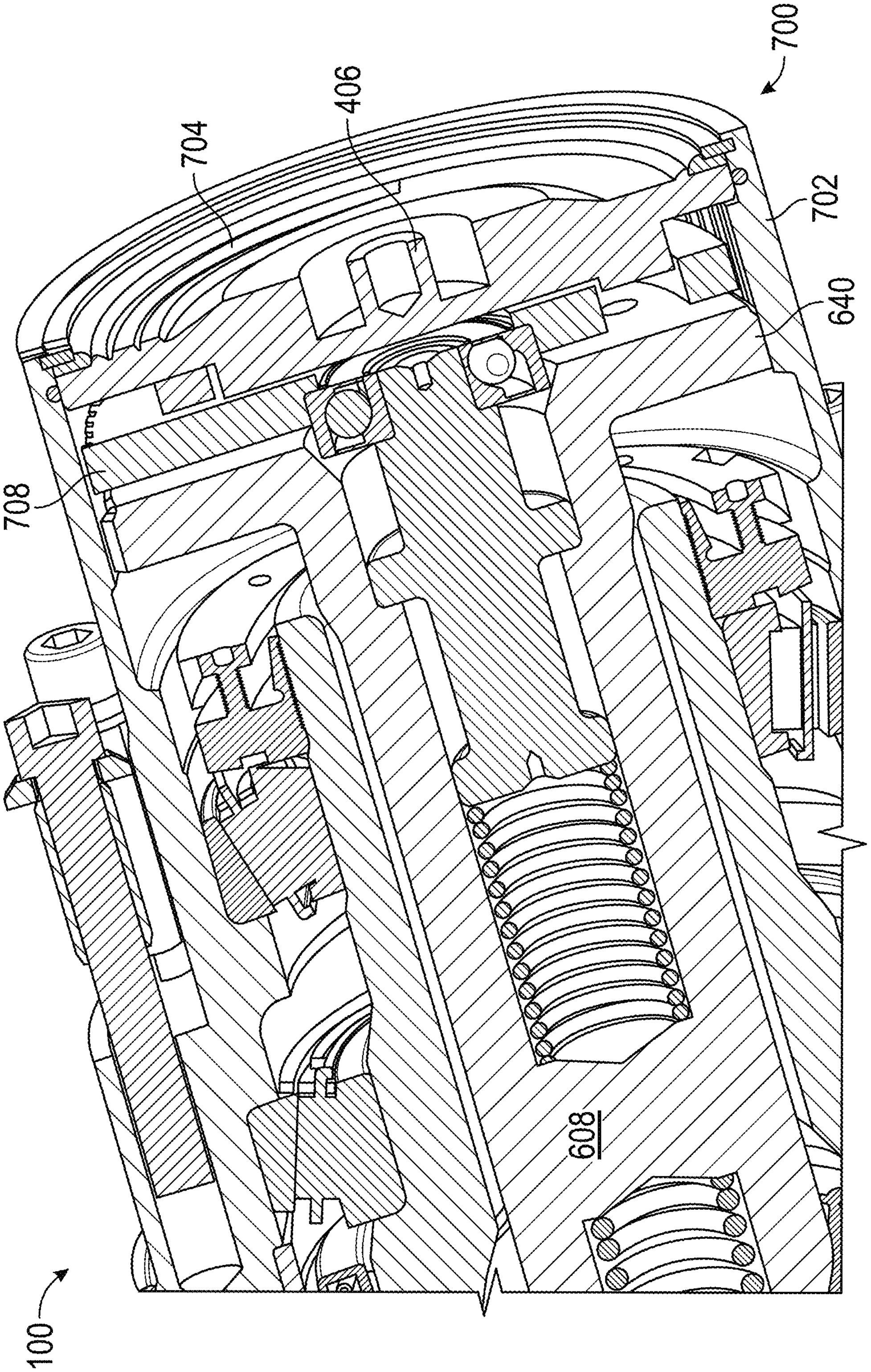
FIG. 30 is a perspective sectional view of the manual disconnect of FIG. 29, according to some embodiments.
Figure 31:
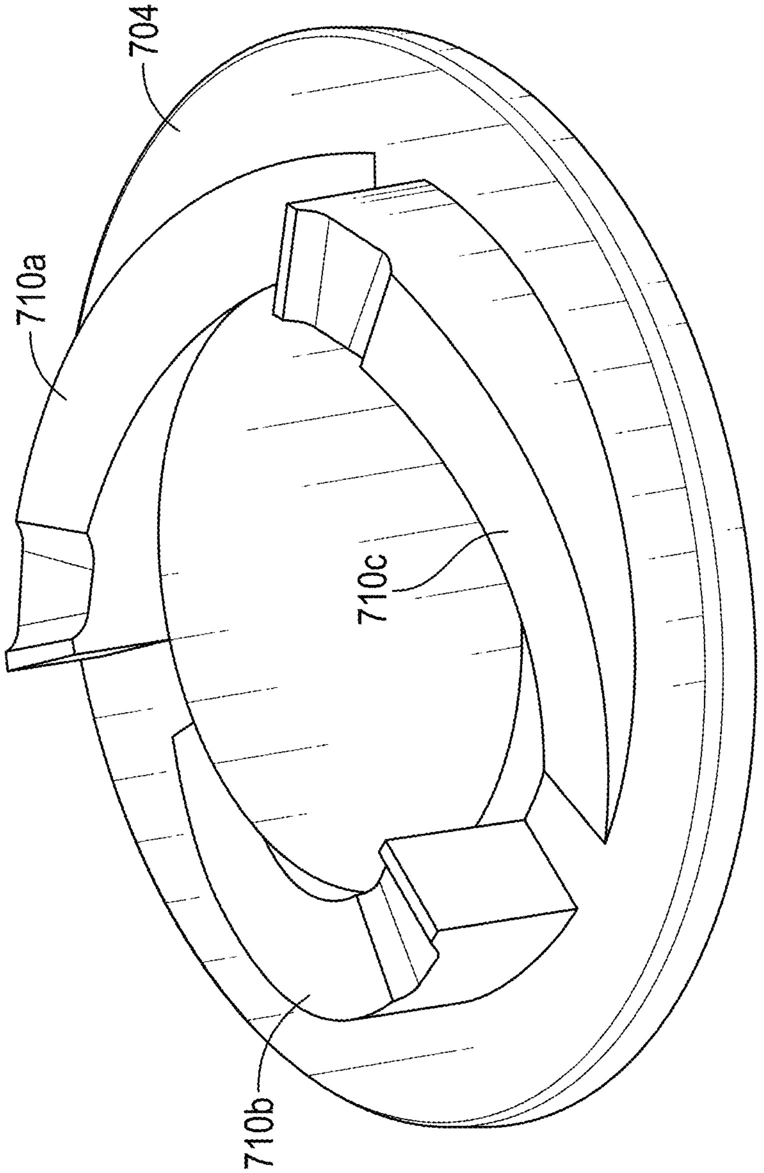
FIG. 31 is a perspective view of a cam plate of the manual disconnect of FIG. 29, according to some embodiments.
Figure 32:
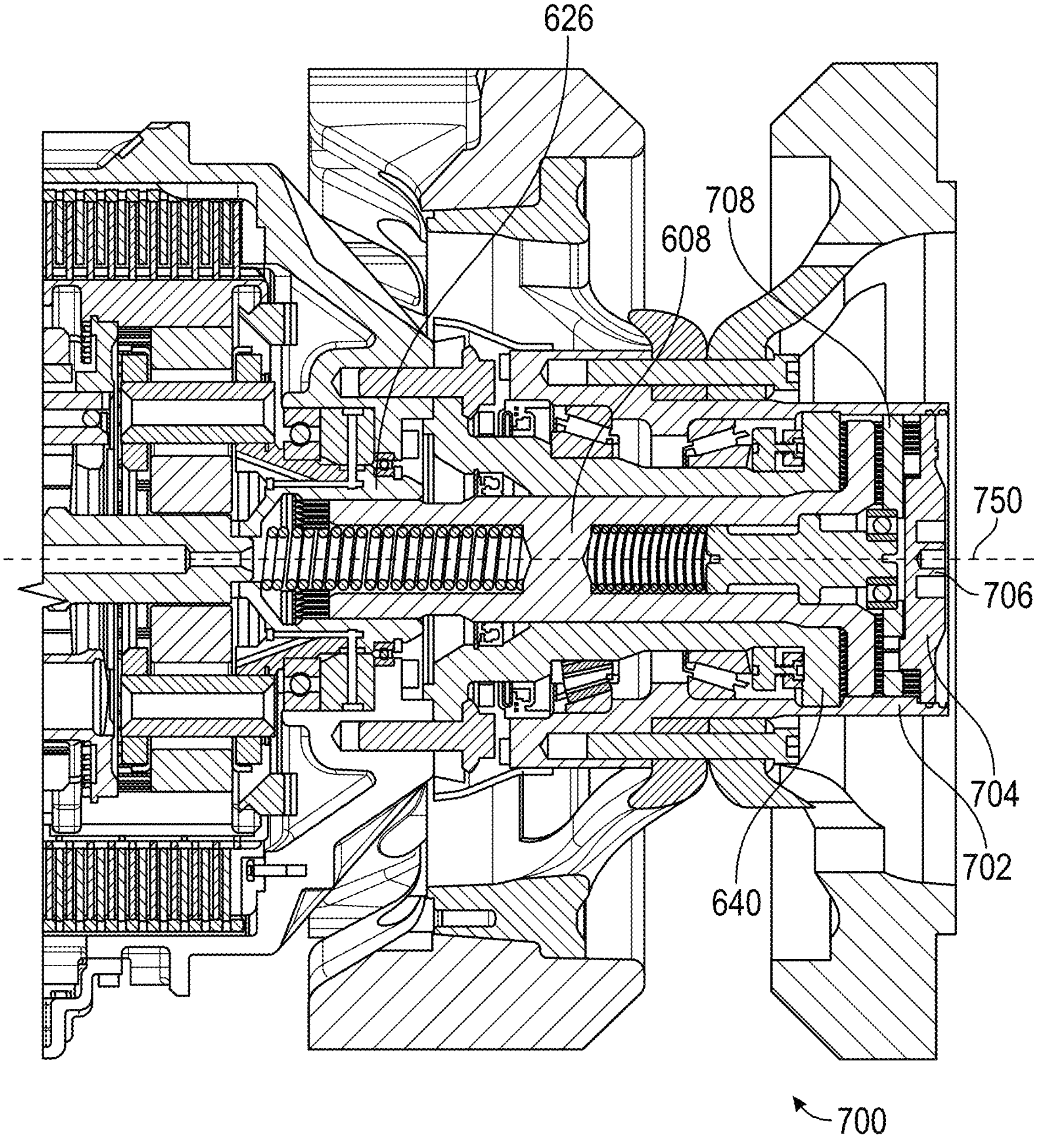
FIG. 32 is a sectional view of the manual disconnect of FIG. 29, according to some embodiments.

Referring to FIGS. 21 and 29, the gearbox 600 includes a first planetary gear set 602 and a second planetary gear set 604. The first planetary gear set 602 and the second planetary gear set 604 are arranged serially. The motor 500 is configured to provide an input torque to an input shaft 606 that is fixedly coupled with a sun gear 610 of the first planetary gear set 602 and a sun gear 612 of the second planetary gear set 604. The sun gear 610 and the sun gear 612 may be mounted on the input shaft 606 such that rotation of the input shaft 606 drives corresponding rotation of the sun gear 610 and the sun gear 612. The gearbox 600 also includes first planet gears 618 of the first planetary gear set 604 that mesh with the sun gear 610 of the first planetary gear set 602. The first planetary gear set 604 includes a carrier 628 that the first planet gears 618 are rotatably coupled on. The first planetary gear set 604 also includes a ring gear 620 that meshes with the first planet gear 618. The first planetary gear set 604 also includes a clutch or brake, shown as first brake 614 that is configured to selectively engage the ring gear 620 to either allow or limit rotation of the ring gear 620 of the first planetary gear set 602. The second planetary gear set 604 includes a ring gear 622, second planet gears 624, and a carrier 626. An output shaft 608 is coupled with the carrier 626 such that rotation of the carrier 626 of the second planet gear set 604 drives rotation of the output shaft 608. The second planet gears 624 of the second planetary gear set 604 mesh with the sun gear 612 and the ring gear 622. The ring gear 622 of the second planetary gear set 604 is coupled with the carrier 628 of the first planetary gear set 602 such that rotation of the carrier 628 of the first planetary gear set 602 drives rotation of the ring gear 622 of the second planetary gear set 604.

The second planetary gear set 604 also includes a clutch or brake 616 that is configured to engage the ring gear 622 of the second planetary gear set 604. The brake 616 may be configured to transition between a disengaged state such that rotation of the ring gear 622 of the second planetary gear set 604 is allowed or an engaged state such that rotation of the ring gear 622 of the second planetary gear set 604 is limited. In some embodiments, the brake 614 and the brake 616 are configured to partially transition into the engaged state in order to exert a braking force or deceleration on the output shaft 608 and thereby on the track assemblies 14.

Figure 26:
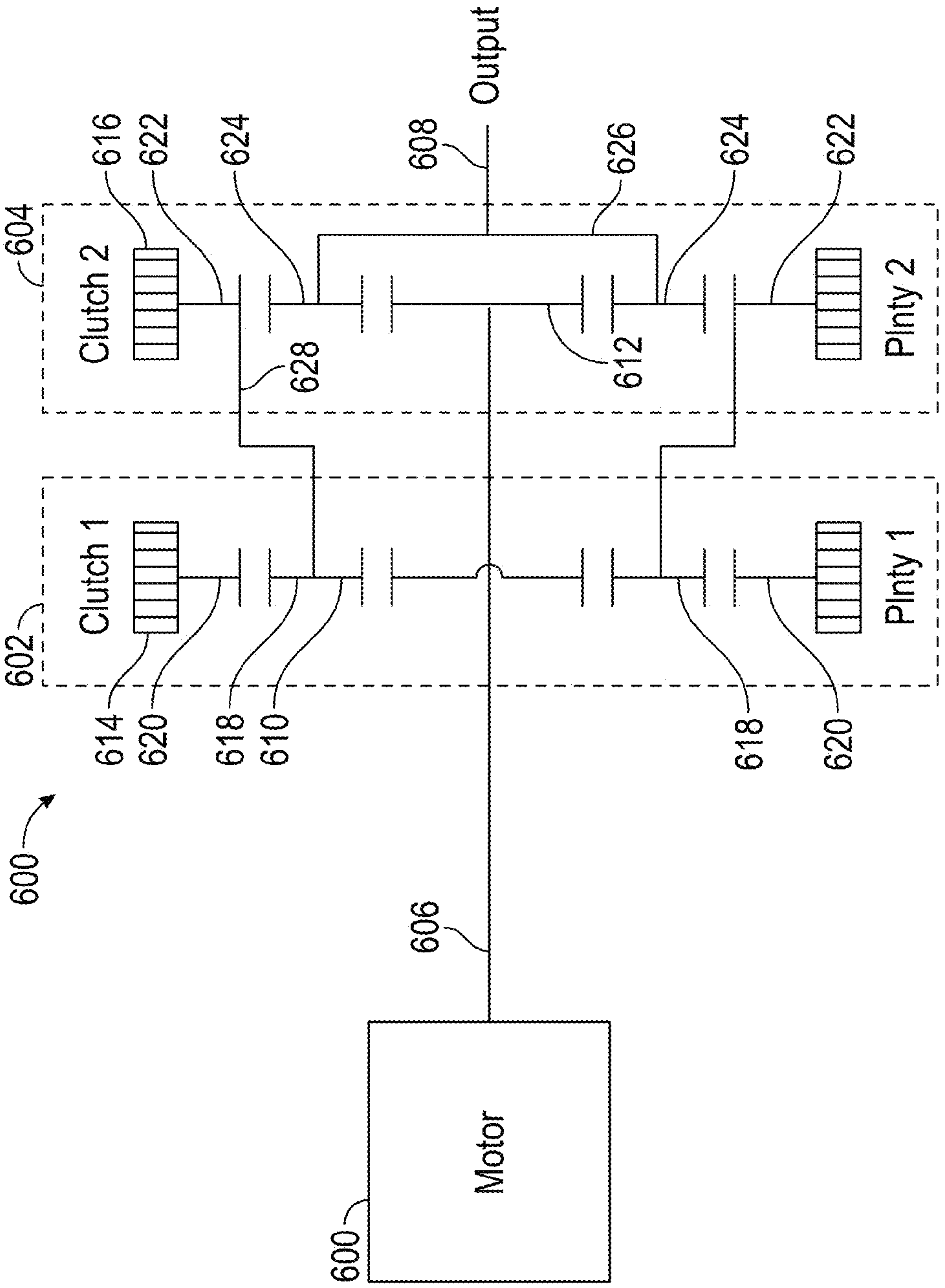
FIG. 26 is a block diagram of the gearbox of the electrical drive system of FIG. 2, according to some embodiments.

Referring to FIGS. 21 and 26, the brake 614 and the brake 616 can be transitioned between the disengaged and the engaged state in order to transition the gearbox 600 between a park state or mode, a neutral state or mode, a high range state or mode, and a low range state or mode. When both the brake 614 and the brake 616 are transitioned into the engaged state, the gearbox 600 is transitioned into the park mode and the output shaft 608 and thereby the track assemblies 14 are limited from rotating (e.g., the gearbox 600 is locked). When both the brake 614 and the brake 616 are transitioned into the disengaged state, the gearbox 600 is transitioned into the neutral mode and the output shaft 608 can be rotated freely relative to the input shaft 606. When the brake 614 is engaged and the brake 616 is disengaged, the gear ratio between the input shaft 606 and the output shaft 608 is defined by the first planetary gear set 602, and the gearbox 600 is in the high range mode for higher speeds. The first planetary gear set 602 defines a higher gear ratio with respect to the second planetary gear set 602 such that the output shaft 608 is driven at a higher speed with a lower torque. When the gearbox 600 is in the high range mode, the brake 616 may selectively and partially transitioned into the engaged state to thereby provide a braking force (e.g., partially transitioning from the high range mode into the park mode to provide braking).

When the brake 616 is transitioned into the engaged state and the brake 614 is transitioned into the disengaged state, the gearbox 600 is in the low range mode for lower speeds but higher torque output (e.g., compared to the high range mode). When the brake 616 is engaged and the brake 614 is disengaged, the gear ratio between the input shaft 606 and the output shaft 608 is defined by the second planetary gear set 604. When the gearbox 600 is in the low range mode, the brake 614 can be selectively and partially transitioned into the engaged state to thereby provide a braking force (e.g., partially transitioning from the low range mode into the park mode to provide braking).

Referring still to FIGS. 21 and 26, the brake 616 may have a higher capacity or load rating (e.g., greater surface area, greater braking torque ability, etc.) than the brake 614 since the brake 616 is configured to transfer higher torque from the input shaft 606 to the output shaft 608 in the low range mode, and is also configured to function as a brake when the vehicle 10 is operating at higher speeds (e.g., when the gearbox 600 is in the high range mode) and therefore has a higher kinetic energy or momentum (which requires greater braking force to decelerate the vehicle 10). Advantageously, the gearbox 600 includes the brake 614 and the brake 616 which can function both to transfer torque for driving operations, and can also operate as brakes to decelerate the vehicle 10.

Figure 24:
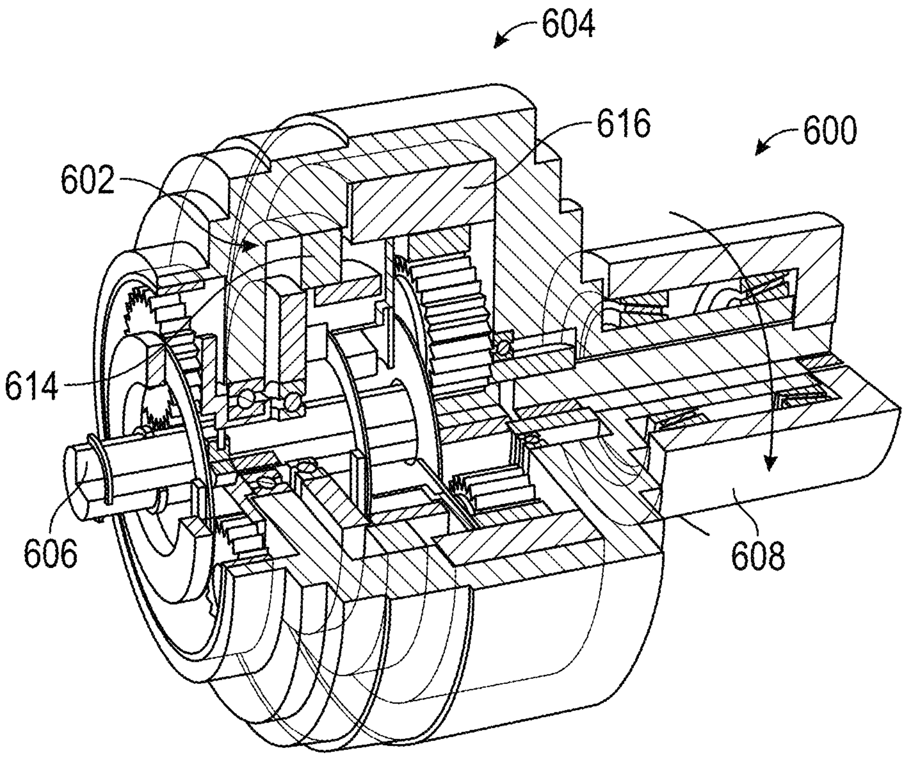
FIGS. 24-25 are perspective views of the gearbox of the electrical drive system of FIG. 2 in the high range mode, according to some embodiments.
Figure 25:
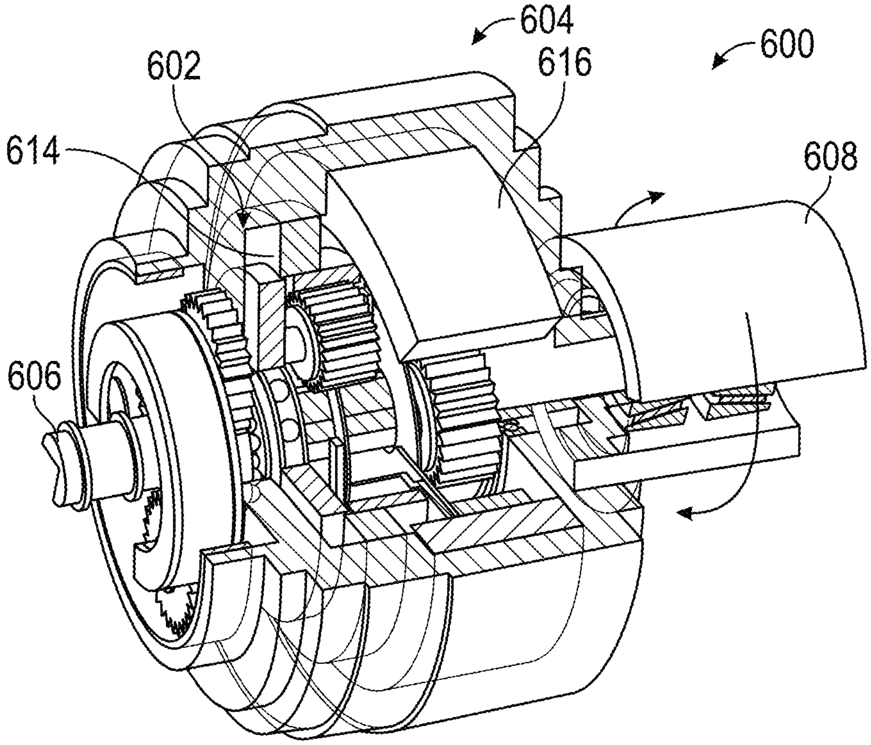
Figure 27:
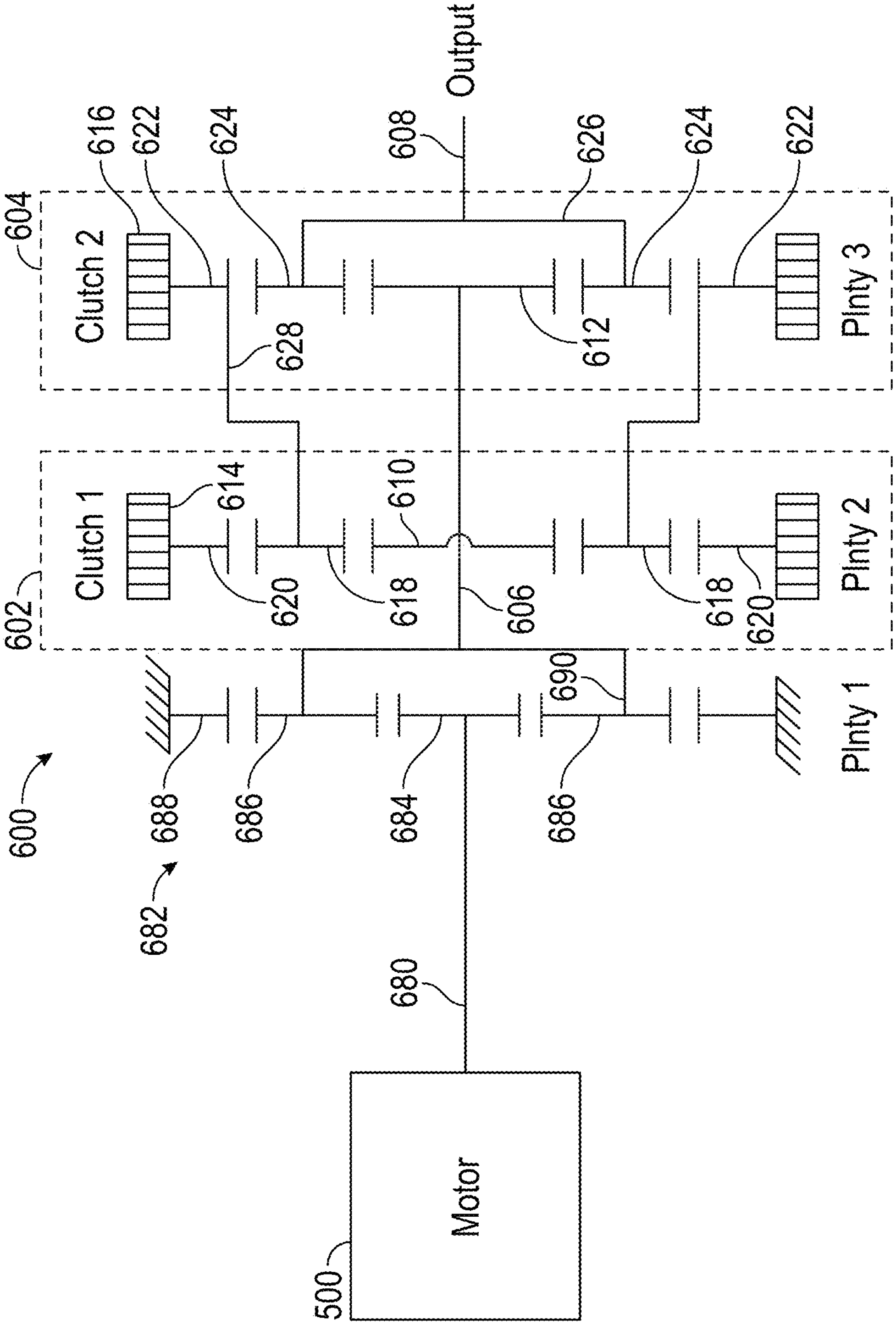
FIG. 27 is a block diagram of the gearbox of the electrical drive system of FIG. 2, according to some embodiments.

Referring to FIGS. 27-28, the gearbox 600 is shown operating in the low range mode with the brake 616 in the engaged state or position. When the gearbox 600 operates in the low range mode, the brake 614 may be selectively or partially engaged to provide a braking force to decelerate the vehicle 10. Referring to FIGS. 24-25, the gearbox 600 is shown operating in the high range mode with the brake 614 in the engaged state or position. When the gearbox 600 operates in the high range mode, the brake 616 may be selectively or partially engaged to provide a braking force to decelerate the vehicle 10.

Referring again to FIGS. 21 and 26, the brake 614 and the brake 616 may be pneumatically or hydraulically actuated. In some embodiments, the brake 614 and the brake 616 are driven by pressurization of a corresponding chamber such that the brake 614 and the brake 616 apply a corresponding clamping or braking force to the ring gear 620 and the ring gear 622, respectively. In some embodiments, when the brake 614 and the brake 616 are transitioned into the engaged state or position (e.g., the fully engaged state or position), the corresponding chamber is pressurized to a maximum amount such that the brake 614 and the brake 616 exert a maximum clamping or braking force to the ring gear 620 and the ring gear 622, respectively. When one of the brake 614 and the brake 616 is used for braking or deceleration of the vehicle 10, the corresponding chamber of a first of the brake 614 and the brake 616 may be pressurized to a degree or amount that is less than the maximum amount such that the first of the brake 614 and the brake 616 exerts a braking force to decelerate the vehicle 10, while a second of the brake 614 and the brake 616 exerts the maximum clamping or braking force (e.g., the corresponding chamber of the second of the brake 614 and the brake 616 is pressurized to the maximum amount).

Referring particularly to FIG. 21, the gearbox 600 may include a spring 692 configured to bias a member 696 to translate to transition the brake 614 into an engaged position. The brake 614 may be actuated hydraulically by filling a first chamber 615*a* in order to drive the member 696 such that the brake 614 is disengaged (e.g., to drive translation of the member 696 in a first direction). The brake 614 may also be actuated hydraulically by filling a second chamber 615*b* to drive the member 696 such that the brake 614 is engaged (e.g., to drive translation of the member 696 in a second direction). In some embodiments, filling or controlling the first chamber 615*a* (e.g., controlling pressure of hydraulic fluid in the first chamber 615*a*) is referred to as operating the internal park brake ("IPR") and filling or controlling the second chamber 615*b* (e.g., controlling pressure of hydraulic fluid in the second chamber 615*b*) is referred to as operating the internal service brake ("ISB").

Referring still to FIG. 21, the gearbox 600 may include a spring 694 configured to bias a member 698 to translate in a direction such that the brake 616 is engaged. In some embodiments, the member 698 can be translated in either direction by controlling a first chamber 617*a* or a second chamber 617*b* (e.g., controlling pressurization of hydraulic fluid to the first chamber 617*a* and the second chamber 617*b*). In some embodiments, increasing pressure of the hydraulic fluid in the first chamber 617*a* causes translation of the member 698 in a first direction such that the brake 616 is engaged, while decreasing pressure of the hydraulic fluid in the first chamber 617*a* causes translation of the member 698 in a second direction such that the brake 616 is disengaged. In some embodiments, increasing pressure of the hydraulic fluid in the second chamber 617*b* cause translation of the member 698 in the second direction such that the brake 616 is disengaged, while decreasing pressure of the hydraulic fluid in the second chamber 617*b* causes translation of the member 698 in the first direction such that the brake 616 is engaged. In some embodiments, controlling pressurization of the hydraulic fluid in the first chamber 617*a* is referred to as operating the external service brake ("ESB") and controlling the pressure of the hydraulic fluid in the second chamber 617*b* is referred to as operating the external park brake ("EPR").

Referring to FIGS. 20 and 27, the gearbox 600 may include a third planetary gear set, shown as planetary gear set 682. The third planetary gear set 682 is positioned upstream of the first planetary gear set 602 and does not include actuatable clutches for transitioning the modes of the gearbox 600. In some embodiments, the third planetary gear set 682 includes an input shaft 680 that is driven by the motor 500, a sun gear 684 that the input shaft 680 is coupled to and drives, multiple planetary gears 686 that are driven by the sun gear 684, a ring gear 688 that is fixed and limited from rotating, and a carrier 690 that is coupled with the input shaft 606 of the first planetary gear set 602. In some embodiments, the motor 500 drives the first planetary gear set 602 and the second planetary gear set 604 through the third planetary gear set 682.

Referring to FIGS. 29-32, the drive member 700 includes a manually actuatable disconnection point. As shown in FIGS. 29-32, the drive member 700 includes a drum 702 that includes a spline along an inner surface of the drum 702. The drum 702 defines an inner volume within which the output shaft 608 extends. The output shaft 608 extends to an end of the drum 702 and includes a flange 640 that defines a spline engagement along an outer surface of the flange 640. In some embodiments, the spline engagement of the flange 640 of the output shaft 608 and the spline engagement of the inner surface of the drum 702 are configured to engage with each other in order to transfer rotational kinetic energy from the output shaft 608 to the drum 702.

The drive member 700 includes a cam plate 704 that includes a tool engagement portion 706 (e.g., a shape or geometry such that a tool can be manually coupled to the cam plate 704). The cam plate 704 includes multiple camming members or surfaces, shown as first cam 710*a*, second cam 710*b*, and third cam 710*c*. The cams 710 may have the form of slanted or angled surfaces that are arranged in a circular pattern and increase in height along the circular pattern. The cams 710 may each include a hook or a recess at an end of the cams 710 (e.g., at a tallest portion of the cams 710).

The cam plate 704 may engage, touch, press against, contact, etc., an intermediate plate 708 that engages the flange 640 of the output shaft 608. The cam plate 704 may be rotatable about a longitudinal axis 750 between a first angular position and a second angular position. When the cam plate 704 is in the first angular position, the drum 702 is engaged with the flange 640 of the output shaft 608 such that rotation of the output shaft 608 drives rotation of the drum 702. When the cam plate 704 is rotated into the second angular position (e.g., by attaching a tool to the tool engagement portion 706 and rotating the cam plate 704 about the longitudinal axis 750), the flange 640 and the output shaft 608 are driven to translate along the longitudinal axis 750 such that the flange 640 is driven out of engagement with the drum 702 (e.g., the splines of the inner surface of the drum 702 and the outer surface of the flange 640 are driven out of engagement) so that the drum 702 can freely rotate relative to the output shaft 608. Advantageously, the cam plate 704 provides a manual way to disconnect the drum 702 from the output shaft 608 and therefore from the gearbox 600 entirely. In this way, if the gearbox 600 becomes damaged or jammed, the vehicle 10 can be manually transitioned into a neutral state where the drum 702 is physically disconnected from the gearbox 600 and the vehicle 10 can be towed.

Figure 28A:
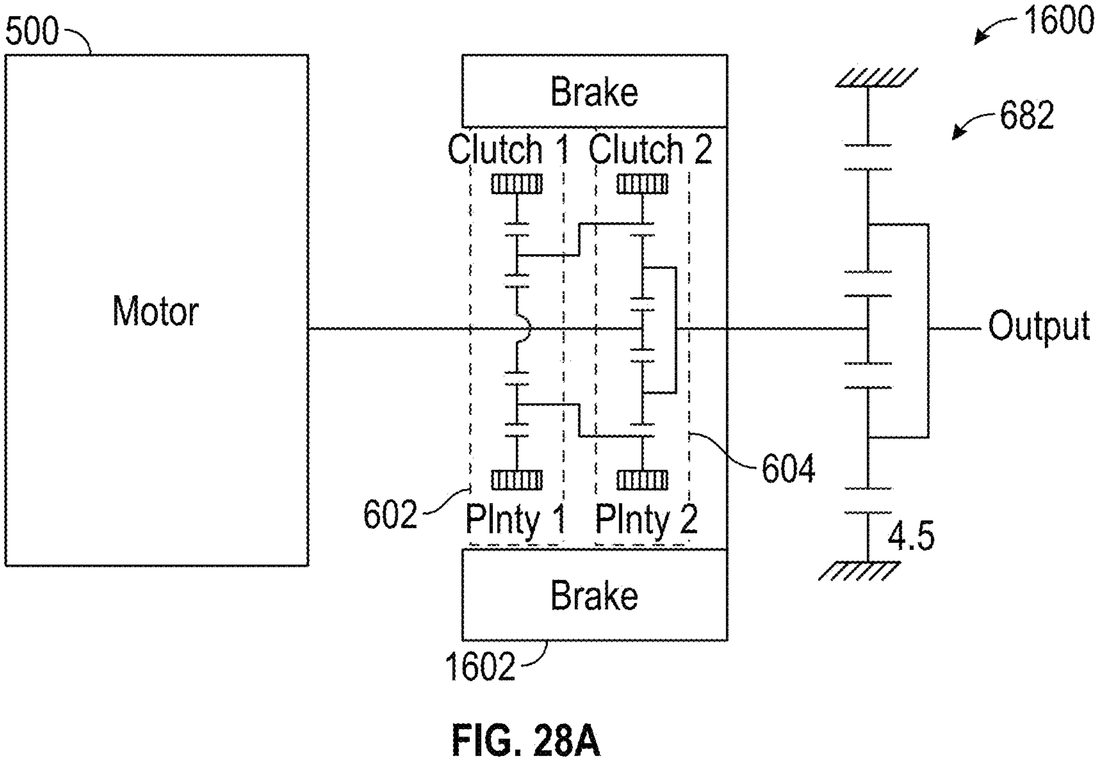
FIGS. 28A-28E are various alternative configurations of the gearbox of the electrical drive system of FIG. 2, according to some embodiments.

Referring to FIG. 28A, the gearbox 600 may be provided as gearbox 1600 including the planetary gear set 682 coupled on an output of the second planetary gear set 604. In the configuration of the gearbox 600 shown as gearbox 1600, the motor 500 drives the sun gears of the first gear set 602 and the second gear set 604, and the carrier of the second gear set 604 drives an input shaft of the gear set 682 (e.g., the sun gear). The gear set 682 outputs torque via the carrier of the gear set 682. The gear set 1600 may also include a brake 1602 that exerts a braking force in addition to or in place of braking force that is applied by the brake 614 or the brake 616 of the first planetary gear set 604 and the second planetary gear set 606. The brake 1602 may be configured to exert braking force onto a shaft that couples the carrier of the second planetary gear set 604 with the input shaft of the planetary gear set 682. In some embodiments, the planetary gear set 682 has a gear ratio of 4.5.

Figure 28B:
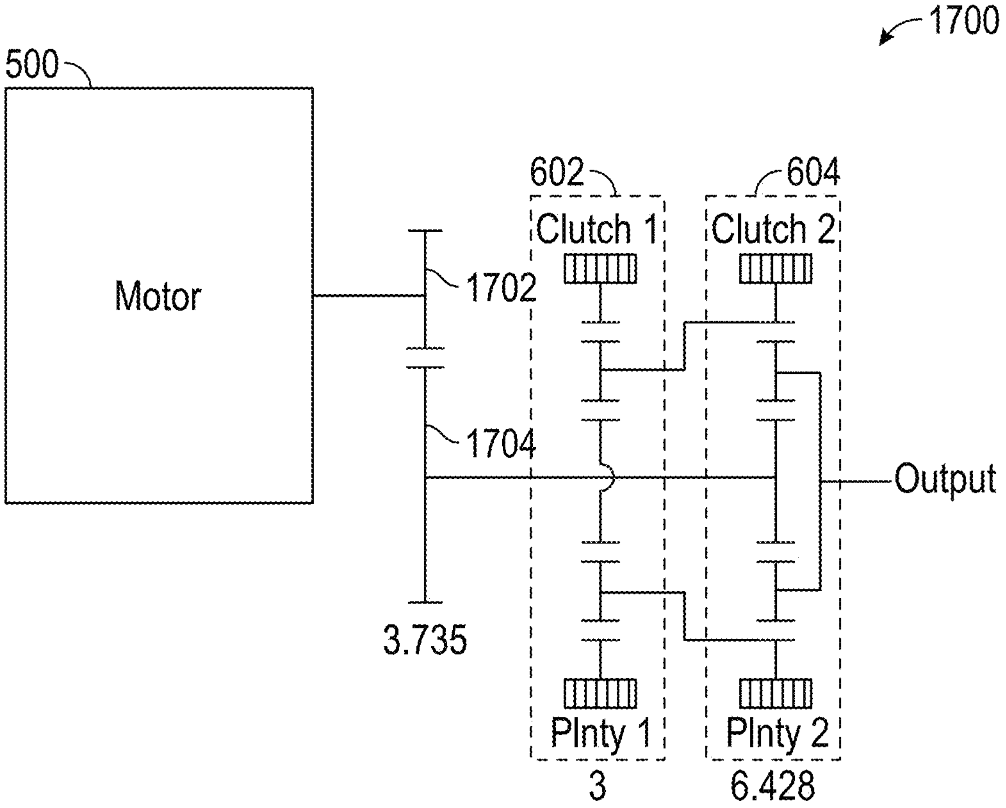

Referring to FIG. 28B, the gearbox 600 may be provided as gearbox 1700 including a first gear 1702 that is driven by an output shaft of the motor 500 and a second gear 1704 that is driven by the first gear 1702 and drives the input shaft of the first planetary gear set 602 and the second planetary gear set 604. In some embodiments, the first gear 1702 and the second gear 1704 can be used in place of the planetary gear set 682. In some embodiments, the second gear 1704 has a greater number of teeth than the first gear 1702. A gear ratio across the first gear 1702 and the second gear 1704 may be 3.735. A gear ratio of an input of the first planetary gear set 602 relative to an output of the first planetary gear set 602 may be 3. A gear ratio of an input of the second planetary gear set 604 relative to an output of the second planetary gear set 604 may be 6.426.

Figure 28C:
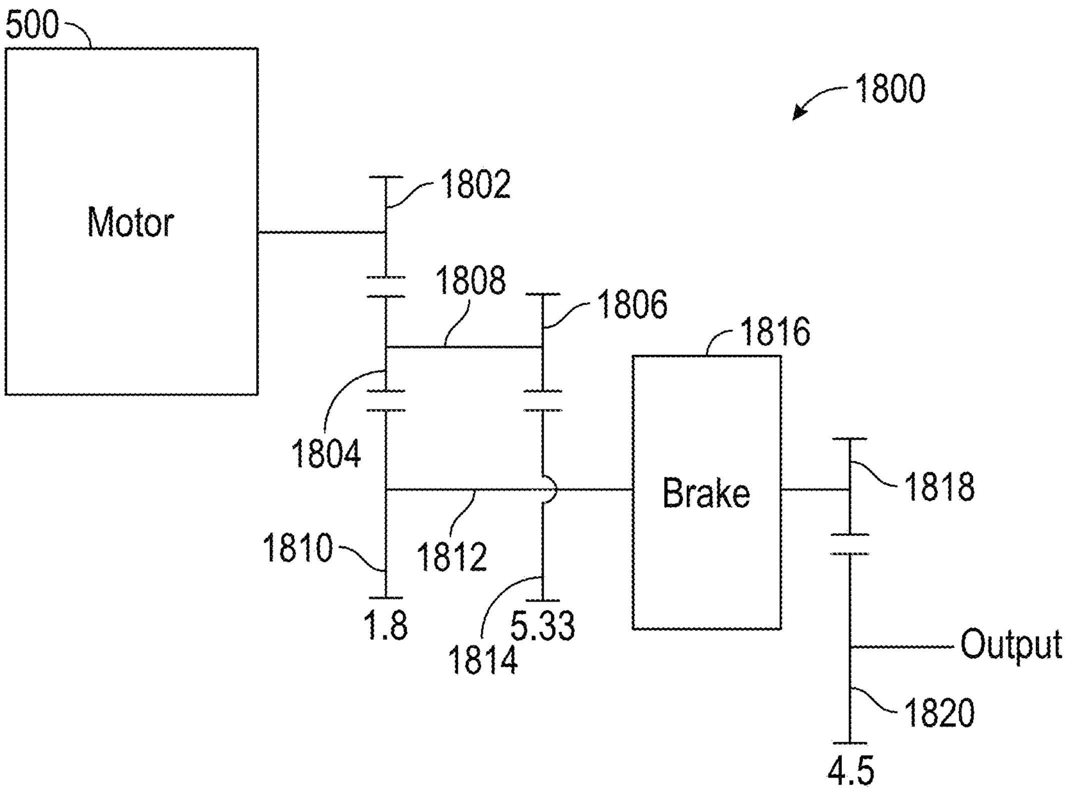

Referring to FIG. 28C, the gearbox 600 may be provided as gearbox 1800 including a drive gear 1802, a first gear 1804, a second gear 1806, a shaft connecting the first gear 1804 with the second gear 1806, a third gear 1810, a fourth gear 1814, a shaft 1812 connecting the third gear 1810 with the fourth gear 1814, a brake 1816, and a first output gear 1818 and a second output gear 1820. The motor 500 drives the drive gear 1802 which meshes with and drives the first gear 1804 and therefore also drives the second gear 1806 through the shaft 1808. The first gear 1804 meshes with the third gear 1810 and the second gear 1806 meshes with the fourth gear 1814. The third gear 1810 and the fourth gear 1814 are connected with each other via the shaft 1812 and are also connected with the first output gear 1818 through the shaft 1812. The brake 1816 is configured to apply a braking force or friction to the shaft 1812 to slow or decelerate the vehicle 10. The first output gear 1818 meshes with and drives the second output gear 1820 which drives an output shaft of the gearbox 1800.

Figure 28D:
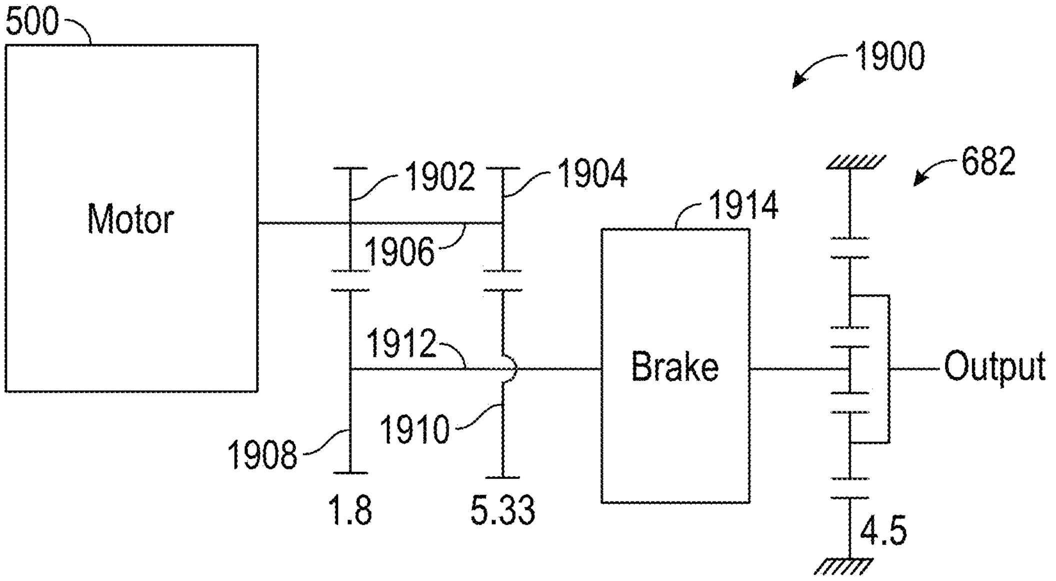

Referring to FIG. 28D, the gearbox 600 can be provided as gearbox 1900. The gearbox 1900 includes a first gear 1902 and a second gear that are both coupled on an output shaft 1906 of the motor 500. The gearbox 1900 also includes a third gear 1908 and a fourth gear 1910 that are coupled on a shaft 1912 and mesh with the first gear 1902 and the second gear 1904, respectively. The gearbox 1900 also includes a brake 1914 that is configured to exert a braking force on the shaft 1912. The gearbox 1900 includes the planetary gear set 682 that receives input torque from the shaft 1912 at the sun gear of the planetary gear set 682, and outputs torque via the carrier of the planetary gear set 682.

Figure 28E:
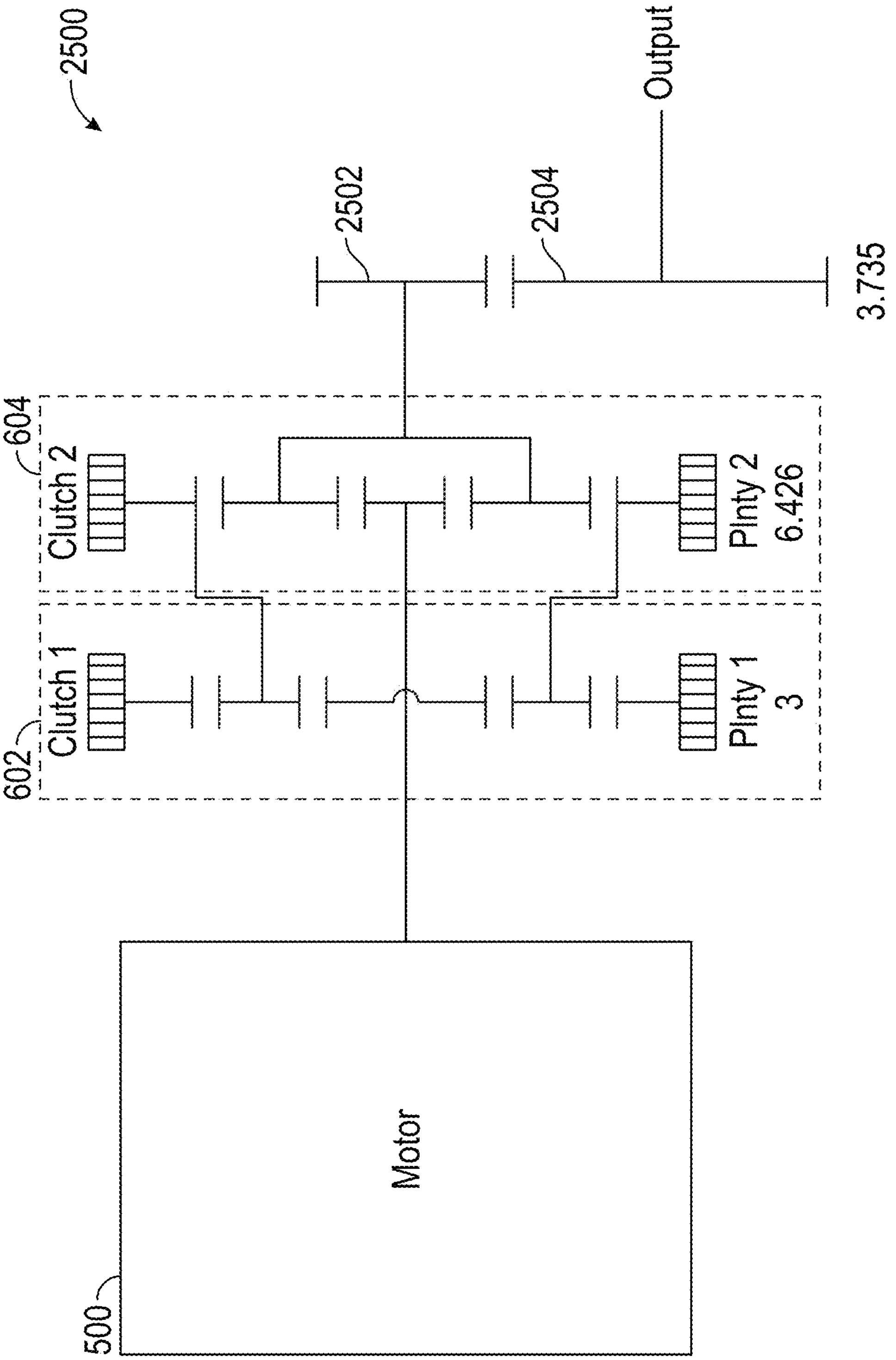

Referring to FIG. 28E, the gearbox 600 can be provided as gearbox 2500. The gearbox 2500 includes the first planetary gear set 602 and the second planetary gear set 604 which both receive input torque at their sun gears from the motor 500. The carrier of the second planetary gear set 604 drives a first output gear 2502 which meshes with a second output gear 2504. The first output gear 2502 and the second output gear 2504 may have a gear ratio of 3.735. The second output gear 2504 drives an output shaft.

Pump System

Figure 33:
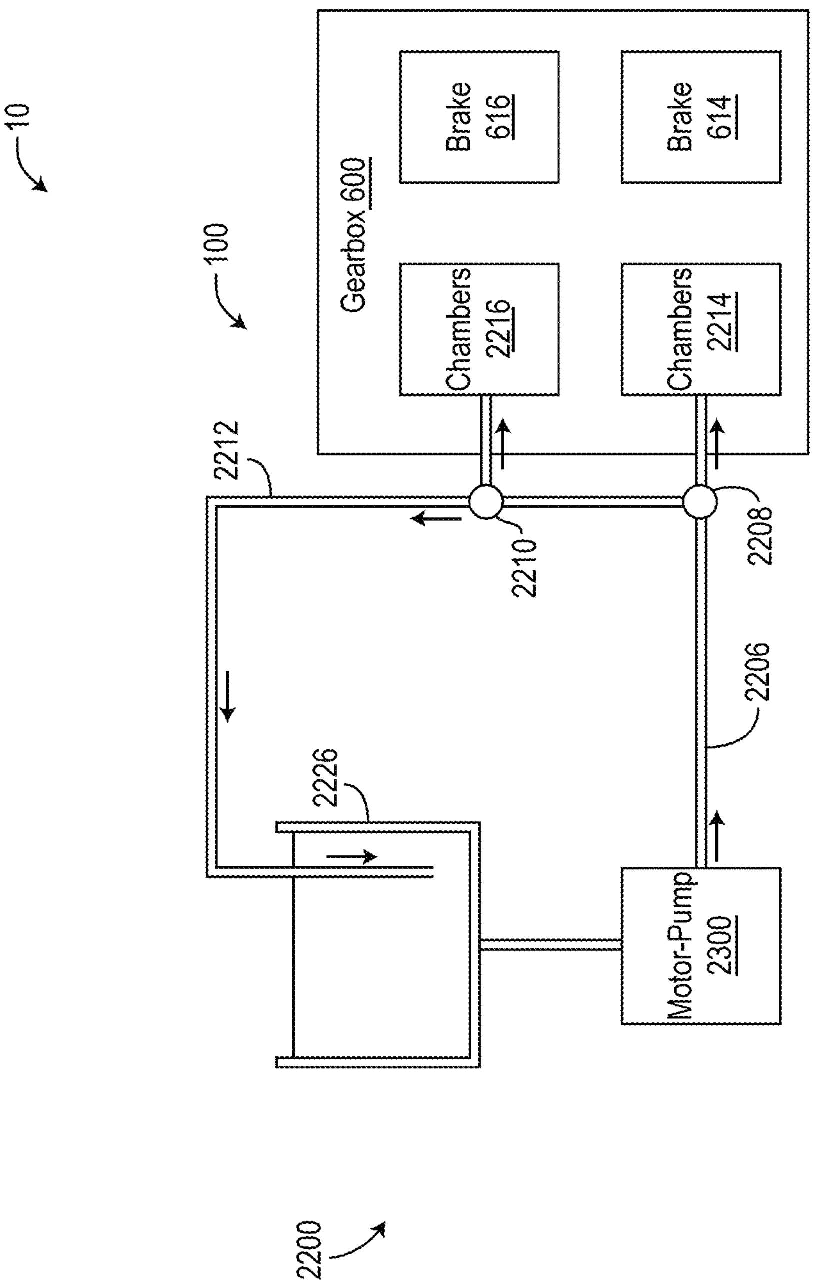
FIG. 33 is a block diagram of a pump system for the vehicle of FIG. 2, according to some embodiments.

Referring to FIG. 33, the vehicle 10 may include a hydraulic or pump system, shown as pump system 2200. The pump system 2200 includes a motor-pump 2300, one or more conduits, lines or tubular members, shown as lines 2206, one or more valves or manifolds, shown as valve 2208 and valve 2210, a return line 2212, and a hydraulic reservoir 2226. The pump system 2200 is configured to provide hydraulic fluid or pressurized fluid to one or more hydraulically actuatable or controllable components of the vehicle 10. For example, the lines 2206 may be configured to provide pressurized hydraulic fluid to a chamber 2214 (e.g., chambers 615) associated with the brake 614 to transition the brake 614 between the engaged state, the disengaged state, or a partially engaged state. Similarly, the lines 2206 may also be configured to provide pressurized hydraulic fluid to a chamber 2216 (e.g., chambers 617) associated with the brake 616 to transition the brake 616 between the engaged state, the disengaged state, or a partially engaged state. In some embodiments, the valves 2208 and 2210 are controllable to adjust a pressurization of the chambers 2214 and 2216 and therefore control a braking force applied by the brake 614 or the brake 616. In some embodiments, the valves 2208 and 2210 are electrically controllable by a controller or a control system of the vehicle 10. The motor-pump 2300 may be an electrically driven pump including an electric motor. The motor-pump 2300 is supplied with hydraulic fluid from the reservoir 2226 (e.g., a tank, a container, a reservoir, etc.).

Referring to FIGS. 34-38, the motor-pump 2300 includes an electric motor 2306, an adapter plate 2304, and a pump 2302. The motor-pump 2300 may have an overall length 2308 that is substantially equal to 195 mm. In some embodiments, the motor-pump 2300 has an overall length 2308 that is less than 200 mm. In some embodiments, the motor-pump 2300 has an overall length 2308 of 195.3 mm. In some embodiments, the motor-pump 2300 has an overall length 2308 of less than 260 mm. The motor-pump 2300 may be configured to pressurize hydraulic fluid to at least 100 bar, and may consume electrical energy at 24 volts. In some embodiments, the electric motor 2306 uses direct current (DC) electrical energy at 24 volts. The motor-pump 2300 may also be configured to provide discharge of hydraulic fluid or oil at a rate of at least 3 liters per minute (lpm). In some embodiments, the motor-pump 2300 is configured to provide discharge of hydraulic fluid or oil at a rate of at least 3 lpm.

Figure 34:
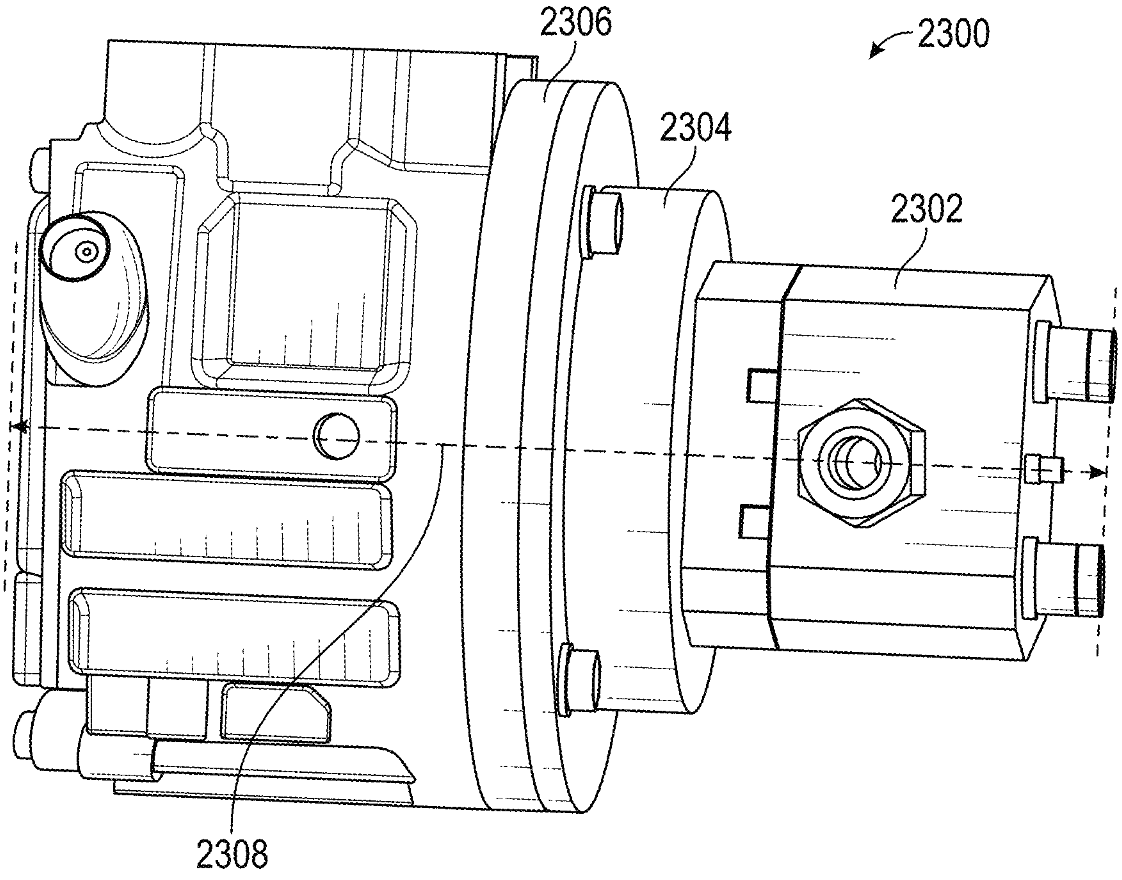
FIG. 34 is a perspective view of a high pressure pump of the pump system of FIG. 33, according to some embodiments.

Referring particularly to FIG. 34, the electric motor 2306 is coupled with the pump 2302 through the adapter plate 2304. The adapter plate 2304 may be a structural member that includes structure so that the electric motor 2306 is configured to drive a driveshaft of the pump 2302.

Figure 35:
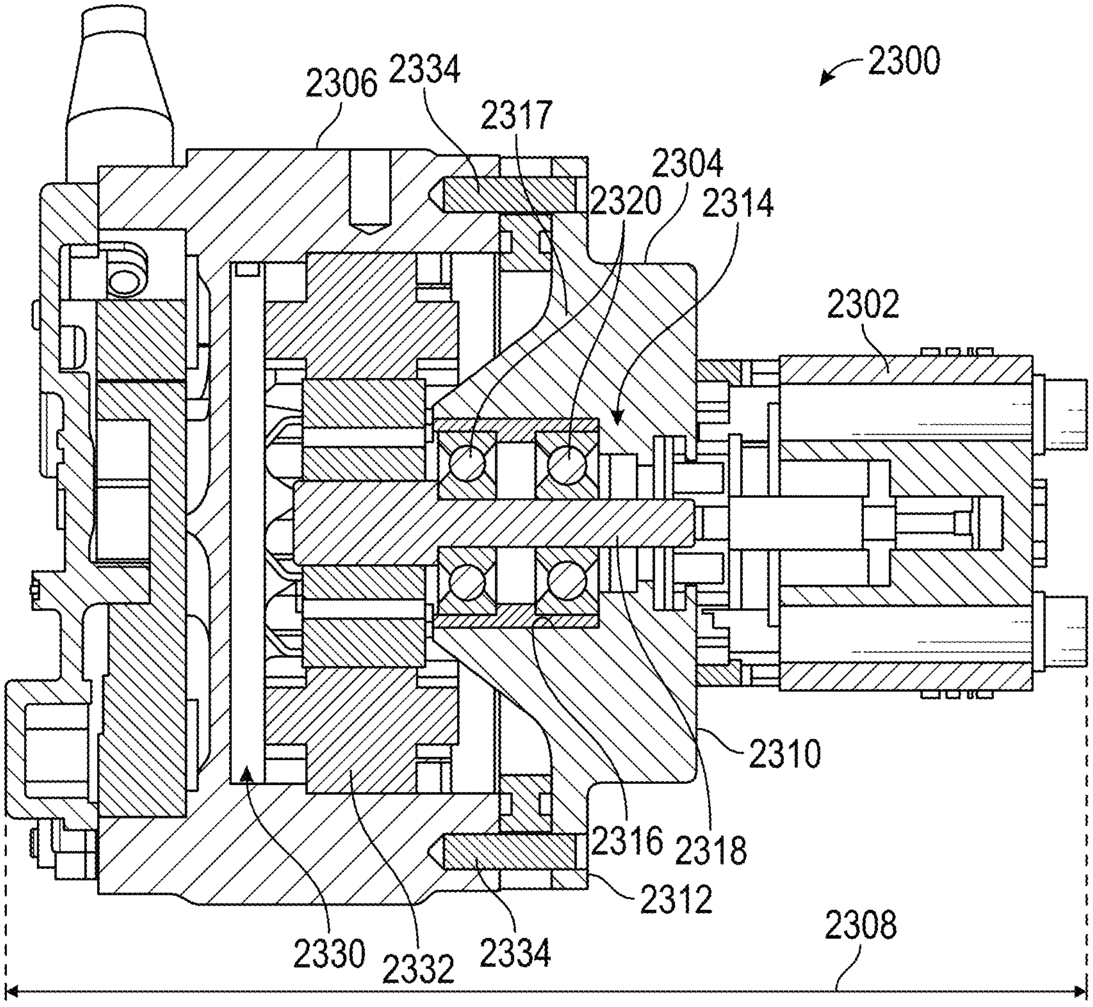
FIG. 35 is a sectional view of the high pressure pump of FIG. 34, according to some embodiments.

Referring particularly to FIG. 35, the electric motor 2306 may be coupled with a driveshaft 2318 of the pump 2306. The driveshaft 2318 extends through an opening 2314 in the adapter plate 2304 and couples, at an opposite end of the pump 2302, with one or more motor components (e.g., a rotor) of the motor 2306. The motor components 2332 are positioned within an inner volume 2330 of the motor 2306. The adapter plate 2304 includes a hub portion 2310, a flange 2312 that extends outwards from the hub portion 2310, and a frustoconical portion 2317 (e.g., a second hub portion, a second central portion, etc.). The opening 2314 of the adapter plate 2304 extends centrally through the hub portion 2310 and the frustoconical portion 2317 and defines an opening or channel through which the drive shaft 2318 extends. In some embodiments, the opening 2314 and the frustoconical portion 2317 define an inner surface 2316 (e.g., a circular surface, a surface of a bore, etc.) for receiving one or more bearings 2320 (e.g., outer races of the bearings 2320) of the motor-pump 2300. The bearings 2320 may be press fit into the inner surface 2316. The drive shaft 2318 extends through the bearings 2320 and couples with an inner surface of an inner race of the bearings 2320.

Referring particularly to FIGS. 35-38, the motor-pump 2300 may include pins 2334 that extend through openings in the flange 2312 and extend into corresponding openings in the housing or structural portion of the motor 2306. The pins 2334 facilitate securing the adapter plate 2304 with the housing of the motor 2306 such that the motor 2306 can drive the driveshaft 2318 to rotate and thereby drive the pump 2302 to pressurize fluid. The pins 2334 may extend through openings 2336 in the flange 2312. In some embodiments, the motor-pump 2300 includes a pair of two pins 2334.

Figure 36:
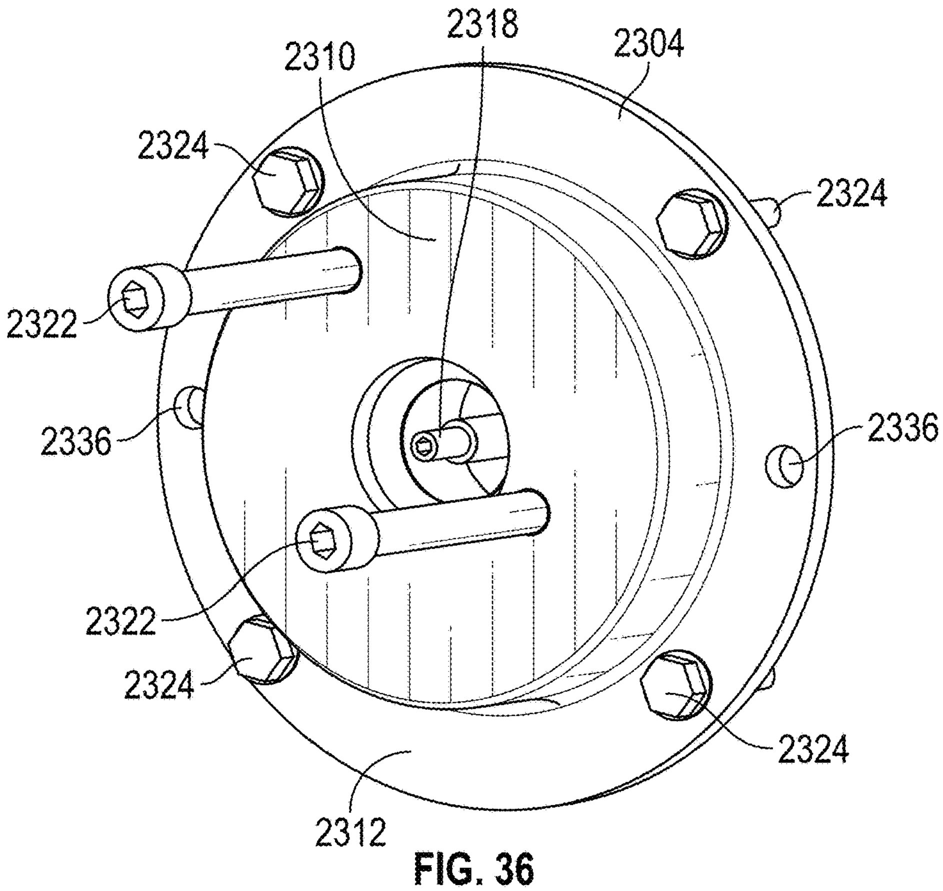
FIG. 36 is a first perspective view of an adapter plate of the high pressure pump of FIG. 33, according to some embodiments.
Figure 37:
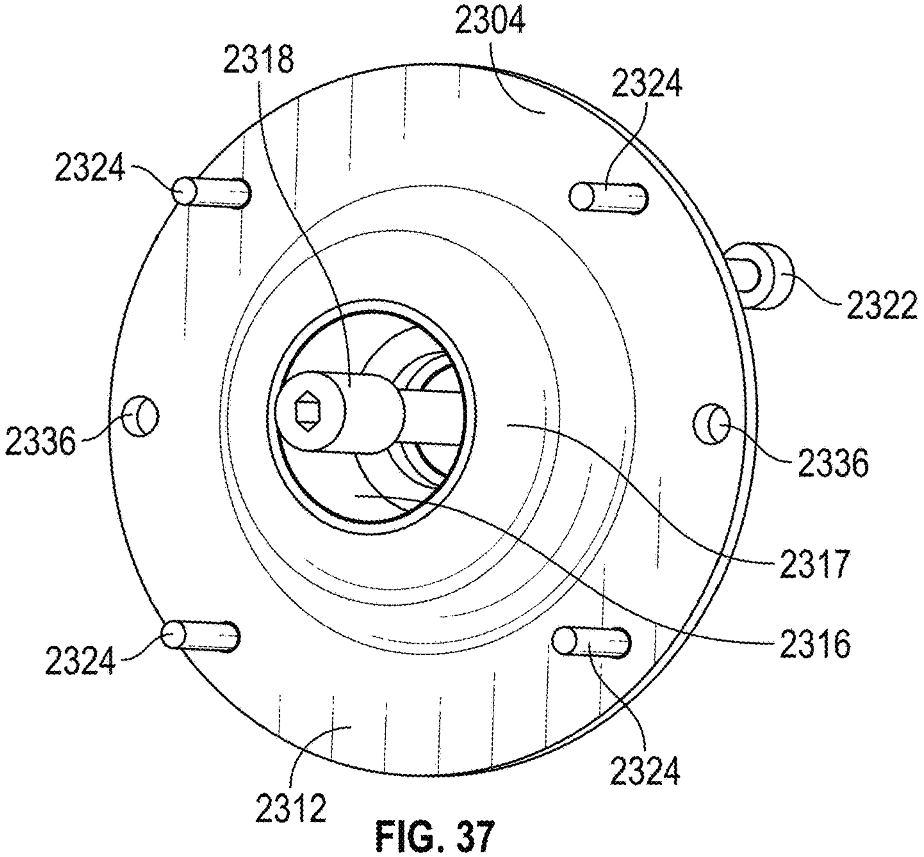
FIG. 37 is a second perspective view of the adapter plate of FIG. 36, according to some embodiments.
Figure 38:
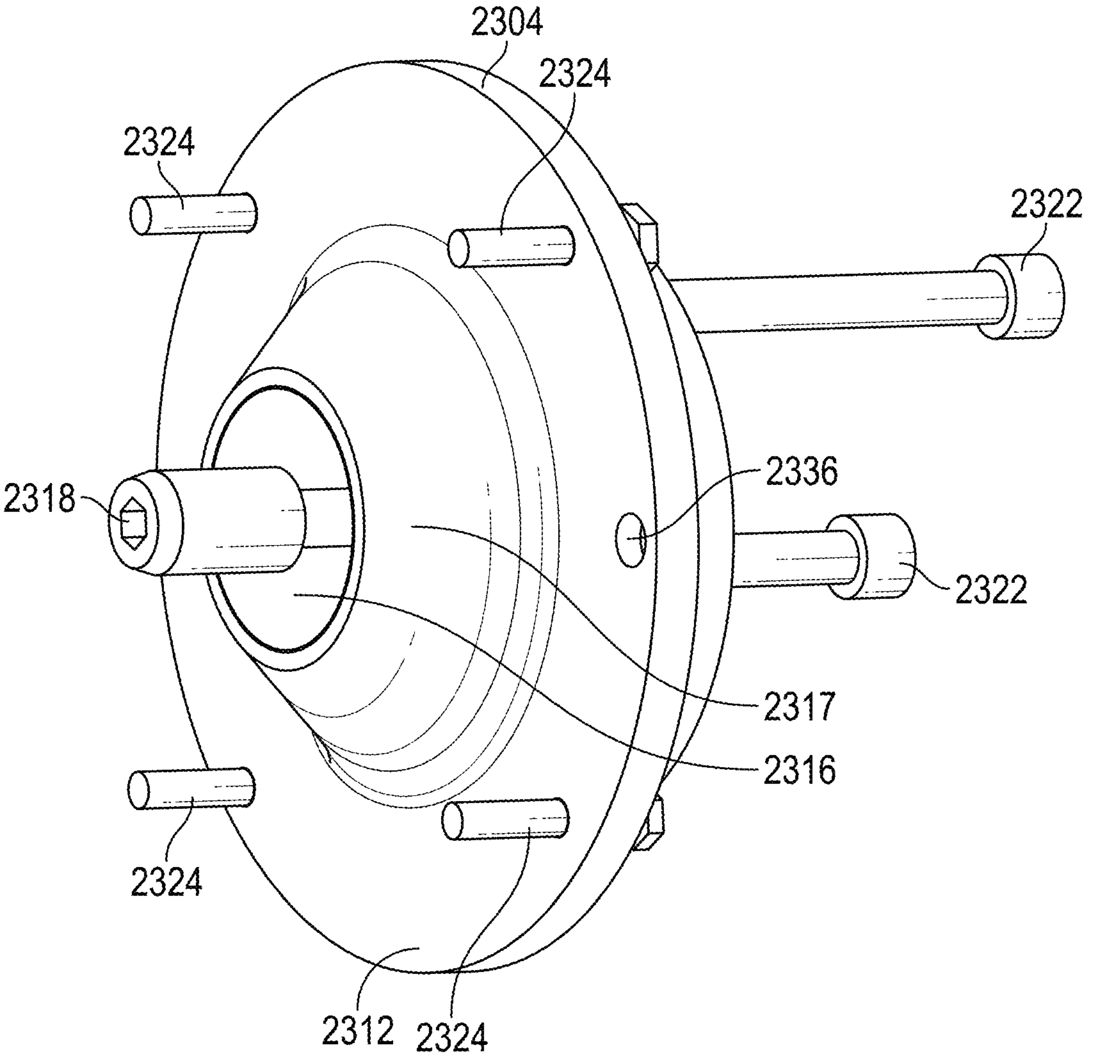
FIG. 38 is a third perspective view of the adapter plate of FIG. 36, according to some embodiments.

Referring to FIGS. 36-38, the motor-pump 2300 includes first fasteners 2324 that extend from the hub 2310 side of the flange 2312 to the frustoconical portion 2317 side of the flange 2312. The first fasteners 2324 extend through the flange 2312 and are configured to threadingly couple with the housing of the motor 2306 to secure the adapter plate 2304 on the motor 2306. The motor-pump 2300 also includes second fasteners 2322 that extend through the hub portion 2310 and threadingly couple with the pump 2302. In some embodiments, the fasteners 2322 include two fasteners.

In some embodiments, the motor-pump 2300 is a 24 volt DC brushless oil pump assembly including a gear pump. The motor-pump 2300 may be assembled by removing a pump portion and pump driveshaft to be removed out of a motor armature of an existing or off the shelf motor-pump. The driveshaft 2318 (e.g., a new, reduced length driveshaft) may then be pressed into the armature of the motor 2306 in the same position. The bearing collar and ball bearings may be removed from the pump 2302 and installed onto the adapter plate 2304. The motor armature and driveshaft assembly may then be reinstalled onto the motor 2306. After this is completed, the adapter plate 2304 may be aligned with the pins 2334 of the motor 2306 and the fasteners 2324 can be installed. A tang of the pump 2302 may then be aligned with a slot in the driveshaft 2318 so that the pump 2302 can be seated onto the adapter plate 2304. The housing of the pump 2302 may be aligned with the two threaded openings (e.g., for the fasteners 2322) and the fasteners 2322 can be installed. Advantageously, the driveshaft 2318 and the adapter plate 2304 facilitate a reduced length motor-pump 2300 which facilitates packaging flexibility and reduced weight.

Figure 39:
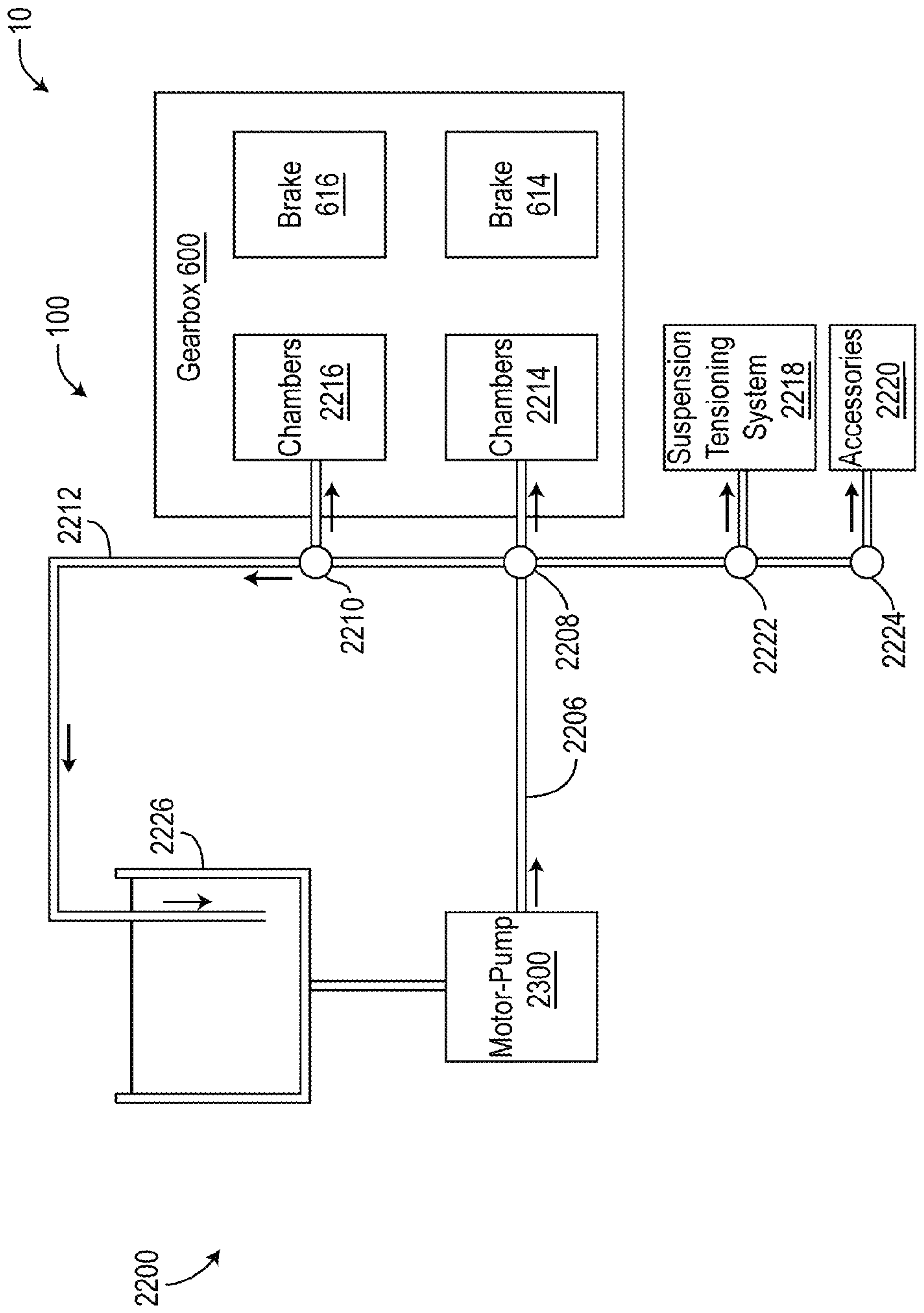
FIG. 39 is a block diagram of the pump system of FIG. 33, according to some embodiments.

Referring to FIG. 39, the pump system 2200 may include a suspension tensioning system 2218 and one or more accessories of the vehicle 10 that receive pressurized hydraulic fluid or oil from the motor-pump 2300 through the lines 2206 and corresponding valves 2222 and 2224. In some embodiments, the motor-pump 2300 is configured to provide pressurized hydraulic fluid to the suspension tensioning system 2218 to adjust a stiffness or ride height of one or more suspension elements of the vehicle 10. In some embodiments, the accessories 2220 include various actuators, body actuators, turret control members, etc. The motor-pump 2300 may be capable of providing sufficient pressurization and volumetric flow rate of the hydraulic fluid or the oil for the chamber 2216, the chamber 2214, the suspension tensioning system 2218, and the accessories 2220 while having the overall length 2308 of less than 200 mm.

Control System

Figure 40:
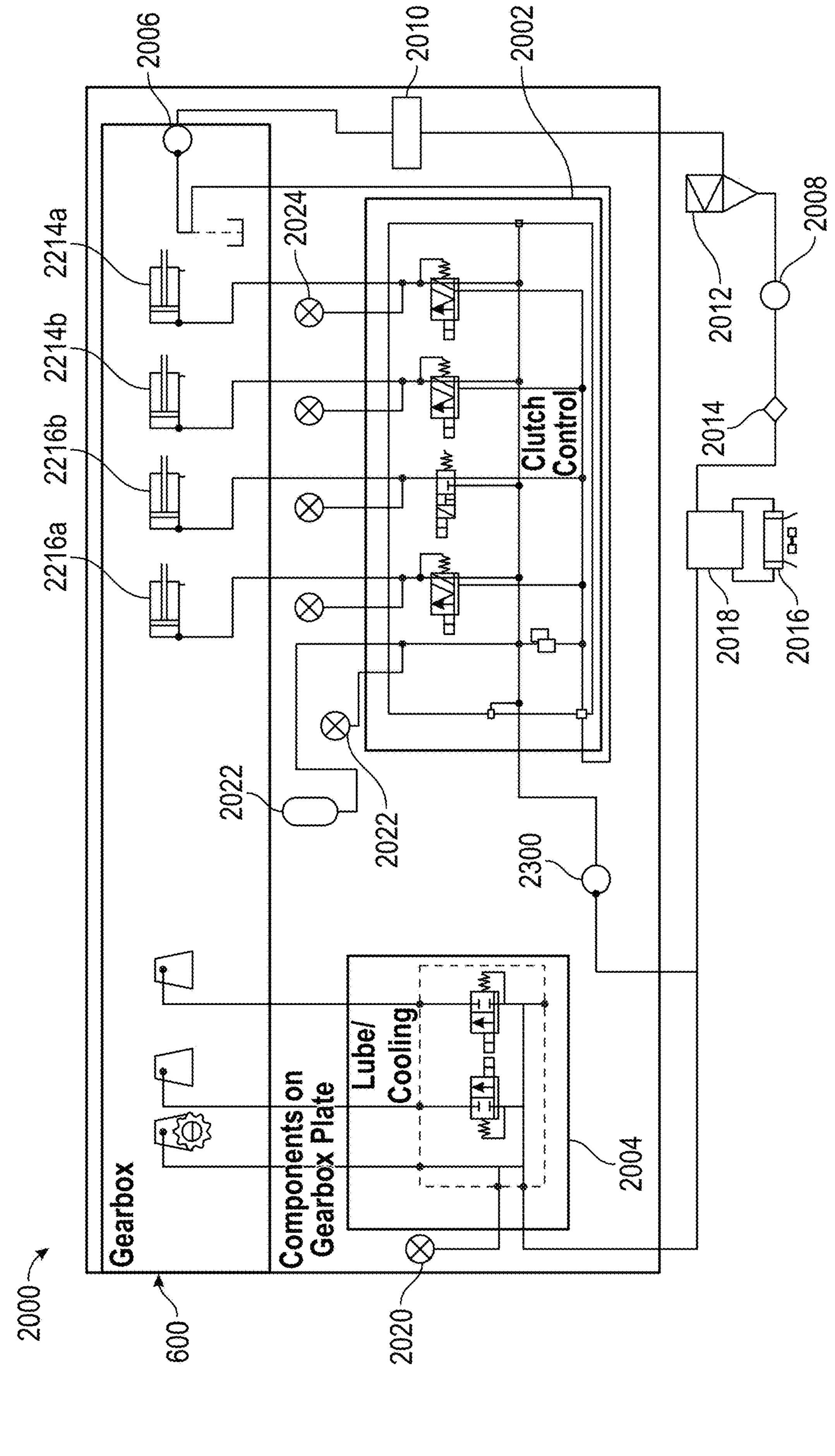
FIG. 40 is a hydraulic schematic of a hydraulic system for operating the gearbox of FIG. 21, according to some embodiments.

Referring to FIG. 40, a system 2000 for controlling the gearbox 600 includes the gearbox 600, and one or more components that may be mounted on a plate of the gearbox 600. The system 2000 includes the gearbox 600, a clutch control unit 2002 for controlling the clutches 614 and 616 of the gearbox 600, a lubrication/cooling control unit 2004, a scavenge oil pump 2006, a low pressure pump 2008, a high pressure pump (e.g., pump 2300), an oil temperature sensor sump 2010 (e.g., a temperature sensor configured to measure a temperature of oil or hydraulic fluid returned from the brake 614 or the brake 616), an oil reservoir 2012 including one or more temperature sensors and integral level, a filter 2014, a cooler 2016 that uses air to cool the oil or hydraulic fluid, a thermostat controller 2018, a pressure sensor 2020, a high pressure accumulator 2022, the ESB, shown as chamber **2216*a*, the EPR, shown as chamber 2216*b*, the ISB, shown as chamber 2214*b*, the IPR, shown as chamber 2214*a*, a pressure sensor accumulator 2022, and one or more pressure sensors 2024 that are configured to measure pressure of the corresponding chamber 2216*a*, chamber 2216*b*, chamber 2214*a*, and chamber 2214*b* (e.g., a brake status of the brake 614 and the brake 616). As described in greater detail above with reference to the structure of the gearbox 600, the gearbox 600 may include, as a safety feature, one or more springs that apply to the brake 614 and the brake 616 such that, if hydraulic failure occurs, the gearbox 600** automatically transitions into the park mode.

Referring still to FIG. 40, the clutch control unit 2002 is supplied with oil or hydraulic fluid by the pump 2300 which is directed to the chamber **2216*a*, the chamber 2216*b*, the chamber 2214*a*, and the chamber 2214*b* by four corresponding solenoids in order to control operation of the gearbox 600 by activating or de-activating the brake 614 and the brake 616 (e.g., fully disengaging or engaging, or partially engaging to perform braking). In some embodiments, the gearbox 600 is transitioned into the low range (e.g., the low range mode of operation) by providing hydraulic fluid or oil to, and thereby pressurizing, the chamber 2216***a*, the chamber 2216*b*, and the chamber 2214*a*. Braking in the low range mode can be achieved by releasing pressure of the chamber 2214*a* and applying variable pressure to the chamber 2214*b*. In some embodiments, an amount of the variable pressure applied to the chamber 2214*b* results in corresponding deceleration or braking of the vehicle 10.

In some embodiments, the gearbox 600 can be transitioned into the high range mode by pressurizing the chamber 2216*b* and the chamber 2214*b*. Braking events while operating in the high range mode can be achieved by providing variable pressure to the chamber 2216*a* responsive to an amount of braking or deceleration requested by an operator of the vehicle 10. In some embodiments, shifting between the high and the low range modes of operation of the gearbox 600 can be achieved by applying or releasing pressure of the chamber 2216*a*, 2216*b*, 2214*a*, or 2214*b* according to the high range and low range mode to transition the gearbox 600 between the high range mode and the low range mode. In some embodiments, the gearbox 600 is limited from transitioning between the high range mode and the low range mode if the vehicle 10 is traveling at a speed greater than a threshold amount in order to protect the motor 500 from over speeding. In some embodiments, emergency braking can be performed while the gearbox 600 operates in either the high range mode or the low range mode by releasing all of the pressure to the chamber 2216*a*, the chamber 2216*b*, the chamber 2214*a*, and the chamber 2214*b*. Releasing the pressure to the chambers 2214 and the chamber 2216 results in both the brake 614 and the brake 616 being transitioned into the fully engaged state (e.g., by the springs) to thereby halt the vehicle 10.

Figure 41:
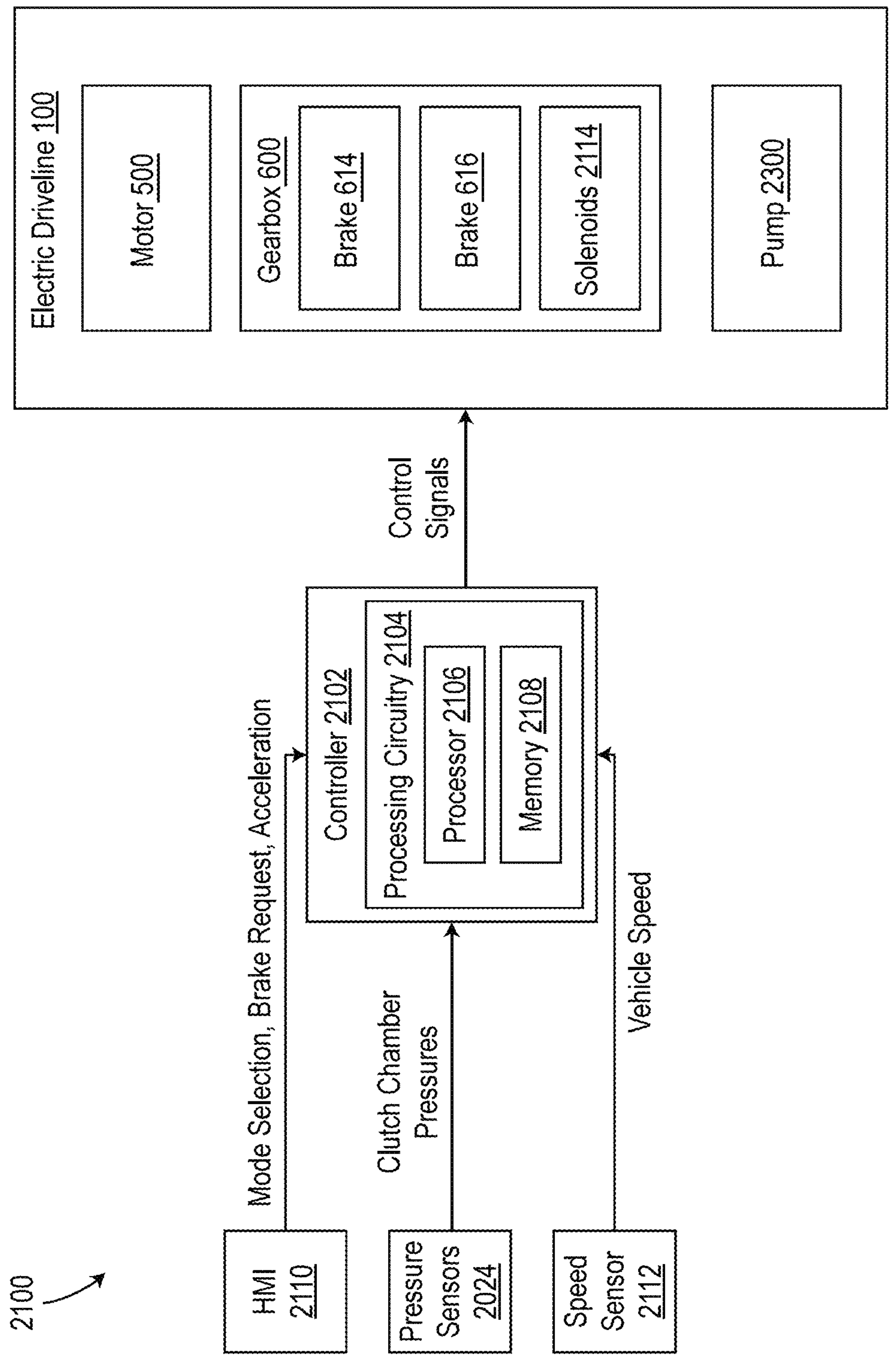
FIG. 41 is a block diagram of a controls system for controlling the electric driveline of FIG. 2, according to some embodiments.

Referring to FIG. 41, a control system 2100 for the electric driveline 100 of the vehicle 10 includes a controller 2102, a human machine interface ("HMI") 2110 (e.g., an accelerator pedal, a brake pedal, a steering wheel, a user interface, a gear or mode selector, a shifter, etc.), the pressures sensors 2024, a speed sensor 2112, and the electric driveline 100. The speed sensor 2112 is configured to measure a speed of the vehicle 10 such that the controller 2102 can either allow or limit transition of the driveline 100 and the gearbox 600 based on the vehicle speed compared to a threshold. In some embodiments, the operator of the vehicle 10 can provide a mode selection, a brake request, and an acceleration request to the controller 2102 via the HMI 2110. It should be understood that the operator of the vehicle 10 may be in a remote position and can provide the various control inputs via the HMI 2110 in a remote manner such that the vehicle 10 operates without an on-board operator. In some embodiments, the operator is an on-board operator or driver and operates an HMI 2110 to provide control inputs at a passenger location of the vehicle 10.

Referring still to FIG. 41, the controller 2102 is configured to receive measurements of pressure within the chambers 2214 and the chambers 2216 from the pressure sensors 2024. The controller 2102 can use the pressure provided by the pressure sensors 2024, a currently selected mode, and the brake requests in order to determine appropriate pressurizations of the chamber 2214 and the chamber 2216 to achieve the brake requests. In some embodiments, the controller 2102 is configured to implement a closed-loop control scheme and uses the pressure provided by the pressure sensors 2024 as feedback in order to determine adjustments to the variable pressurization of one or more of the chamber 2214 or the chamber 2216 in order to achieve the brake request. The controller 2102 may also use the vehicle speed as feedback to determine adjustments of the variable pressurization of the chambers 2214 and the chamber 2216 in order to achieve the brake request. In some embodiments, the controller 2102 is configured to provide control signals to the motor 500, the gearbox 600 (e.g., the brake 614 and the brake 616 by providing control signals to solenoids 2114 that adjust pressurization or variable pressurization of the chambers 2214 and the chambers 2216). In some embodiments, the controller 2102 is also configured to provide control signals to the pump 2300 or any of the components of the system 2000 as described in greater detail above with reference to FIG. 40. In some embodiments, the controller 2102 is configured to increase torque or speed output of the motor 500 according to the acceleration provided by the operator via the HMI 2110. In some embodiments, the controller 2102 is configured to operate the brake 614 and the brake 616 to engage or disengage in order to transition the vehicle 10, the electric driveline 100, and/or the gearbox 600 between different modes including a park mode in which both the brake 614 and the brake 616 are engaged, a neutral mode in which both the brake 614 and the brake 616 are disengaged, a first driving mode (e.g., a high mode) in which a first of the brake 614 and the brake 616 is engaged and the other is disengaged and used for braking, and a second driving mode (e.g., a low mode) in which a second the brake 614 and the brake 616 is engaged and the other is disengaged and used for braking.

Referring still to FIG. 41, the controller 2102 is shown to include a circuit, shown as processing circuitry 2104, a processor, shown as processor 2106, and memory, shown as memory 2108, according to some embodiments. Controller 2102 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. Processing circuitry 2104 may include an ASIC, one or more FPGAs, a DSP, circuits containing one or more processing components, circuitry for supporting a microprocessor, a group of processing components, or other suitable electronic processing components (e.g., processor 2106). In some embodiments, processing circuitry 2104 is configured to execute computer code stored in memory 2108 to facilitate the activities described herein. Memory 2108 may be any volatile or non-volatile computer-readable storage medium capable of storing data or computer code relating to the activities described herein. According to an exemplary embodiment, memory 2108 includes computer code modules (e.g., executable code, object code, source code, script code, machine code, etc.) configured for execution by processing circuitry 2104. Memory 2108 includes various actuation profiles corresponding to modes of operation (e.g., for the gearbox 600, according to an exemplary embodiment. In some embodiments, controller 2102 may represent a collection of processing devices (e.g., servers, data centers, etc.). In such cases, processing circuitry 2104 represents the collective processors of the devices, and memory 2108 represents the collective storage devices of the devices.

Gearbox with Integrated Sensor

Figure 42:
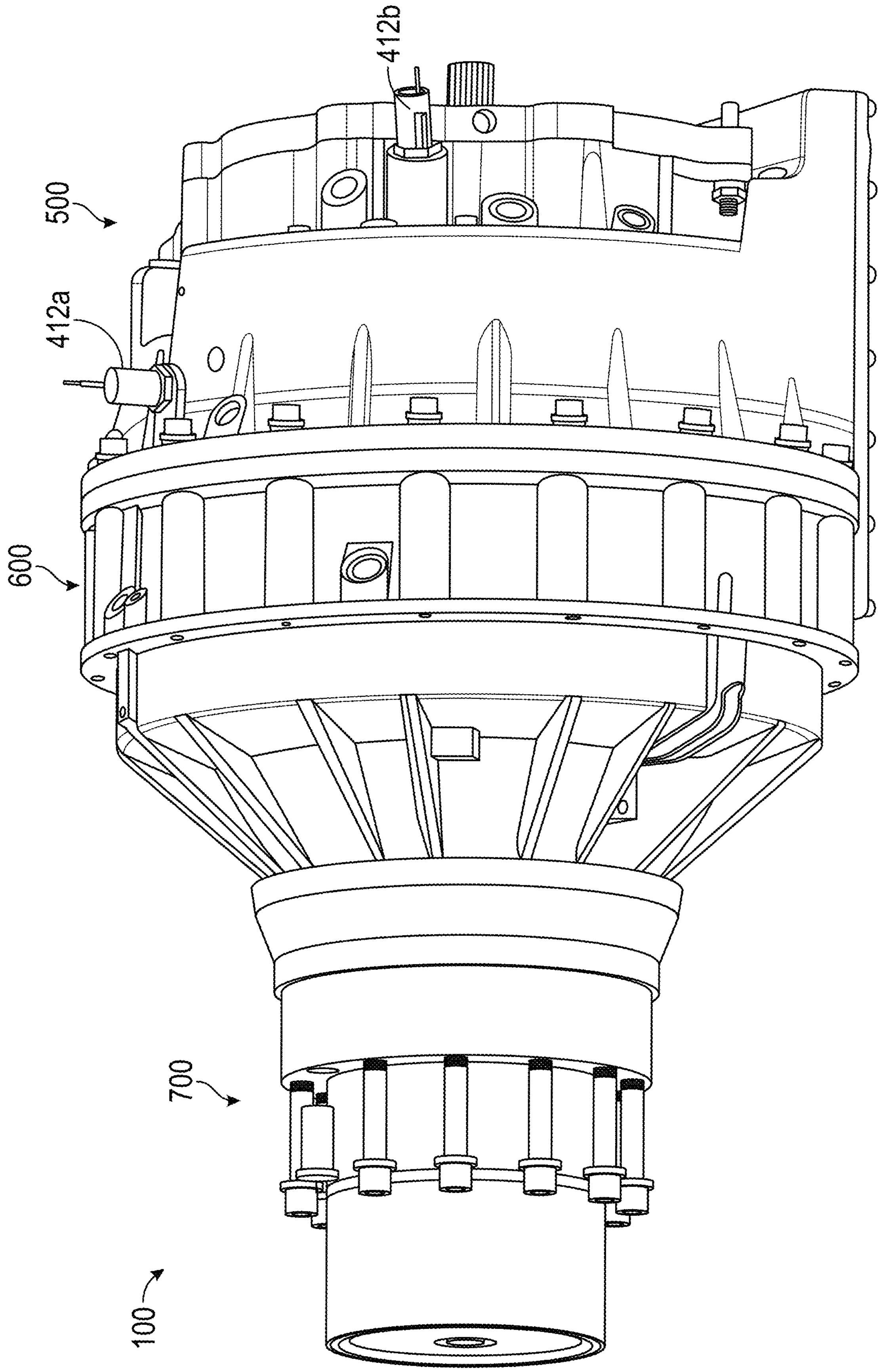
FIG. 42 is a perspective view of the electrical drive system of FIG. 2 equipped with two positional sensors of the brake detection system of FIG. 6, according to some embodiments.
Figure 43:
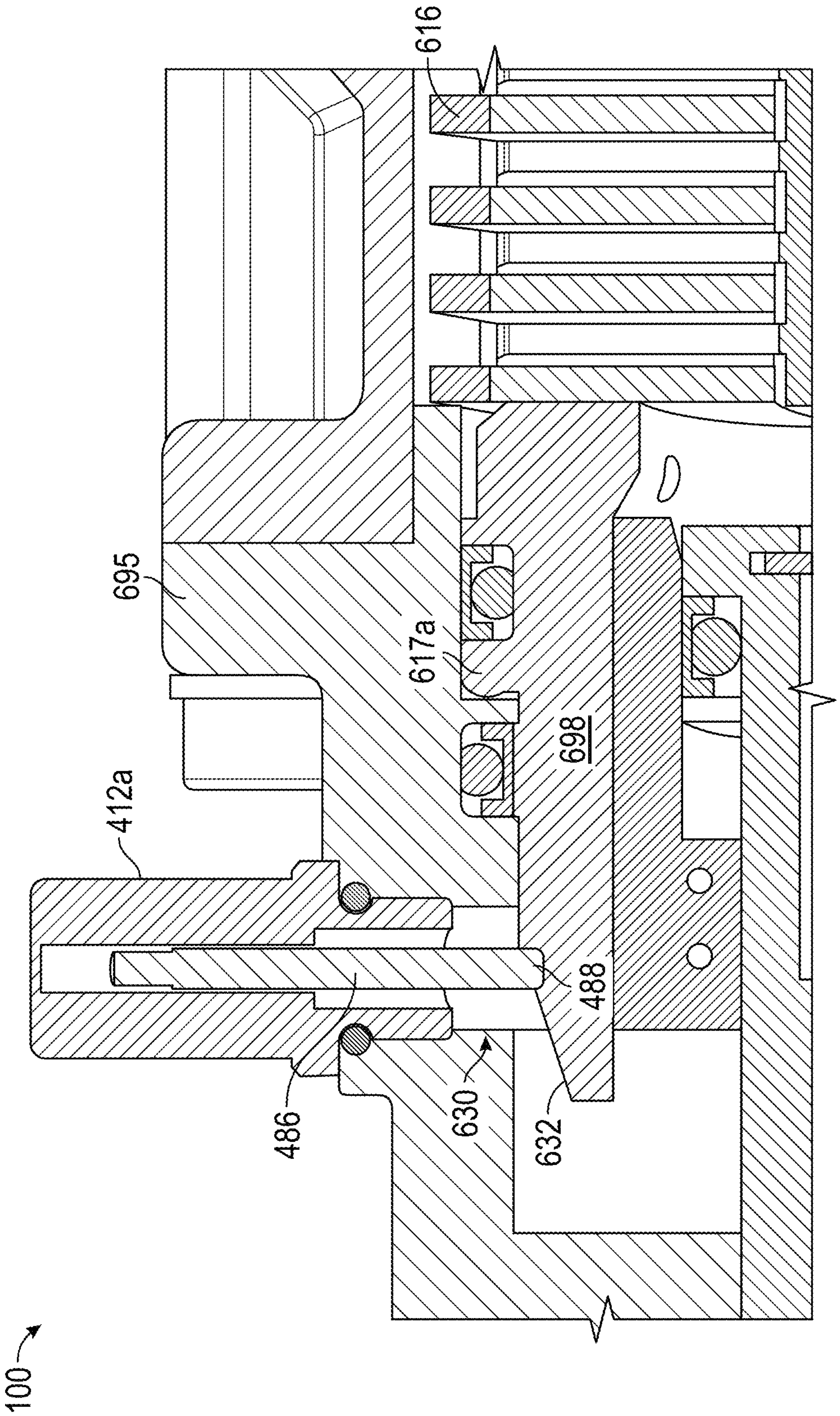
FIG. 43 is a sectional view of the electrical drive system of FIG. 42 showing a first of the two positional sensors, according to some embodiments.
Figure 44:
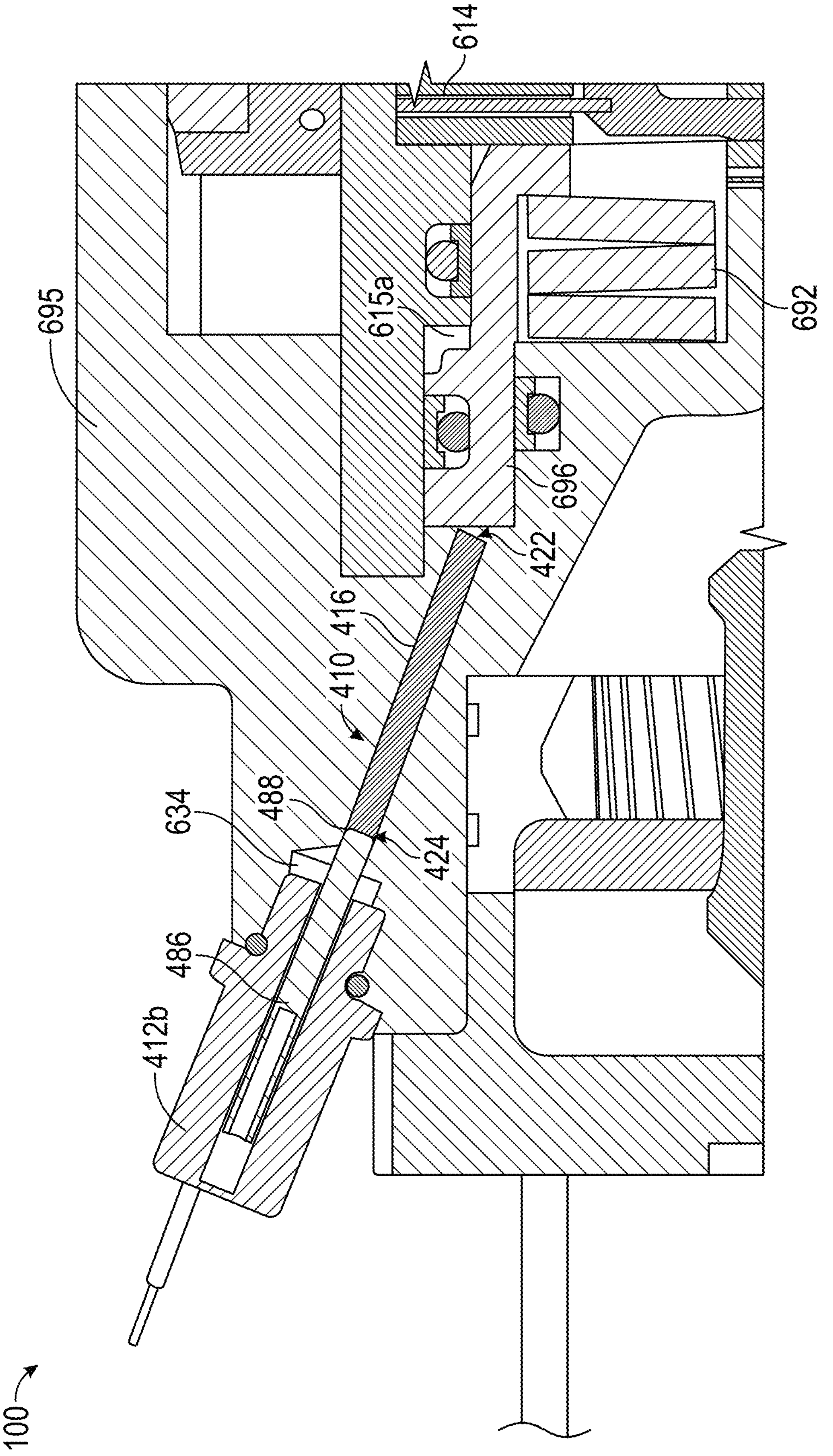
FIG. 44 is a sectional view of the electrical drive system of FIG. 42 showing a second of the two positional sensors, according to some embodiments.

Referring to FIGS. 42-44, the driveline 100 may be equipped with a first implementation of the positional sensor 412, shown as positional sensor 412*a*, and a second implementation of the positional sensor 412, shown as positional sensor 412*b*. While FIGS. 5-19 above describe the use of the positional sensor 412 in a caliper sensing system (e.g., to detect brake pad wear and control brakes), the positional sensors 412 may be implemented in the driveline as described in greater detail above with reference to FIGS. 20-32. The positional sensors 412 may be provided in order to measure direct movement and position of the piston of both the high clutch and the low clutch in real-time. The real-time data obtained by the positional sensor 412*a* and the positional sensor 412*b* may directly translate to identification of lining wear. The real-time data obtained by the positional sensor 412*a* and the positional sensor 412*b* may be used to implement brake balancing in dual gearbox applications and to detect clutch reduction or piston seal issues.

Referring particularly to FIGS. 42 and 43, the positional sensor 412*a* is disposed on a housing 695 of the gearbox 600. The positional sensor 412*a* may be configured to obtain sensor feedback relating to the brake 616 (e.g., relating to a low gear piston). The positional sensor 412*a* is positioned within an opening 630 (e.g., an inner volume, a bore, etc.) and includes a sensor plunger 486 (e.g., the sensing member 414). An end 488 of the sensor plunger 486 is configured to abut, contact, directly engage, etc., an outer surface of the member 698 (e.g., the piston of the low gear). The member 698 (e.g., the low gear piston) may move left to right or vice versa to activate or deactivate the brake 616. As the member 698 translates, the end 414 of the sensor plunger 486 (e.g., a pin, a cylinder, an elongated member, a translatable member that results in different signals, etc.) walks or travels along a ramp surface 632 of the member 698. The sensor plunger 486 is configured to translate (e.g., move upwards or downwards in the orientation shown in FIG. 34) as the member 698 moves. The positional sensor 412*a* may output a continuous signal that is directly related to the position of the member 698. In some embodiments, the movement of the member 698 is directly correlated to linings of the brake 616. In this way, the positional sensor 412*a* can obtain real-time sensor data indicating position of the member 698 as well as health of the brake 616 (e.g., the linings).

Referring particularly to FIGS. 42 and 44, the positional sensor 412*b* is configured to obtain sensor feedback relating to the first brake 614. The positional sensor 412*b* is received in an inner volume 634 (e.g., a bore) of the housing of the gearbox 600. The positional sensor 412*b* may be angled relative to a longitudinal axis of the gearbox 600. The positional sensor 412*b* similarly includes sensor plunger 486 (e.g., sensing member 414). The end 488 of the sensor plunger 486 abuts (e.g., directly contacts, engages, etc.) a rod 416 (e.g., a pin, a slidable member, an elongated member, etc.) that is received within a bore 410 (e.g., an inner volume, a channel, a space, etc.) of the housing 695. A first end 424 of the rod 416 abuts the end 488 of the sensor plunger 486 such that the rod 416 can be drive the sensor plunger 486 to reciprocate. The rod 416 may be aligned (e.g., co-axial) with the sensor plunger 486. A second end 422 of the rod 416 engages (e.g., contacts, abuts, etc.) the member 696. As the member 696 moves due to engagement or disengagement (e.g., activation or deactivation) of the first brake 614, the rod 416 and the sensor plunger 486 of the positional sensor 412*b* are driven to translate to thereby measure position of the member 696. In some embodiments, movement of the rod 416 is directly correlated to linings of the first brake 614. The positional sensor 412*b* may be threaded into the housing 695.

Figure 45:
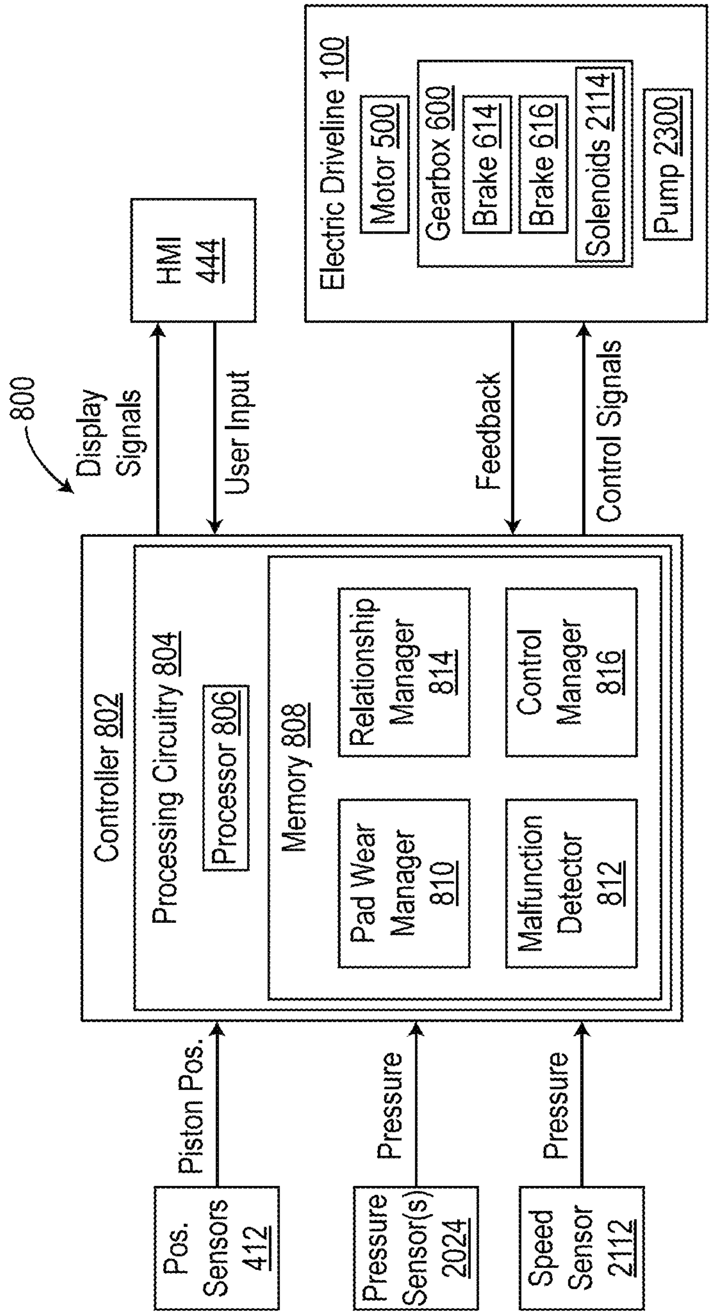
FIG. 45 is a block diagram of a control system for the electrical drive system of FIG. 42 using feedback from the positional sensors, according to some embodiments.

Referring to FIG. 45, the controller 802 of the control system 800 may be configured to receive feedback from the positional sensors 412 of the electric driveline 100 (e.g., the positional sensor 412*a* and the positional sensor 412*b*). The controller 802 may be configured to use any of the techniques described in greater detail above with reference to FIG. 12 (e.g., the pad wear, malfunction, relationship, and controls) for the electric driveline 100. In particular, instead of detecting brake pad wear, the controller 802 may detect wear of the brake 614 and the brake 616. The controller 802 may also determine a relationship for control (e.g., activation) of the brake 614 and the brake 616 in order to operate the electric driveline 100. The positional sensors 412*a* and 412*b* allow the controller 802 to directly monitor high and low clutch or brake piston movement and position (e.g., the member 698 and the member 696) in real-time. The direct monitoring of the positional sensors 412 may be used by the controller 802 to estimate lining wear, brake balancing in dual motor gearbox applications, and to identify early clutch friction material or piston seal malfunction. Further, the positions provided by the positional sensors 412 can be used to provide real-time feedback from each clutch assembly (e.g., the brake 614 and the brake 616) for traction and stability control of the vehicle 10. The malfunction detector 812 may also be configured to identify failure of the brake 614 or the brake 616 due to seal leakage or a stuck piston (e.g., by identifying lack of movement indicated by the positional sensors 412 even when operating the brakes 614 or 616 to engage). The controller 800 may implement any of the techniques of the controller 2102 as described in greater detail above with reference to FIG. 41 to control the electric driveline 100 based on the position data obtained from the positional sensors 412.

Advantageously, combining the positional sensors 412 with the electric driveline 100 facilitates continuous monitoring of the low and high clutch (e.g., brake 614 and brake 616) piston movement and resulting liner wear. By continuously monitoring the movement of the pistons of the brake 614 and the brake 616, the controller 802 can identify issues or malfunctions with the brake 614 or the brake 616 prior to failure. In some embodiments, any imbalance of movement of the pistons of the brake 614 or the brake 616 that relate to slowing or stopping the vehicle 10 can be detected. In some embodiments, the determinations of the controller 802 facilitate identifying possible issues with the brake 614 or the brake 616 and providing insight for investigation and repair.

Advantageously, integration of the positional sensors 412 in a spring hydraulic release clutch system (e.g., the gearbox 600) facilitates real-time monitoring of wear of the brake 614 and the brake 616 by the controller 802. The controller 802 may continuously monitor wear of the clutches or brakes 614 and 616 (e.g., the clutch plates or brake plates) to change an applied spring calculation for clamp load torque capacity. In this way, the controller 802 may use the feedback from the positional sensors 412 to define a relationship or identify a degree of wear, and operate the brake 614 and the brake 616 (e.g., by providing additional clamping force by varying hydraulic pressurization) to account for the degree of wear. The controller 802 may also use the identified degree of wear of the brake 614 and the brake 616 in order to predict a remaining life of the brake 614 and the brake 616. Early prediction of the remaining life of the brake 614 and the brake 616 can be used by the controller 802 to notify appropriate personnel to service or replace the brake 614 or the brake 616. Since the brake 614 and the brake 616 function to both perform driving operations and braking operations, the integration of the positional sensors 412 and the controller 802 facilitates improved operation of the brake 614 and the brake 616 to improve driving and braking operations while accounting for wear of the brake 614 and the brake 616. The controller 802 may increase clamping force provided by the brake 614 and the brake 616 in order to ensure that the vehicle 10 can fully stop while accounting for wear of the brake 614 and the brake 616.

Figure 46:
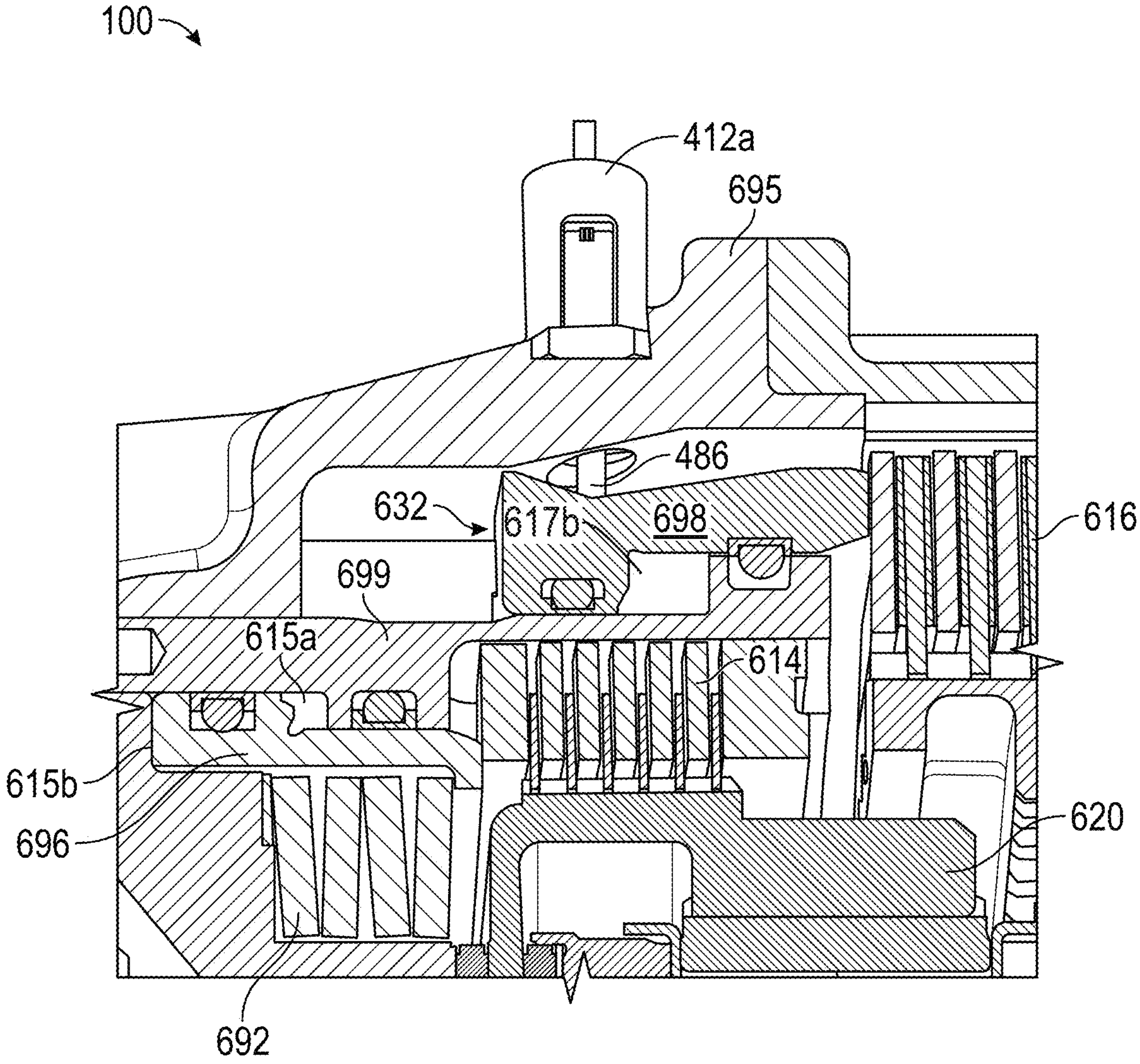
FIG. 46 is a sectional view of a portion of the gearbox of the electrical drive system of FIG. 2, according to some embodiments.

Referring to FIG. 46, the member 698 can be provided as an integral member that integrates both the member 698 as described in greater detail above with reference to FIG. 43 and a member 607 that engages the piston 699 that partially defines the first chamber 617*b*. In some embodiments, the member 698 defines the ramp surface 632 that the sensor plunger 486 engages. The member 698 seals with the piston 699 that partially defines the first chamber 617*a*.

Figure 47:
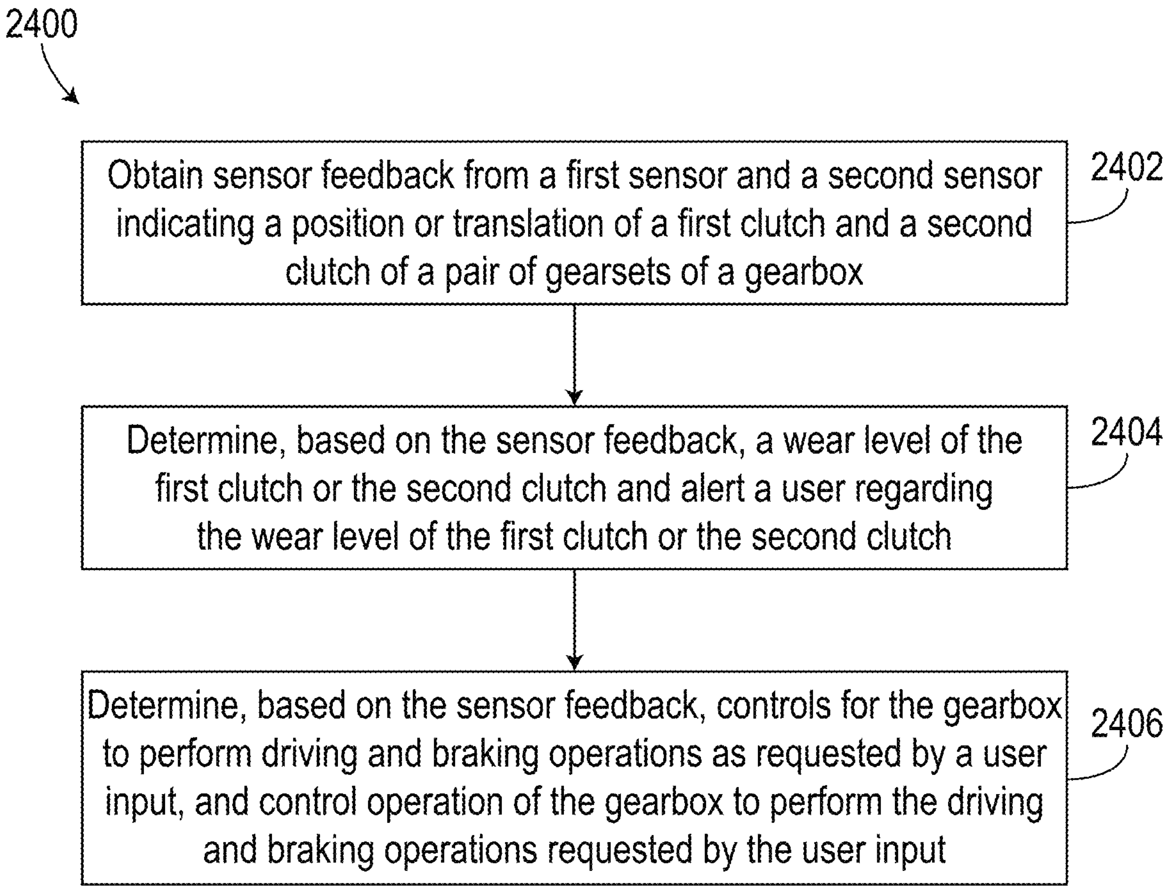
FIG. 47 is a flow diagram of a process for operating the gearbox of the electrical drive system of FIG. 2 based on sensor feedback, according to some embodiments.

Referring to FIG. 47, a flow diagram of a process 2400 for operating a gearbox based on sensor feedback from positional sensors disposed on clutches of the gearbox includes steps 2402-2406. The process 2400 can be performed by the control system 800 as described in greater detail above with reference to FIG. 45 in order to operate the electric driveline 100 (e.g., the gearbox 600) based on the piston positions provided by the positional sensors 412.

The process 2400 includes obtaining sensor feedback from a first sensor and a second sensor indicating a position or translation of a first clutch and a second clutch of a pair of gearsets of a gearbox (step 2402), according to some embodiments. The step 2402 can include obtaining signal feedback from the positional sensor 412*a* and the positional sensor 412*b*. The signal feedback can indicate the position or a change in position (e.g., translation) of the plunger 486 of the first positional sensor 412*a* or the second positional sensor 412*b*. The position or the change in position as provided by the first sensor and the second sensor correlates with a degree of engagement of the brake 614 and the brake 616 of the gear set 602 and the gear set 604.

The process 2400 includes determining, based on the sensor feedback, a wear level of the first clutch or the second clutch and alerting or notifying a user regarding the wear level of the first clutch or the second clutch (step 2404), according to some embodiments. The step 2404 can also include obtaining corresponding control inputs or control signals that are used to operate the first clutch and the second clutch. The corresponding control inputs or control signals can be used to determine the wear level and to determine if the wear level of the first clutch or the second clutch (e.g., the brake 614 or the brake 616) have worn beyond a threshold level. The alert can be provided continually, in response to a user request, or automatically in response to the wear level of at least one of the first clutch or the second clutch decreasing below the threshold level (e.g., 20%). The wear level can also be an estimation of a remaining amount of useful life of the first clutch or the second clutch.

The process 2400 includes determining, based on the sensor feedback, controls for the gearbox to perform driving and braking operations as requested by a user input and controlling operation of the gearbox to perform the driving and braking operations requested by the user input (step 2406), according to some embodiments. In some embodiments, step 2406 is performed by the control system 800. In some embodiments, step 2406 includes determining adjustments to operations or controls for the gearbox 600 based on the sensor feedback to account for wear of the brake 614 and the brake 616. For example, if the brake 614 and the brake 616 wear, the brake 614 or the brake 616 may require being driven further into engagement in order to perform braking operations as requested by the user input. In this way, the sensor feedback or the degree of wear of the brake 614 and the brake 616 can be used to calibrate operation of the gearbox 600.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 as shown in the various exemplary embodiments is illustrative only. Additionally, any element disclosed in one embodiment may be incorporated or utilized with any other embodiment disclosed herein.

What is claimed is:

1. A vehicle, comprising:

a drive system configured to drive a tractive element of the vehicle, the drive system including:

an electric motor;

a gearbox comprising a first planetary gearset, a second planetary gearset, a first clutch, and a second clutch; and a first positional sensor operatively coupled with the first clutch and a second positional sensor operably coupled with the second clutch, wherein the second positional sensor comprises a member that extends in an angled direction relative to a longitudinal direction of the second planetary gearset, the member configured to be driven to translate by the second clutch; and a controller configured to use signals from at least one of the first positional sensor or the second positional sensor to operate at least one of the electric motor or the gearbox.

2. The vehicle of claim 1, wherein the controller is configured to use the signals of at least one of the first positional sensor or the second positional sensor to identify a degree of wear of the first clutch or the second clutch, respectively.

3. The vehicle of claim 1, wherein the controller is configured to use the signals of the first positional sensor or the second positional sensor to identify a seal failure of the first clutch or the second clutch, respectively.

4. The vehicle of claim 1, wherein the controller is configured to use the signals of the first positional sensor or the second positional sensor to determine if the first clutch or the second clutch, respectively, is stuck.

5. The vehicle of claim 1, wherein the controller is configured to use the signals of the first positional sensor or the second positional sensor to determine a relationship between a pressurization of a chamber and a position of the first clutch or the second clutch, respectively, the controller configured to use the relationship to operate a hydraulic system of the drive system to control the gearbox.

6. The vehicle of claim 1, wherein the first positional sensor comprises a sensor plunger that extends in a direction perpendicular with a longitudinal direction of the gearbox, the sensor plunger configured to be driven to translate by engagement of the first clutch.

7. The vehicle of claim 6, wherein the second positional sensor comprises a sensor plunger that extends in an angled direction relative to the longitudinal direction of the gearbox.

8. The vehicle of claim 1, wherein the controller is configured to use signals of the first positional sensor and the second positional sensor to operate the drive system to perform both braking and driving operations.

9. A system for driving a tractive element of a vehicle, the system comprising:

an electric motor;

a gearbox comprising a first planetary gearset, a second planetary gearset, a first clutch, and a second clutch;

a first positional sensor operatively coupled with the first clutch and a second positional sensor operatively coupled with the second clutch, wherein the second positional sensor comprises a member that extends in an angled direction relative to a longitudinal direction of the second planetary gearset, the member configured to be driven to translate by the second clutch; and a controller configured to use signals from at least one of the first positional sensor or the second positional sensor to operate the electric motor and the gearbox.

10. The system of claim 9, wherein the controller is configured to use the signals from at least one of the first positional sensor or the second positional sensor to identify a degree of wear of the first clutch or the second clutch, respectively.

11. The system of claim 9, wherein the controller is configured to use the signals from at least one of the first positional sensor or the second positional sensor to identify a seal failure of the first clutch or the second clutch, respectively.

12. The system of claim 9, wherein the controller is configured to use the signals from at least one of the first positional sensor or the second positional sensor to determine if the first clutch or the second clutch, respectively, is stuck.

13. The system of claim 9, wherein the controller is configured to use the signals of the first positional sensor or the second positional sensor to determine a relationship between a pressurization of a chamber and a position of the first clutch or the second clutch, respectively, the controller configured to use the relationship to operate a hydraulic system of a drive system to control the gearbox.

14. The system of claim 9, wherein the first positional sensor comprises a sensor plunger that extends in a direction perpendicular with a longitudinal direction of the gearbox, the sensor plunger configured to be driven to translate by the first clutch.

15. The system of claim 14, wherein the second positional sensor comprises a sensor plunger that extends in an angled direction relative to the longitudinal direction of the gearbox.

16. The system of claim 9, wherein the controller is configured to use a measured position of a piston of the first clutch and a measured position of a piston of the second clutch to operate a drive system to perform both braking and driving operations.

17. A system for operating a gearbox, the system comprising:

a first positional sensor operatively coupled with a first clutch of the gearbox and a second positional sensor operatively coupled with a second clutch of the gearbox, wherein the second positional sensor comprises a sensor plunger that extends in an angled direction relative to a longitudinal direction of the gearbox, the sensor plunger configured to be driven to translate by the second clutch; and a controller configured to use signals from at least one of the first positional sensor or the second positional sensor to operate a driver of the gearbox.

18. The system of claim 17, wherein the sensor plunger of the first positional sensor is configured to abut the first clutch, the second positional sensor comprising a sensor plunger configured to abut the second clutch.

19. The system of claim 17, wherein the controller is configured to use signals from the first positional sensor and the second positional sensor to operate the system to perform both braking and driving operations.

20. The system of claim 17, wherein the first positional sensor comprises a sensor plunger that extends in a direction perpendicular with the longitudinal direction of the gearbox.

* * * * *